(12) United States Patent
Montange et al.

(10) Patent No.: US 12,196,652 B2
(45) Date of Patent: *Jan. 14, 2025

(54) METHODS, KITS AND STAIN COMPOSITIONS FOR FLOW CYTOMETRY EVALUATION OF UNASSOCIATED VIRUS-SIZE PARTICLES USING MULTIPLE FLUOROGENIC DYES

(71) Applicant: Sartorius BioAnalytical Instruments, Inc., Bohemia, NY (US)

(72) Inventors: Rebecca K. Montange, Louisville, CO (US); Antje Schickert, Arvada, CO (US); Jeffrey W. Steaffens, Broomfield, CO (US); Michael W. Olszowy, Erie, CO (US)

(73) Assignee: Sartorius Bioanalytical Instruments, Inc., Bohemia, NY (US)

( * ) Notice: Subject to any disclaimer, the term of this patent is extended or adjusted under 35 U.S.C. 154(b) by 1025 days.

This patent is subject to a terminal disclaimer.

(21) Appl. No.: 17/263,800

(22) PCT Filed: Aug. 1, 2019

(86) PCT No.: PCT/US2019/044623
§ 371 (c)(1),
(2) Date: Jan. 27, 2021

(87) PCT Pub. No.: WO2020/028639
PCT Pub. Date: Feb. 6, 2020

(65) Prior Publication Data
US 2021/0181073 A1 Jun. 17, 2021

Related U.S. Application Data

(60) Provisional application No. 62/713,377, filed on Aug. 1, 2018.

(51) Int. Cl.
G01N 1/30 (2006.01)
G01N 15/14 (2006.01)
G01N 15/10 (2006.01)

(52) U.S. Cl.
CPC .......... *G01N 1/30* (2013.01); *G01N 15/1459* (2013.01); *G01N 2001/302* (2013.01); *G01N 2015/1006* (2013.01); *G01N 2015/1488* (2013.01)

(58) Field of Classification Search
CPC ............... G01N 1/30; G01N 15/1459; G01N 2001/302; G01N 2015/1006; G01N 2015/1488
See application file for complete search history.

(56) References Cited

U.S. PATENT DOCUMENTS

| 4,857,451 A | 8/1989 | Schwartz |
| 5,040,890 A | 8/1991 | North, Jr. |
| 5,245,318 A | 9/1993 | Tohge et al. |
| 5,306,467 A | 4/1994 | Douglas-Hamilton et al. |
| 5,321,130 A | 6/1994 | Yue et al. |
| 5,351,118 A | 9/1994 | Spinell |
| 5,374,398 A | 12/1994 | Isami et al. |
| 5,395,588 A | 3/1995 | North, Jr. et al. |
| 5,410,030 A | 4/1995 | Yue et al. |
| 5,483,469 A | 1/1996 | Van den Engh et al. |
| 5,602,039 A | 2/1997 | Van den Engh |
| 5,616,502 A | 4/1997 | Haugland et al. |
| 5,690,895 A | 11/1997 | Matsumoto et al. |
| 5,736,105 A | 4/1998 | Astle |
| 5,895,764 A | 4/1999 | Sklar et al. |
| 6,110,427 A | 8/2000 | Uffenheimer |
| 6,183,697 B1 | 2/2001 | Tanaka et al. |
| 6,248,590 B1 | 6/2001 | Malachowski |
| 6,256,096 B1 | 7/2001 | Johnson |
| 6,432,630 B1 | 8/2002 | Blankenstein |
| 6,550,324 B1 | 4/2003 | Mayer et al. |
| 6,589,792 B1 | 7/2003 | Malachowski |
| 6,592,822 B1 | 7/2003 | Chandler |

(Continued)

FOREIGN PATENT DOCUMENTS

| CA | 2796489 A1 | 5/2014 |
| EP | 0822404 A2 | 2/1998 |

(Continued)

OTHER PUBLICATIONS

U.S. Appl. No. 16/781,382, entitled, "Evaluating Biological Material for Unassociated Virus-Size Particles".
U.S. Appl. No. 17/263,800, entitled, "Methods, Kits and Stain Compositions for Flow Cytometry Evaluation of Unassociated Virus-Size Particles Using Multiple Fluorogenic Dyes".
U.S. Appl. No. 17/441,177, entitled, "Flow Cytometry Evaluation for Unassociated Non-Enveloped Viral Particles".
U.S. Appl. No. 16/781,782, entitled, "Liquid Flourescent Dye Concentrate for Flow Cytometry Evaluation of Virus-Size Particles and Related Products and Methods".
Virus Counter(R), Hardware Model: 3100, Software Version 3.0, Operation Manual, Sartorius, Rev B, Mar. 2018.
Rossi et al.; "Evaluation of ViroCyt Virus Counter for Rapid Filovirus Quantification"; Viruses; Feb. 20, 2015; 7; pp. 857-872.
Stoffel et al.; "Design and Characterization of a Compact Dual Channel Virus Counter"; Cytometry Part A, 65A, Wiley-Liss, Inc. (2005), pp. 140-147.

(Continued)

*Primary Examiner* — Gailene Gabel
(74) *Attorney, Agent, or Firm* — Holzer Patel Drennan

(57) ABSTRACT

In flow cytometry evaluation for unassociated virus-size particles stained with multiple fluorogenic dyes, the fluid sample is stained with an aqueous diluted dye formulation including multiple fluorogenic dyes. Preparation of the aqueous diluted dye formulation includes first preparatory processing to prepare a concentrated dye formulation with the fluorogenic dyes provided in a dry powder mixture mixed with and dissolved into a first liquid medium comprising DMSO. After the first preparatory processing, aqueous liquid diluent is added to dilute the first liquid medium and while the fluorogenic dyes remain in solution the liquid medium is converted to an aqueous liquid medium, which may include DMSO as a minor molar component but at a significant concentration. The stained fluid sample may include dissolved disaccharide.

20 Claims, 10 Drawing Sheets

(56) References Cited

U.S. PATENT DOCUMENTS

| | | |
|---|---|---|
| 6,597,438 B1 | 7/2003 | Cabuz et al. |
| 6,664,047 B1 | 12/2003 | Haugland et al. |
| 6,813,944 B2 | 11/2004 | Mayer et al. |
| 6,878,556 B2 | 4/2005 | Sklar et al. |
| 6,880,414 B2 | 4/2005 | Norton |
| 6,890,487 B1 | 5/2005 | Sklar et al. |
| 7,016,022 B2 | 3/2006 | Fritz et al. |
| 7,061,595 B2 | 6/2006 | Cabuz et al. |
| 7,069,191 B1 | 6/2006 | Moore |
| 7,277,166 B2 | 10/2007 | Padmanabhan et al. |
| 7,307,721 B2 | 12/2007 | King |
| 7,318,336 B2 | 1/2008 | Roth et al. |
| 7,355,696 B2 | 4/2008 | Mueth et al. |
| 7,368,084 B2 | 5/2008 | Sklar et al. |
| 7,420,659 B1 | 9/2008 | Cabuz et al. |
| 7,452,725 B2 | 11/2008 | Leary et al. |
| 7,471,394 B2 | 12/2008 | Padmanabhan et al. |
| 7,485,153 B2 | 2/2009 | Padmanabhan et al. |
| 7,553,453 B2 | 6/2009 | Gu et al. |
| 7,671,987 B2 | 3/2010 | Padmanabhan et al. |
| 7,688,427 B2 | 3/2010 | Cox et al. |
| 7,691,636 B2 | 4/2010 | Frazier et al. |
| 7,754,421 B2 | 7/2010 | Transfiguracion et al. |
| 7,758,811 B2 | 7/2010 | Durack et al. |
| 7,776,268 B2 | 8/2010 | Rich |
| 7,780,916 B2 | 8/2010 | Bair et al. |
| 7,817,276 B2 | 10/2010 | Kiesel et al. |
| 7,978,329 B2 | 7/2011 | Padmanabhan et al. |
| 7,981,661 B2 | 7/2011 | Rich |
| 8,017,402 B2 | 9/2011 | Rich |
| 8,071,051 B2 | 12/2011 | Padmanabhan et al. |
| 8,134,705 B2 | 3/2012 | Kaduchak et al. |
| 8,182,767 B2 | 5/2012 | Padmanabhan et al. |
| 8,187,888 B2 | 5/2012 | Rich |
| 8,202,733 B1 | 6/2012 | Javadi |
| 8,262,990 B2 | 9/2012 | Bair et al. |
| 8,263,955 B2 | 9/2012 | Kiesel et al. |
| 8,273,294 B2 | 9/2012 | Padmanabhan et al. |
| 8,283,177 B2 | 10/2012 | Ball et al. |
| 8,482,731 B2 | 7/2013 | Muraki |
| 9,546,936 B2 | 1/2017 | Rowlen et al. |
| 9,816,912 B2 | 11/2017 | Artinger et al. |
| 9,880,085 B2 | 1/2018 | Wilson et al. |
| 9,903,803 B2 | 2/2018 | Smolak et al. |
| 9,927,346 B2 | 3/2018 | Wilson et al. |
| 10,031,061 B2 | 7/2018 | Rowlen et al. |
| 10,041,103 B2 | 8/2018 | Bellinzoni et al. |
| 10,101,262 B2 * | 10/2018 | Artinger ............ G01N 15/1459 |
| 10,161,850 B2 * | 12/2018 | Artinger ............ G01N 21/6428 |
| 10,184,878 B2 | 1/2019 | Smolak et al. |
| 10,408,734 B2 | 9/2019 | Artinger et al. |
| 10,520,420 B2 | 12/2019 | Smolak et al. |
| 10,545,084 B2 * | 1/2020 | Artinger ............ G01N 15/1459 |
| 10,585,030 B2 | 3/2020 | Artinger et al. |
| 10,705,007 B2 | 7/2020 | Rowlen et al. |
| 10,739,246 B2 | 8/2020 | Artinger et al. |
| 11,137,337 B2 | 10/2021 | Gates et al. |
| 11,709,116 B2 * | 7/2023 | Montange ................ C12Q 1/70 435/5 |
| 2003/0235919 A1 | 12/2003 | Chandler |
| 2005/0105077 A1 | 5/2005 | Padmanabhan et al. |
| 2006/0038989 A1 | 2/2006 | Domack et al. |
| 2006/0134002 A1 | 6/2006 | Lin |
| 2006/0163119 A1 | 7/2006 | Hirano et al. |
| 2006/0195268 A1 | 8/2006 | Vega |
| 2006/0259253 A1 | 11/2006 | Ellison et al. |
| 2008/0021674 A1 | 1/2008 | Puskas |
| 2008/0100840 A1 | 5/2008 | Oma et al. |
| 2008/0152542 A1 | 6/2008 | Ball et al. |
| 2008/0252884 A1 | 10/2008 | Carr |
| 2009/0023132 A1 | 1/2009 | Champseix |
| 2009/0029870 A1 | 1/2009 | Ward et al. |
| 2009/0104075 A1 | 4/2009 | Rich |
| 2009/0105963 A1 | 4/2009 | Laursen et al. |
| 2010/0261153 A1 | 10/2010 | Scholl et al. |
| 2010/0284016 A1 | 11/2010 | Teitell et al. |
| 2010/0319469 A1 | 12/2010 | Rich |
| 2011/0024615 A1 | 2/2011 | Tanner et al. |
| 2011/0089328 A1 | 4/2011 | Li |
| 2012/0077260 A1 | 3/2012 | Sharon et al. |
| 2012/0140205 A1 | 6/2012 | Kaduchak et al. |
| 2013/0050782 A1 | 2/2013 | Heng et al. |
| 2013/0080082 A1 | 3/2013 | Howes et al. |
| 2013/0137135 A1 | 5/2013 | Tai et al. |
| 2013/0171683 A1 | 7/2013 | Durack et al. |
| 2013/0252237 A1 | 9/2013 | Wagner |
| 2013/0327957 A1 | 12/2013 | Ayliffe |
| 2013/0338968 A1 | 12/2013 | Hanashi et al. |
| 2015/0132766 A1 | 5/2015 | Yasuda et al. |
| 2016/0273058 A1 | 9/2016 | Akashika et al. |
| 2017/0023570 A1 | 1/2017 | Reyes |
| 2022/0268773 A1 * | 8/2022 | Shives .................... G01N 1/30 |

FOREIGN PATENT DOCUMENTS

| | | |
|---|---|---|
| EP | 1176412 A2 | 1/2002 |
| EP | 2652511 B1 | 5/2017 |
| KR | 20130128348 A | 11/2013 |
| WO | 9306482 A1 | 4/1993 |
| WO | 9636882 A1 | 11/1996 |
| WO | 2005059178 A1 | 6/2005 |
| WO | 2007103969 A2 | 9/2007 |
| WO | 2008010120 A2 | 1/2008 |
| WO | 2009093017 A1 | 7/2009 |
| WO | 2010132053 A1 | 11/2010 |
| WO | 2013147114 A1 | 10/2013 |
| WO | 2014062719 A2 | 4/2014 |
| WO | 2014210370 A1 | 12/2014 |
| WO | 2015187700 A2 | 12/2015 |
| WO | 2015187783 A1 | 12/2015 |
| WO | 2016048872 A1 | 3/2016 |
| WO | 2016154283 A1 | 9/2016 |
| WO | 2016154286 A1 | 9/2016 |
| WO | 2020028639 A1 | 2/2020 |
| WO | 2020197644 A1 | 10/2020 |

OTHER PUBLICATIONS

Wikipedia; "Virus Quantification"; http://en.wikipedia.org/wiki/Virus_quantification; 8 pgs.

Automation.com; "Honeywell Introduces High-Performance, Liquid Nano-Flow Sensor"; Jul. 30, 2004; 5 pgs.

Hercher et al.; "Detection and Discrimination of Individual Viruses by Flow Cytometry"; Journal of Histochemistry & Cytochemistry; Jan. 1, 1979; pp. 350-352.

Molecular Probes, "Electrophoretic Mobility-Shift Assay (EMSA) Kit (E33075)", Product Information MP33075, 2007, 4 pages.

Gates, Tyler et al., "Real Time Quantification of Lentivirus Particles Using Antibody-Based Detection on the Virus Counter® 3100 Platform", 2018, Sartorius Stedim Biotech, 4 pages.

Gates, Tyler et al., "Rapid, Real Time Quantification of Lentivirus Particles Using Antibody-Based Detection on the Virus Counter® 3100 Platform", Application Note, 2018, Sartorius, 4 pages.

Decherchi et al, "Dual staining assessment of Schwann cell viability within whole peripheral nerves using calcein-AM and ethidium homodimer", Journal of Neuroscience Methods., vol. 71, No. 2, 1997, pp. 205-213.

Natunen, Katariina et al., "Nile Red staining of phytoplankton neutral lipids: species-specific fluorescence kinetics in various solvents", J Appl Phycol, 2015, vol. 27, pp. 1161-1169 (published online Sep. 17, 2014).

Stacking (chemistry), Wikipedia, 10 pages, accessed Apr. 28, 2018.

S6653, SYPRO® Red protein gel stain, Safety Data Sheet, ThermoFisher Scientific, 2018, 9 pages.

Wong, Amy G. et al., "The dye SYPRO orange binds to amylin amyloid fibrils but not pre-fibrillar intermediates", Protein Science, 2016, vol. 25, pp. 1834-1840.

P3584, POPO™-3 iodide (534/570) *1 mM solution in DMF*, Safety Data Sheet, Life Technologies, 2013, 7 pages.

(56) References Cited

OTHER PUBLICATIONS

Zhegalova, Natalia G. et al., "Minimization of self-quenching fluorescence on dyes conjugated to biomolecules with multiple labeling sites via asymmetrically charged NIR fluorophores", Contrast Media Mol Imaging, 2014, vol. 9(5), pp. 355-362, NIH Public Access Author Manuscript.
SYPRO® Orange and SYPRO® Red Protein Gel Stains, Product Information, 2003, Molecular Probes, 5 pages.
Dimeric Cyanine Nucleic Acid Stains, Product Information, 2000, Molecular Probes, 4 pages.
Guryev, Oleg et al., "Control of the Fluorescence of Dye-Antibody Conjugates by (2-Hydroxypropyl)-ß-cyclodextrin in Fluorescence Microscopy and Flow Cytometry", Analytical Chemistry, 2011, vol. 83, pp. 7109-7114.
Steinberg, Thomas H., Chapter 31, Protein Gel Staining Methods: An Introduction and Overview, Methods in Enzymology, vol. 463, 2009, pp. 541-563.
Hawe, Andrea et al., "Extrinsic Fluorescent Dyes as Tools for Protein Characterization", Pharmaceutical Research, vol. 25, No. 7, 2008, pp. 1487-1499.
Handbook of Flourescent Probes and Research Products, 2002, Molecular Probes, Table of Contents (2 pages), and pp. 1-6 (Introduction), 269-287 (Section 8.1, Nucleic Acid Stains), 355-377 (Section 9.1, Introduction to Protein Detection, and Section 9.2, Quantification and Selective Purification of Proteins in Gels, on Blots and in Capillary Electrophoresis) and 909-950 (Master Product List), accessed at www.mobitec.de/probes/docs.
Virus Counter(R), 3100 Reagent Kit, Part No. VIR-92333, Sartorius, 2018; Reference Doc: 3987, Effective Date Dec. 14, 2018, 1 page.
Matthiesen, Steen H et al., "Fast and Non-Toxic In Situ Hybridization without Blocking of Repetive Sequences", PLoS One, Jul. 2012, vol. 7, Issue 7, e40675, pp. 1-8.
Suomalainen, Maarit et al., "Uncoating of non-enveloped viruses" SciVerse Science Direct, CurrentOpinion in Virology, www.sciencedirect.com, 2013, vol. 3, pp. 27-33.
Phelps, Donald K. et al., "Theoretical studies of viral capsid proteins", Current Opinion in Structural Biology, 2000, Department of Medicinal Chemistry, Purdue University, vol. 10, pp. 170-173.

Lin, Jun et al., "Structure of the Fab-Labeled 'Breathing' State of Native Poliovirus", Journal of Virology, downloaded from http://jvi.asm.og on Jan. 26, 2017; Mar. 7, 2012, vol. 86, No. 10, pp. 5959-5962.
Wang, Lintao et al., "Detecting structural changes in viral capsids by hydrogen exchange and mass spectometry", Protein Science, 2001, vol. 10, pp. 1234-1243.
Bremner, K. Helen et al., Adenovirus Transport via Direct Interaction of Cytoplasmic Dynein with the Viral Capsid Hexon Subunit, Cell Host & Microbe Article, Dec. 17, 2009, vol. 6, pp. 523-535.
Varga, Mikael J. et al., "Antibodies with Specificities against a Dispase-Produced 15-Kilodalton Hexon Fragment Neutralize Adenovirus Type 2 Infectivity" Journal of Virology, vol. 64, No. 9, Sep. 1990, pp. 4217-4225.
Scherer, Julian et al., "Adenovirus Recruits Dynein by an Evolutionary Novel Mechanism Involving Direct Binding to pH-Primed Hexon", www.dmpi.com/journal/viruses, 2011, doi: 10.3390/v3081417, vol. 3, pp. 1417-1431.
Salganik, Maxim et al., "Evidence for pH-Dependent Protease Activity in the Adeno-Associated Virus Capsid", Journal of Virology, downloaded from http://jvi.asm.org on Jul. 3, 2018; Nov. 2012, vol. 86, No. 21, pp. 11877-11885.
Moraes, Adolfo H. et al., "Antibody Binding Modulates Conformational Exchange in Domain III of Dengue Virus E Protein", Journal of Virology, downloaded from http://jvi.asm.org on Aug. 24, 2018; Feb. 2016, vol. 90, No. 4, pp. 1802-1811.
Haslwanter, Denise et al., "A novel mechanism of antibody-mediated enhancement of flavivirus infection", PLOS Pathogens, https://doi.org/10.1371/journal.ppat.1006643, Sep. 15, 2017, pp. 1-27.
Brown, M.R., et al. "Flow cymetric quantification of viruses in activated sludge", Water Research, Elsevier, Amsterdam, NL, vol. 68, Oct. 8, 2014, pp. 414-422.
Safety Data Sheet Buffer Solution pH4, Carolina Biological Supply Company, Oct. 29, 2015, URL:https://www.lewisu.edu/academics/biology/pdf/pH%20Bufter"/"204.pdt [retrieved on May 15, 2020], 4 pages.
El-Hamalawi A-R A et al. "The Fluorometric Determination of Nucleic Acids in Pea Seeds by Use of Ethidium Bromide Complexes", Analytical Biochemistry, Academic Press, vol. 67, No. 2, Aug. 1, 1975, pp. 384-391.

\* cited by examiner

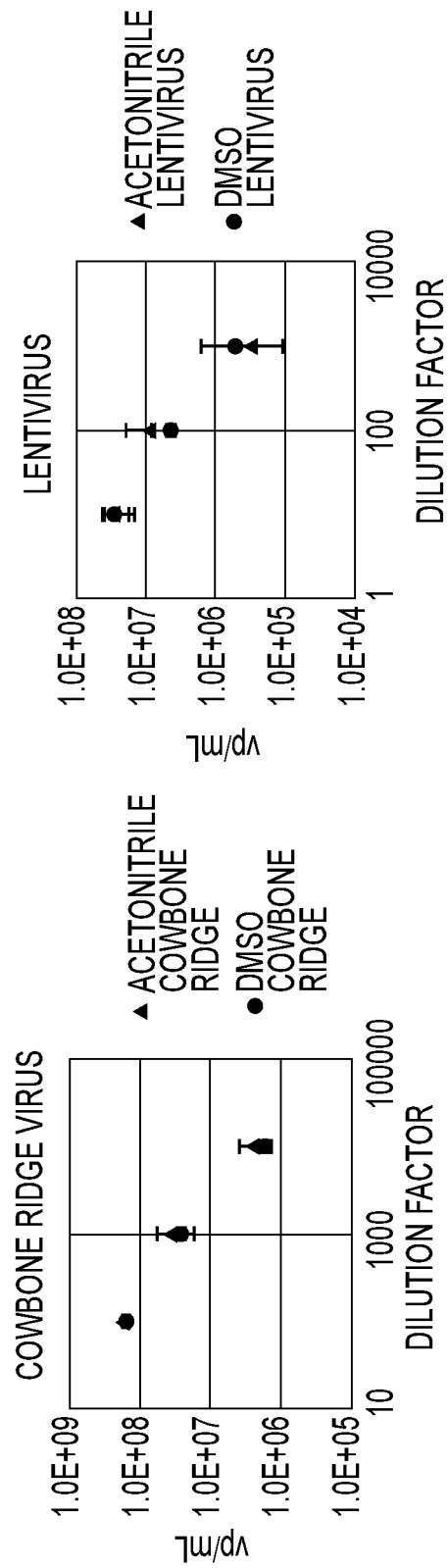

METHODS, KITS AND STAIN COMPOSITIONS FOR FLOW CYTOMETRY EVALUATION OF UNASSOCIATED VIRUS-SIZE PARTICLES USING MULTIPLE FLUOROGENIC DYES

CROSS-REFERENCE

This application claims a priority benefit of U.S. provisional patent application No. 62/713,377 entitled "METHOD, KIT AND STAIN COMPOSITION FOR FLOW CYTOMETRY EVALUATION OF UNASSOCIATED VIRUS-SIZE PARTICLES USING MULTIPLE FLUOROGENIC DYES", the entire contents of which are incorporated herein by reference for all purposes.

BACKGROUND

Flow cytometry is an analytical technique for measuring physical and/or chemical properties of particles as they flow in a fluid sample through an investigation cuvette, commonly referred to as a flow cell, of a flow cytometer. Although a sample fluid may be investigated by subjecting the sample fluid to a variety of stimuli, radiation, typically in the form of light, is one common stimulus technique. Flow cytometry is an important analytical technique that has gained wide acceptance for analyzing particles of biological material, and in particular for investigating properties of cells. More recently, flow cytometry has been adapted for use to detect unassociated (free in solution) virus particles, typically referred to as virions, and other extremely small particles of biological material of a similar size to viruses, referred to as virus-size particles. Such virus-size particles typically have a size of smaller than one micron, smaller 500 nanometers and in many cases smaller than 300 nanometers, smaller than 200 nanometers or even smaller than 100 nanometers. Some virus-size particles have a size on the order of tens of nanometers, although many have a size of at least 10 nanometers, often at least 20 nanometers or even at least 30 nanometers or larger. There are many types of viruses and other virus-size particles that have a particle size in a range of from 20 nanometers to 300 nanometers. A used herein, particle size is a reference generally to the maximum cross-dimension of the particle (e.g., diameter of a sphere, length of a rod). Systems and procedures for accurately analyzing such small particles by flow cytometry has been challenging, including with respect to repeatability of analytical results.

Traditional flow cytometry for detection of particles of a size on the order of cells, which are often several microns in size or larger, rely upon particle identification through light scatter detection. Additional information about specific biological attributes (e.g., cell type or infection of the cell by a particular virus) of a particle identified through light scatter detection may be provided through supplemental use of fluorescent antibody stains that bind to particular biological binding sites, or epitopes, for which the fluorescent emission signature may be detected separately from light scatter detection. However, particle identification through light scatter detection is generally not practical for virus-size particles, as the small size of the particles becomes closer in size to the wavelength of light used as an excitation source for the flow cytometry evaluation. As a consequence, techniques have been developed for detection and analysis of fluorescent emission response to both identify the presence of a particle and also for determining particular particle attributes. An example of a flow cytometer designed for detection and counting of virus-size particles through the use of fluorescent stains is the Virus Counter® 3100 flow cytometer (Sartorius Stedim Biotech).

A very useful class of fluorescent stains for flow cytometry evaluation of virus-size particles are the so-called fluorogenic dyes. When in a free, unbound state in solution, a fluorogenic dye exhibits only a very weak fluorescent response (quantum yield) to an excitation light source. However, when the molecule orientation of the fluorogenic dye becomes conformationally more rigid when bound to a particle, the fluorescent quantum yield increases significantly, often by an order of magnitude or more relative to the fluorescent response of the fluorogenic dye in the free, unbound state. This permits the strong fluorescent signals of the bound dye molecules to be identified over the relatively weak background fluorescence from the unbound dye molecules. The functioning of fluorogenic dyes is significantly different than the functioning of traditional fluorophore stains, often in the form of fluorescent antibody stains, commonly used in flow cytometry evaluation of cells. Such fluorophore stains exhibit a strong fluorescent response whether bound to a particle or in a free, unbound state in solution.

One limitation on the use of fluorogenic dyes for staining virus-size particles is that the dyes tend to be nonspecific, and do not bind to a particular biological binding site, or epitope, as is the case with fluorescent antibody stains. One important technique for use of fluorogenic dyes flow cytometry evaluation for virus-size particles involves simultaneous staining with one fluorescent dye that non-specifically stains protein content and a second fluorescent stain that nonspecifically stains nucleic acid content (e.g., DNA, RNA). By using stain formulations including a mixture of both types of fluorogenic dyes, detection of simultaneous occurrence of the fluorescent emission signatures of both of the nonspecific protein stain and the nonspecific nucleic acid stain is indicative of a particle that the particle may be an intact virus containing for example an envelope protein and genetic material, whereas detecting only one of the fluorescent signatures is indicative of a different type of particle not containing both the protein and nucleic acid attributes, for example a virus-like particle having protein content but not genetic material. This type of simultaneous use of multiple fluorogenic dyes for flow cytometry evaluation of virus-size particles has achieved significant success, for example in combination with use of the Virus Counter® 3100 flow cytometer. Still, formulating multiple fluorogenic dyes in a mixture having significant shelf life and that can be conveniently used to stain unassociated virus-size particles for flow cytometry evaluation with a high level of precision, or repeatability, has proved challenging. For example, a Combo Dye® reagent kit that has been available for use with the Virus Counter® flow cytometer includes a dry powder mixture of fluorogenic dyes for nonspecific protein staining and non-specific nucleic acid staining of unassociated virus-size particles and acetonitrile and aqueous buffer solution used to reconstitute the dry powder dye mixture into an aqueous liquid stain formulation that is added to a fluid sample containing biological material to simultaneously stain the fluid sample with both fluorogenic dyes. To prepare the aqueous liquid stain formulation, the dry powder mixture is mixed with the acetonitrile to promote dissolution of the fluorogenic dyes into the acetonitrile and then after a 5-minute incubation period aqueous buffer solution is added to the mixture to prepare the aqueous liquid stain formulation that is then added to the fluid sample containing the biological material to be stained for flow cytometry evaluation for unassociated virus-size particles. One example of such a dry powder mixture includes a mixture of POPO™-3 iodide nucleic acid stain (ThermoFisher Scientific) and SYPRO™ Red protein stain (ThermoFisher Scientific). Such a kit has reasonable shelf life and is relatively easy to use to stain fluid samples for flow cytometry evaluation. However, even though such kits have had a level of success, there remains a need for stain products and staining techniques that provide improved flow cytometry performance when using multiple fluorogenic stains for flow cytometry evaluation for unassociated particles of virus size, including in terms of enhanced precision and repeatability of flow cytometry results.

SUMMARY

Self-quenching is a phenomenon in which fluorescence energy from fluorescent stains is consumed by energy transfer between dye molecules in close proximity to each other that effectively consumes the anticipated wavelength of light that otherwise might be emitted. Such close proximity of dye molecules that may cause quenching may result from overcrowding of dye molecules on a stained substrate, such as a particle. In the case of fluorogenic dyes, if dye molecules are susceptible to existing in aggregated forms in aqueous liquids, such as are typically used to prepare flow cytometry fluid samples and fluorogenic stains formulations for staining such fluid samples, such an aggregates of dye molecules attaching to a particle may have a significant propensity to self-quench a significant amount of fluorescent emission, and the presence of such aggregates on a stained particle, which may reduce the total strength of a fluorescent emission signal from a stained particle during flow cytometry. Such impairment of fluorescent emission signals may have a pronounced negative effect on flow cytometry evaluation of stained particles of virus size, because of the smaller available area on such small particles to accommodate dye molecule attachment than on larger particles such as cells. Occupying portions of such available attachment area with dye molecule aggregates may significantly reduce the strength of the total fluorescent emission signal from a stained virus-size particle, and such self-quenching effects may impair precision of flow cytometry results, and repeatability of results between fluid samples. One measure of the precision of flow cytometry in flow cytometry results is the coefficient of variation (standard error or measurements divided by the mean of the measurements, often abbreviated as c.v.) which is an indication of the statistical variation of flow cytometry results between fluid samples of the same composition stained and processed in the same way. It has been found that different vials from a batch, or lot, of aqueous fluorogenic dye formulation prepared from dry powder fluorogenic dye mixtures reconstituted as summarized above using acetonitrile in the reconstitution process can vary significantly in flow cytometry performance, which is believed to be due to inconsistent solvation and dispersion of the fluorogenic dyes as present in the final aqueous stain formulation, leading to inconsistent staining and greater-than-desired variation in flow cytometry results. Sample-to-sample variations can be above 20% and day-to-day variations can be 30% or more. More particularly, it is believed that such inconsistent solvation and dispersion results in significant part from formation and/or persistence of dye molecules held in aggregates through pi stacking interactions in the aqueous liquid formulations of fluorogenic dye molecules used to stain fluid samples for flow cytometry evaluation. Pi stacking (which is also called $\pi$ stacking or $\pi$-$\pi$ stacking, or sometimes is simply referred to as "stacking"), refers to a noncovalent attraction that occurs between aromatic rings. Such interactions, for example, are involved with base stacking in three-dimensional structures of DNA and RNA molecules.

Another complication with the use of fluorogenic dyes is that some fluorogenic dyes have limited stability in aqueous stain formulations used to stain fluid samples, and stain formulation performance may deteriorate significantly over a short period of time following preparation, significantly limiting the useful shelf life for the stain formulation before use. A further complication with the use of fluorogenic dyes is that for some fluorogenic dyes, the dye molecules appear to aggregate in stain formulations and stained fluid samples in a manner such that when such aggregates are in a free state in solution, not attached to and staining a particle, the aggregates may sometimes become sufficiently fluorescent that during flow cytometry evaluation the fluorescent response from the free aggregates may be difficult to differentiate from stained particles of interest, which can lead to significant inaccuracies in particle counts determined by flow cytometry. One technique for correcting raw flow cytometry particle count results is to subtract from those raw results background particle counts determined from flow cytometry on blank fluid samples of the same or similar fluid matrix but without containing any particles. Such blank fluid samples are stained in the same manner as the fluid samples with biological material under investigation and are subjected to the same flow cytometry evaluation to determine a blank particle count that is then subtracted from raw particle counts from flow cytometry results on the fluid samples under investigation. However, fluorescent activity of some dye molecule aggregates may significantly increase background counts for some fluorogenic dyes, to a level where it may become difficult to meaningful distinguish between blank and real particle counts. The noted complications concerning stain formulation instability highly fluorescent dye molecule aggregates appear to be more associated with fluorogenic dyes that have higher hydrophobicity, such as is the case for example with SYPRO™ red protein stain.

It has been found that dissolving a dry powder mixture with multiple different fluorogenic dyes a liquid medium with dimethyl sulfoxide (DMSO) before dilution with added aqueous liquid to prepare final aqueous fluorogenic dye formulations that are used to stain fluid samples for flow cytometry evaluation for unassociated (free in solution) virus-size particles can, surprisingly and unexpectedly, significantly reduce the coefficient of variation of flow cytometry results between fluid samples. This surprising and unexpected finding followed testing of an unsuccessful approach to reduce pi stacking interactions, and therefore fluorescent energy quenching, through the addition of a chemical agent, (2-hydroxypropyl)-β-cyclodextrin, to disrupt pi stacking interactions. Disruption of such pi stacking interactions was suggested by Gurgyev, et al., Control of the Fluorescence of Dye—Antibody Conjugates by (2-Hydroxypropyl)-β-cyclodextrin in Fluorescence Microscopy and Flow Cytometry, Anal. Chem., 2011, 83, 7109-7114, 2011 (American Chemical Society). Rather than improving flow cytometry performance, addition of the chemical agent was detrimental to virus particle counting accuracy. Using DMSO instead of acetonitrile to initially dissolve dry powder mixtures of multiple fluorogenic dyes prior to dilution with aqueous liquid to prepare final aqueous dye formulations for staining was tried, without expectation for reduction in pi stacking interactions or significant change in flow cytometry results. When using acetonitrile or DMSO, the final concentration of the liquid organic solvent in either case is very small in the final aqueous dye formulation used to stain fluid samples. Moreover, reduction in pi stacking interactions using DMSO relative to acetonitrile is counter-indicated by Norberg, Jan & Nilsson Lennart, Solvent Influence on Base Stacking, Biophysical Journal, Vol. 74, 394-402, January 1998 (Biophysical Society), finding that base stacking in a solvent becomes more favored as the dielectric constant of the solvent increases. DMSO with a dielectric constant of 47.24 (20° C.) would be indicated as more favorable to such stacking interactions than acetonitrile with a lower dielectric constant of 36.64 (20° C.). However, on the contrary, the performance improvement found with the use of DMSO relative to acetonitrile is surprising and unexpected in providing significant enhancement in precision of flow cytometry results to quantify unassociated virus particles in fluid samples across a number of different viruses.

It has also been found that performance of fluorogenic stain formulations prepared in aqueous liquid media may be significantly improved by including a significant quantity (although a minor quantity on a molar basis) of DMSO in the aqueous liquid medium of the fluorogenic stain formulation that is used to stain fluid samples, and which results in a significant quantity (although a minor quantity on a molar basis) of DMSO also being present in the final stained fluid sample that is then subjected to flow cytometry. Also, although the discussion is presented in relation to inclusion of such a significant quantity of DMSO in the aqueous fluorogenic stain composition, which is preferred, the concept is not so limited, and a similar beneficial effect may be obtained using other polar organic solvent liquids, for example acetonitrile, and the discussion of that aspect of this disclosure, although provided primarily with reference to DMSO as the organic liquid component, applies equally to other organic liquid components, such as for example acetonitrile.

It has also been found that problems associated with blank particle counts, which are thought to be attributable to aggregates of fluorogenic dye molecules, may be significantly reduced by including a disaccharide in the final stained fluid samples, both in stained blank fluid samples and in stained fluid samples with the biological material of interest for flow cytometry evaluation. Not to be bound by theory, it is thought that the presence of the disaccharide in solution in the stained fluid sample helps disperse and reduce aggregation of fluorogenic dyes, and particularly those that are more hydrophobic such as SYPRO™ red, to reduce possible detrimental effects of highly fluorescent dye molecule aggregates during flow cytometry. Surprisingly, including dissolved disaccharide in stained fluid samples was found to significantly reduce blank particle counts, whereas including dissolved monosaccharide or trisaccharide was not found to provide any significant benefit and in some cases was detrimental.

A first aspect of this disclosure is directed to a method for flow cytometry evaluation of a fluid sample for unassociated virus-size particles stained with multiple fluorogenic dyes susceptible to pi stacking interactions in aqueous liquids, the method comprising:

first preparatory processing to prepare a concentrated dye formulation with a plurality of different fluorogenic dyes each having a different fluorescent emission signature and each containing at least one aromatic group susceptible to pi stacking interactions in aqueous liquids, the first preparatory processing comprising dissolving the fluorogenic dyes into a first liquid medium from a dry powder dye composition with a dry powder mixture of the plurality of different fluorogenic dyes, wherein the first liquid medium comprises dimethyl sulfoxide (DMSO) at a first molar concentration and the plurality of different fluorogenic dyes includes at least a first fluorogenic dye with a first fluorescent emission signature and a second fluorogenic dye with a second fluorescent emission signature that is different than the first fluorescent emission signature;

after the first preparatory processing, second preparatory processing while the fluorogenic dyes remain in solution to prepare an aqueous diluted dye formulation comprising the plurality of different fluorogenic dyes dissolved in an aqueous liquid medium, the second preparatory processing comprising diluting the first liquid medium with aqueous liquid diluent;

preparing a stained fluid sample for flow cytometry evaluation, comprising mixing at least a portion of the aqueous diluted dye formulation with a sample of biological material to be evaluated by flow cytometry for presence of the unassociated virus-size particles;

after the preparing, subjecting the stained fluid sample to flow cytometry in a flow cytometer to detect and count occurrences of the unassociated virus-size particles stained with both the first fluorogenic dye and the second fluorogenic dye.

A number of feature refinements and additional features are applicable to this first aspect of the disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

Preferably, the first liquid medium may beneficially comprise a large concentration of DMSO, typically at least 34 percent by moles of DMSO and with even higher concentrations of DMSO in the first liquid medium being more preferred. In that regard, the first liquid medium may comprise, in order of increasing preference, at least 40 percent by moles of DMSO, at least 50 percent by moles of DMSO, at least 60 percent by moles of DMSO, at least 70 percent by moles of DMSO, at least 80 percent by moles of DMSO, at least 90 percent by moles of DMSO, at least 95 percent by moles of DMSO, or even at least 99 percent by moles of DMSO. In some particularly preferred implementations, the first liquid medium may consist essentially of DMSO, and optionally may consist of only DMSO. In addition to DMSO, the first liquid medium may include other components, which in some preferred implementations are minor components relative to DMSO (each present at a smaller molar concentration than DMSO). For example, the first liquid medium may include quantities of water and/or other organic solvents and/or dissolved solids. When water is present, it preferably makes up no more than 66 percent by moles of the first liquid medium, and with even lower concentrations being more preferred. In that regard, the first liquid medium may comprise, in order of increasing preference, no more than 60 percent by moles of water, no more than 50 percent by moles of water, no more than 40 percent by moles of water, no more than 30 percent by moles of water, no more than 20 percent by moles water, no more than 10 percent by moles of water, no more than 5 percent by moles of water, or even no more than 1 percent by moles of water. In some preferred implementations, the first liquid medium is an organic liquid medium, in which the first liquid medium is made up of at least a majority by moles (at least 50 percent by moles) of liquid phase organic material comprised of the DMSO and, optionally, one or more other organic components in addition to the DMSO. When such liquid phase organic material includes one or more such other organic components, DMSO will typically make up the largest percent by moles of the liquid phase organic material, DMSO will make up preferably a majority by moles (over 50 percent by moles) of the liquid phase organic material, more preferably at least 75 percent by moles of the liquid phase organic material, even more preferably at least 90 percent by moles of the liquid phase organic material, and most preferably at least 95 percent by moles of the liquid phase organic material. Particularly preferred is for such liquid phase organic material to consist essentially of, or to consist of only, DMSO. The organic liquid medium will necessarily comprise either no water or an amount of water that is smaller than 50 percent by moles, with lower water content or no water content being more preferred, in the same manner as discussed above for increasing preference for lower water contents. Such liquid phase organic material of the organic liquid medium may comprise a majority by moles (over 50 percent by moles) of DMSO, and with even higher content of DMSO being more preferred. In that regard, such liquid phase organic material of the organic liquid medium may comprise, in order of increasing preference, at least at least 60 percent by moles of DMSO, at least 70 percent by moles of DMSO, at least 80 percent by moles of DMSO, at least 90 percent by moles of DMSO, at least 95 percent by moles of DMSO, or even at least 99 percent by moles of DMSO. In some particularly preferred implementations, such liquid phase organic material of the organic liquid medium may consist essentially of, or consist of only, DMSO. Such liquid phase organic material may include a mixture of DMSO with one or more other organic solvents, preferably with each such other organic solvent, and such other organic solvents together, being minor components on a molar basis, preferably making up less than 50 percent by moles, more preferably no more than 40 percent by moles, more preferably no more than 30 percent by moles and even more preferably no more than 20 percent by moles. Some examples of some other organic solvents that may be mixed with DMSO in such liquid phase organic material includes one or more of acetonitrile methanol, ethanol, or dimethyl formamide. By liquid phase organic material, it is meant organic material that is present in a liquid phase, whether as a solvent or as a solute in the composition. As will be appreciated, when the first liquid medium is in the absence of water and other inorganic components, the first liquid medium may be made up entirely of such liquid phase organic material.

The first liquid medium is preferably in a single fluid phase, and more preferably a single organic fluid phase comprising DMSO at the highest molar concentration of any components, and with other minor components (e.g., water and or other organic solvents) being dissolved in the DMSO. In some preferred implementations, the first liquid medium is an organic liquid medium that is an anhydrous composition. In some implementations, DMSO and water together may comprise at least 80 percent by moles, at least 90 percent by moles, at least 95 percent by moles, at least 98 percent by moles or even more of the first liquid medium. In some implementations the first liquid medium may consist essentially of, or consist of only, DMSO and water. In some preferred implementations when the first liquid medium comprises DMSO and water, the first liquid medium includes a majority by moles of DMSO.

The dry powder dye composition includes a plurality of different fluorogenic dyes, which may include only the first fluorogenic dye and the second fluorogenic dye, or may include one or more additional different fluorogenic dyes in addition to the first fluorogenic dye and the second fluorogenic dye. In some preferred implementations, the dry powder dye formulation consists essentially of, or consists of only, the plurality of different fluorogenic dyes, which as noted may be constituted of only the first fluorogenic dye and the second fluorogenic dye.

Aromatic groups include a cyclic structure having one or more rings with a very stable electron shell configuration and a generally planar structure, and are generally susceptible to pi stacking interactions in aqueous liquids, although the degree of susceptibility may vary based on the particular aromatic group and the particular molecular structure in which the aromatic group is contained. Each of the fluorogenic dyes has at least one such aromatic group susceptible to pi stacking interactions in aqueous liquids. Such aromatic groups may be homocyclic, containing only carbon atoms in the aromatic ring or rings, or heterocyclic, containing one or more atoms other than carbon (referred to as heteroatoms) in the aromatic ring or rings. An aromatic ring containing only carbon atoms in the ring may be referred to as a homoaromatic ring, and an aromatic ring containing a heteroatom in the ring may be referred to as a heteroaromatic ring. Some common heteroatoms include nitrogen, oxygen and sulfur, and an aromatic group of a fluorogenic dye may include one or more of these or other heteroatoms. Such an aromatic group may often include a 6-member aromatic ring and/or a 5-member aromatic ring, each of which may independently be a homocyclic ring or a heterocyclic ring. Such an aromatic group may include a single aromatic ring or may be polycyclic, containing multiple aromatic rings in the aromatic group. Such aromatic group may be part of a fused ring moiety, for example including a 6-member aromatic ring fused with either one or both of a 5-member aromatic ring and a 6-member aromatic ring. One important type of fused ring moiety used in fluorogenic dyes includes a 6-member homoaromatic ring fused with a 6-member heteroaromatic ring, for example including nitrogen as a heteroatom. Another important type of fused ring moiety used in fluorogenic dyes includes 6-member homoaromatic ring fused with a 5-member heteroaromatic ring, and in which the heteroaromatic ring includes both nitrogen and oxygen as heteroatoms or both nitrogen and sulfur as heteroatoms. Examples of some fluorogenic dyes having such fused ring moieties are described for example in U.S. Pat. Nos. 5,410,030 and 5,616,502; each and every part of which is incorporated herein by reference in their entireties. Many useful fluorogenic dyes for use with the aspects of this disclosure are cyanine dyes, and one or more of the fluorogenic dyes may be a cyanine dye. Cyanine dyes are those including methine group (=CH—) linkages. One important group of cyanine dyes are referred to as merocyanine dyes, which have a quaternary nitrogen heterocycle linked to an electron pair-donating moiety by an alkylene or polyalkylene bridge. The fluorogenic dyes disclosed in U.S. Pat. Nos. 5,410,030 and 5,616,502 are examples of cyanine dyes, with those of U.S. Pat. No. 5,616,502 being examples of merocyanine dyes. The cyanine dyes disclosed in U.S. Pat. No. 5,410,030 are cyanine dimers, and more particularly certain dimers of unsymmetrical cyanine dyes. One or more of, or all of, the plurality of different fluorogenic dyes may be cyanine dyes, and may be cyanine dyes as disclosed in U.S. Pat. Nos. 5,410,030 and 5,616,502.

In some preferred implementations, the first fluorogenic dye is for nonspecific nucleic acid staining. In some preferred implementations, the second fluorogenic dye is for nonspecific protein staining. In some particularly preferred implementations, the first fluorogenic dye is for nonspecific nucleic acid staining and the second fluorogenic dye is for nonspecific protein staining. Preferably, the first fluorogenic dye for nonspecific nucleic acid staining and the second fluorogenic dye for nonspecific protein staining are each cyanine dyes, and more preferably with the second fluorogenic dye being a merocyanine dye.

One specific example of a fluorogenic dye for nonspecific nucleic acid staining, which may be used as the first fluorogenic dye, is POPO™-3 iodide nucleic acid stain (ThermoFisher Scientific), which is a cyanine dimer of a type as disclosed in U.S. Pat. No. 5,410,030, and which has been reported to have the following chemical formula (e.g., at www.thermofisher.com/order/catalog/product/P3584):

During the second preparatory processing, sufficient aqueous liquid diluent may be added to the concentrated dye formulation to dilute the first liquid medium such that the aqueous liquid medium of the aqueous diluted dye formulation has a weight ratio of water to DMSO that will typically be larger, and often much larger, than in the concentrated dye formulation. In some implementations the aqueous liquid medium of the aqueous diluted dye formulation may have a relatively large weight ratio of water to DMSO, which weight ratio may in some implementations may be at least 10:1, at least 25:1, at least 50:1, at least 75:1 or at least 100:1. In some implementations such a weight ratio of water to DMSO in the aqueous diluted dye formulation may be up to (no larger than) 1000:1, 750:1, 500:1, 300:1 or 200:1. One particularly preferred range for such a weight ratio of water to DMSO in the aqueous diluted dye formulation for some implementations when the weight ratio of water to DMSO in the aqueous diluted dye formulation is

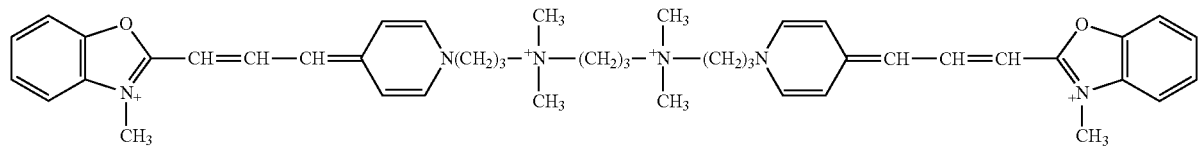

One specific example of a fluorogenic dye for nonspecific protein staining, which may be used as the second fluorogenic dye, is SYPRO™ red protein stain (ThermoFisher Scientific), which is a merocyanine dye of a type as disclosed in U.S. Pat. No. 5,616,502, and which has been reported to be based on the following chemical formula (e.g., at de.wikipedia.org/wiki/SYPRO Red#cite note-Demchenko-1):

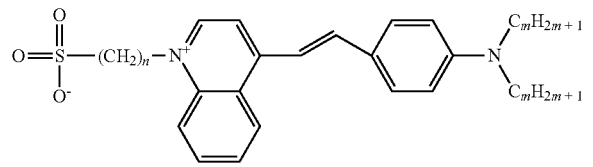

where m is 5 or 6 and n is an integer from 2 to 4.

Some other example fluorogenic dyes for use with the different aspects of this disclosure include: YOYO-1 iodide nucleic acid stain (ThermoFisher Scientific), YO-PRO™-1 iodide nucleic acid stain (ThermoFisher Scientific), SYPRO™ Tangerine protein stain (ThermoFisher Scientific), Krypton™ protein stain (ThermoFisher Scientific), and SYBR™ Green nucleic acid stains such as SYBR™ Green I and SYBR™ Green II (ThermoFisher Scientific).

The concentrated dye formulation may preferably consist essentially of, and more preferably may consist of only, the plurality of different fluorogenic dyes and the first liquid medium. When the first liquid medium is an organic liquid medium, the concentrated dye formulation may be referred to as an organic concentrated dye formulation. The concentrated dye formulation may preferably consist essentially of, and more preferably may consist of only, the first fluorogenic dye, the second fluorogenic dye and the first liquid medium. For brevity, the plurality of different fluorogenic dyes is sometimes referred to herein as simply the fluorogenic dyes.

relatively large is for the weight ratio to be in a range of from 10:1 to 200:1. In some implementations, the aqueous diluted dye formulation may comprise at least 80 weight percent water, at least 85 weight percent water, at least 90 weight percent water, at least or at least 95 weight percent water or at least 97 weight percent water. In some implementations, the aqueous diluted dye formulation may comprise no more than 99.8 weight percent water, or no more than 99.5 weight percent water and often no more than 99.1 weight percent water. The aqueous liquid diluent may be or include a purified water product, and preferably is an aqueous buffered solution, such as any of those used in the processing of biological materials. In some preferred implementations, the buffer solution is a sodium chloride buffer solution containing TRIS and EDTA. An aqueous diluted dye formulation of this disclosure is often referred to herein as simply an aqueous dye formulation, for brevity. In some implementations when the aqueous diluted dye formulation is prepared with a relatively large weight ratio of water to DMSO, the aqueous diluted dye formulation may have an upper concentration limit of DMSO of up to (not larger than) 9 weight percent, 8 weight percent, 7 weight percent, 6 weight percent, 4 weight percent, 2 weight percent, 1 weight percent or 0.5 weight percent; although in such implementations, the aqueous diluted dye formulation may optionally have a lower concentration limit of DMSO of at least 0.1 weight percent, at least 0.2 weight percent, at least 0.4 weight percent, at least 0.8 weight percent, at least 1 weight percent, at least 2 weight percent, 3 weight percent, 5 weight percent or 7 weight percent, provided that in a concentration range the upper concentration limit is larger than the lower concentration limit of the range.

Attaining the desired weight ratio of water to DMSO in the aqueous diluted dye formulation involves diluting the first liquid medium with the aqueous liquid diluent at a large volume ratio of the added volume of aqueous liquid diluent to the volume of the first liquid medium to attain preferred weight ratios of water to DMSO in the aqueous diluted dye formulation. For implementations using a relatively large weight ratio of water to DMSO, the volume ratio of water to DMSO may be at least 10:1, at least 25:1, at least 50:1, at least 75:1 or at least 100:1, and is often not more than 1000:1, 750:1, 500:1, 300:1 or 200:1, with a range of from 10:1 to 200:1 being particularly preferred for some implementations.

In some other implementations, it has been found that enhanced stability of the aqueous diluted dye formulation may be provided by preparing the aqueous diluted dye formulation to include a larger proportion of DMSO to water (or conversely a smaller weight ratio of water to DMSO) than in the implementations just discussed that contain a relatively large weight ratio of water to DMSO, and which also results in stained fluid samples having larger concentration of DMSO as fed to a flow cytometer for flow cytometry evaluation. Although even in implementations when DMSO is present in a larger proportion, the DMSO will still typically be a minor component on a molar basis, and also often on a weight basis, relative to water. As will be appreciated, being an aqueous formulation, water will be the component present in the aqueous diluted dye formulation at the largest concentration on a molar basis even in implementations that contain a relatively large proportion of DMSO than the implementations discussed above having a relatively large weight ratio water to DMSO. In some implementations when the aqueous diluted dye formulation includes a larger concentration of DMSO, the aqueous diluted dye formulation may have a lower concentration limit for DMSO of at least 10 weight percent, at least 12 weight percent, at least 15 weight percent, at least 17 weight percent or at least 20 weight percent. Such an aqueous diluted dye formulation may in some implementations have an upper concentration limit for DMSO of not larger than 50 weight percent, not larger than 45 weight percent, not larger than 40 weight percent, not larger than 35 weight percent, not larger than 30 weight percent, not larger than 25 weight percent, not larger than 22 weight percent, not larger than 18 weight percent, not larger than 16 weight percent, not larger than 13 weight percent or not larger than 11 weight percent, provided that in a concentration range for DMSO, the upper concentration limit of the range will be larger than the lower concentration limit of the range. During the second preparatory processing, the first liquid medium may be diluted with the aqueous liquid diluent to prepare the aqueous liquid medium of the aqueous diluted dye formulation to have a weight ratio of water to DMSO in some implementations of at least 10:7, at least 10:6, at least 10:5, at least 10:4, at least 10:3, at least 10:2.5, at least 10:2 or at least 10:1.5. Stain formulation stability appears to generally increase with increasing DMSO concentration in the aqueous diluted stain formulation, although at DMSO concentrations above about 20 weight percent, DMSO may start exhibit some biocidal activity that could be detrimental to the biological material under investigation and to a flow cytometry evaluation of that biological material. Although higher concentrations of DMSO can be accommodated in the diluted aqueous dye formulation because the concentration of DMSO will be diluted to a lower concentration in the final stained fluid sample, when using relatively large concentrations of DMSO in the aqueous diluted dye formulation, care is advised to slowly introduce the DMSO into and to rapidly disperse (e.g. through vigorous mixing) the introduced DMSO in the fluid sample being stained, to reduce or avoid detrimental effects from localized concentration shocks to biological material within the fluid sample. In some preferred implementations, the aqueous liquid medium of the aqueous diluted dye formulation is prepared to contain a weight percentage of DMSO in a range of from 10 weight percent DMSO to 30 weight percent DMSO, and in some more preferred implementations, the liquid medium of the aqueous diluted dye formulation is prepared to contain a weight percentage of DMSO in a range of from 15 weight percent to 25 weight percent. In some implementations, the stained fluid sample may include a concentration of DMSO of at least 0.5 weight percent, at least 1 weight percent, at least 2 weight percent, at least 3 weight percent, at least 4 weight percent, at least 5 weight percent, at least 6 weight percent or at least 7 weight percent; and such a stained fluid sample may in some implementations include a concentration of DMSO of up to (not greater than) 30 weight percent, 25 weight percent, 20 weight percent, 15 weight percent, 10 weight percent or 8 weight percent.

Some of the DMSO in the aqueous diluted dye formulation, and in the stained fluid sample, may be provided in the first liquid medium used to dissolve the fluorogenic dyes during the first preparatory processing to prepare a concentrated dye formulation. When the aqueous diluted dye formulation is prepared to contain only a small concentration of DMSO, all of the DMSO for the aqueous diluted dye formulation and for the final stained fluid sample may conveniently be provided in such a first liquid medium. Some of the DMSO for the aqueous diluted dye formulation, and for the stained fluid sample, may also be provided from alternative sources of DMSO, which may typically be the case when the aqueous diluted dye formulation is to contain a larger concentration of DMSO. One preferred source for providing DMSO for the aqueous diluted dye formulation is to include some amount of DMSO in the aqueous liquid diluent used to dilute the first liquid medium of the concentrated dye formulation during the second preparatory processing. The aqueous liquid diluent may include the DMSO as a minor component on a molar basis, and typically at a lower weight percentage concentration than DMSO in the first liquid medium in which the fluorogenic dyes are dissolved during the first preparatory processing. In some implementations, the aqueous liquid diluent may comprise DMSO at a concentration of at least 1 weight percent, at least 2 weight percent, at least 5 weight percent, at least 7 weight percent, at least 10 weight percent, at least 12 weight percent, at least 15 weight percent, at least 17 weight percent, or at least 20 weight percent; although in some implementations, the aqueous liquid diluent may include the DMSO at a concentration up to (no larger than) 50 weight percent, 45 weight percent, 40 weight percent, 35 weight percent, 30 weight percent, 25 weight percent, 22 weight percent, 18 weight percent, 15 weight percent, 13 weight percent, 11 weight percent, 8 weight percent or 6 weight percent.

In some preferred implementations, the stained fluid sample is prepared to include dissolved disaccharide, typically dissolved in aqueous liquid of the stained fluid sample. In some implementations, the stained fluid sample may include the dissolved disaccharide at a concentration of at least 1 weight percent, at least 2 weight percent, at least 3 weight percent or at least 4 weight percent. In some implementations, the stained fluid sample may include the dissolved disaccharide at a concentration up to (not greater than) 15 weight percent, not greater than 12 weight percent, not greater than 10 weight percent or not greater than 8 weight percent. When the stained fluid sample comprises dissolved disaccharide, one preferred range for the concentration of the dissolved disaccharide in the stained fluid sample for many implementations is from 3 weight percent to 10 weight percent. Although higher concentrations of disaccharide may be acceptable, as concentrations of the disaccharide increase, solution viscosities also increase and may become more difficult for convenient handling and processing. The disaccharide may include only a single type of disaccharide material or may include a mixture of multiple disaccharide materials. The disaccharide may include for example one or more of trehalose, sucrose, lactose, lactulose, melibiose, melibiulose, cellobiose, nigerose, isomaltose, isomaltulose, maltulose, rutinose, β-laminaribiose, or maltose, with trehalose generally being a preferred disaccharide material.

Disaccharide to be included in the stained fluid sample may be provided in any convenient form and may be introduced at any stage of processing leading to the final stained fluid sample. For example, some or all of the disaccharide may be introduced into a fluid sample before and/or after adding stain to the fluid sample.

In some implementations, preparing the stained fluid sample may include mixing at least a portion of the aqueous diluted dye formulation with a preliminary fluid sample containing the biological material of interest for evaluation, and wherein the preliminary fluid sample comprises disaccharide to provide at least a portion of the dissolved disaccharide in the stained fluid sample. In some implementations, such a preliminary fluid sample may have a concentration of disaccharide of at least 1.5 weight percent, at least 3 weight percent, at least 4.5 weight percent or at least 6 weight percent. In some implementations, such a preliminary fluid sample may have a concentration of disaccharide of up to (not greater than) 22.5 weight percent, not greater than 18 weight percent, not greater than 15 weight percent or not greater than 12 weight percent. The preliminary fluid sample may be prepared with the disaccharide by including disaccharide in aqueous sample dilution liquid that is mixed with biological material of interest in preparing a diluted fluid sample. For example, it is common to prepare a dilution series of fluid samples prepared at different dilution factors for flow cytometry evaluation. In the process of preparing such a diluted fluid sample, the aqueous sample dilution liquid, typically an aqueous buffer solution, may include some or all of the disaccharide to be included in the final stained fluid sample. In some implementations, when such an aqueous sample dilution liquid includes disaccharide, the disaccharide concentration in the aqueous sample dilution liquid may be at least 1.5 weight percent, at least 3 weight percent, at least 4.5 weight percent or at least 6 weight percent. In some implementations, a disaccharide concentration in the aqueous sample dilution liquid may be up to (not greater than) 22.5 weight percent, not greater than 18 weight percent, not greater than 15 weight percent and not greater than 12 weight percent. When a preliminary fluid sample and/or an aqueous sample dilution liquid comprises disaccharide, one preferred range for the a concentration of the disaccharide in the preliminary fluid sample and/or the aqueous sample dilution liquid for many implementation is from 4.5 weight percent to 15 weight percent, which range is particularly preferred when all or essentially all of the disaccharide for the dissolved disaccharide in the stained fluid is to be provided in a preliminary fluid sample that is then stained to prepare the stained fluid sample. As will be appreciated, because a preliminary fluid sample will typically be comprised of a great majority of aqueous sample dilution liquid, the concentration of disaccharide in a preliminary fluid sample may typically be very close to, and at larger dilution factors may be essentially the same as, the concentration of the disaccharide in the aqueous sample dilution liquid used to prepare a preliminary fluid sample.

In some implementations, some or all of the disaccharide for the dissolved disaccharide in the stained fluid sample may be provided in the aqueous diluted dye formulation, in which case in some implementations the aqueous liquid diluent added to the first liquid medium of the concentrated dye formulation may include disaccharide. In some implementations, when the aqueous diluted dye formulation includes disaccharide, the disaccharide may be present in the aqueous diluted dye formulation at a concentration of at least 3 weight percent, at least 6 weight percent, at least 9 weight percent or at least 12 weight percent. In some implementations, a disaccharide concentration in the aqueous diluted dye formulation may be up to (not greater than) 45 weight percent, not greater than 36 weight percent, not greater than 30 weight percent or not greater than 24 weight percent. In some implementations, when the aqueous liquid diluent for stain formulation preparation includes disaccharide, the disaccharide may be present in the aqueous liquid diluent at a concentration of at least 3 weight percent, at least 6 weight percent or at least 9 weight percent or at least 12 weight percent. In some implementations a disaccharide concentration in the aqueous liquid diluent may be up to (not greater than) 45 weight percent, not greater than 36 weight percent, not greater than 30 weight percent or not greater than 24 weight percent. When an aqueous diluted dye formulation and/or aqueous liquid diluent comprises disaccharide, one preferred range for the a concentration of the disaccharide in the aqueous diluted dye formulation and/or in the aqueous liquid diluent is from 9 weight percent to 30 weight percent, which range is particularly preferred when all or essentially all of the disaccharide for the dissolved disaccharide in the stained fluid is to be provided in the aqueous diluted dye formulation. As will be appreciated, because an aqueous diluted dye formulation will typically be comprised of a great majority of aqueous liquid diluent, the concentration of disaccharide in an aqueous diluted dye formulation may typically be very close to, and often essentially the same as, the concentration of the disaccharide in the aqueous liquid diluent used to prepare the aqueous diluted dye formulation.

In some implementations, all of the disaccharide for the dissolved disaccharide in the stained fluid sample may be provided either in a preliminary fluid sample to be stained, in which case the disaccharide may be from one or more than one aqueous sample dilution liquids used to prepare the preliminary fluid sample, or in an aqueous diluted stain formulation, in which case the disaccharide may be from one or more than one aqueous liquid diluents used to prepare the aqueous diluted stain formulation. As may be appreciated, the example disaccharide concentrations disclosed above for use in a preliminary fluid sample, aqueous sample dilution liquid, aqueous diluted dye formulation or aqueous liquid diluent, as the case may be, may correspond to some preferred implementations in which all of the disaccharide for the dissolved disaccharide in the stained fluid sample may be provided in either a preliminary fluid sample or in an aqueous diluted dye formulation that is mixed with the preliminary fluid sample (preferably at a volume ratio of the preliminary fluid sample to the aqueous diluted dye formulation of about 2:1) to prepare the stained fluid sample that is subjected to flow cytometry, although when preparing a stained fluid sample with a very high concentration of dissolved disaccharide, an even higher concentrations of disaccharide that would be required in a single precursor fluid composition (e.g., aqueous diluted stain formulation or preliminary fluid sample) may for practical purposes related to solubility limits and/or high solution viscosities for some disaccharides lead to splitting the total disaccharide feed between multiple precursor fluids (e.g., in both an aqueous diluted stain formulation and a preliminary fluid sample).

In some other implementations a portion of disaccharide for the dissolved disaccharide for the stained fluid sample may be provided in the preliminary fluid sample and another portion of disaccharide for such dissolved disaccharide in the stained fluid sample may be provided in the aqueous diluted dye formulation, whether or not motivated by practical processing considerations as noted above. In such other implementations, the concentration of disaccharide may be the same or different in the preliminary fluid sample and the aqueous diluted stain formulation. Such concentrations of disaccharide in the preliminary fluid sample (and aqueous sample dilution liquid) and in the aqueous diluted stain formulation (and the aqueous liquid diluent) may, for example, each be in concentration ranges summarized above for the preliminary fluid sample and aqueous diluted dye formulation, or may be in different ranges adjusted to the relative proportions of disaccharide provided in each one of them, provided that the combined quantities of disaccharide provide the desired concentration of the dissolved disaccharide in the stained fluid sample. As one example, disaccharide concentration in one or both of the preliminary fluid sample (and the aqueous sample dilution liquid) and in the aqueous diluted stain formulation (and the aqueous liquid diluent) may be at concentration levels disclosed above for the stained fluid sample, that is a disaccharide concentration of at least 1 weight percent, at least 2 weight percent, at least 3 weight percent or at least 4 weight percent and/or not greater than 15 weight percent, not greater than 12 weight percent, not greater than 10 weight percent or not greater than 8 weight percent. Also, all or a portion of disaccharide for the dissolved disaccharide in the stained fluid sample may be provided from a source other than a preliminary fluid sample or an aqueous diluted dye formulation. As will be appreciated, in some implementations, a preliminary fluid sample (and aqueous sample dilution liquid used to make the preliminary fluid sample) and the aqueous diluted dye formulation (and the aqueous diluent liquid used to make the aqueous diluted dye formulation) may all have concentrations of disaccharide that are the same or approximately the same as the final concentration of the dissolved disaccharide in the stained fluid sample.

It is noted that disaccharide in a preliminary fluid sample (and aqueous sample dilution liquid used to make the preliminary fluid sample) and in an aqueous diluted dye formulation (and aqueous diluent liquid used to make the aqueous diluted dye formulation) will typically be dissolved in aqueous liquid of the respective composition, although for clarity of description the term "dissolved disaccharide" is used herein primarily in reference to the disaccharide in the stained fluid sample.

Each of the plurality of different fluorogenic dyes may be included in the dry powder dye composition in such amounts so as to provide a desired concentration for each such fluorogenic dye in the concentrated dye formulation, and ultimately in the aqueous diluted dye formulation. In terms of molar concentration, the aqueous diluted dye formulation may be prepared such that each of the plurality of different fluorogenic dyes (including each of the first fluorogenic dye in the second fluorogenic dye) may independently have a concentration within a range having a lower limit selected from the group consisting of 0.1 micromole per liter, 1 micromole per liter, 10 micromoles per liter and 100 micromoles per liter and an upper limit selected from the group consisting of 2500 micromoles per liter, 2000 micromoles per liter, 1500 micromoles per liter and 1000 micromoles per liter. In terms of weight-to-volume concentration, the aqueous diluted dye formulation may be prepared such that each of the plurality of different fluorogenic dyes (including each of the first fluorogenic dye and the second fluorogenic dye) may independently have a concentration within a range having a lower limit and selected from the group consisting of 1 microgram per milliliter, 10 micrograms per milliliter 50 micrograms per milliliter and an upper limit selected from the group consisting of 1000 micrograms per milliliter, 500 micrograms per milliliter and 250 micrograms per milliliter. A weight-to-volume concentration of each of the plurality of fluorogenic dyes (including each of the first fluorogenic dye and the second fluorogenic dye) in the concentrated dye formulation may be at least 5 times as large, at least 10 times as large, at least 50 times as large, at least 75 times as large or at least 100 times as large as a corresponding weigh-to-volume concentration in the aqueous diluted dye formulation.

The first preparatory processing preferably comprises, after mixing the dry powder dye composition with the first liquid medium, permitting the resulting mixture to sit for a residence time (also referred to as an incubation time) prior to diluting the first liquid medium with the aqueous liquid diluent during the second preparatory processing. The residence time is preferably at least 6 minutes, more preferably at least 7 minutes, even more preferably at least 8 minutes and still more preferably at least 9 minutes. Typically, the residence time need not be longer than 20 minutes, and preferably not longer than 15 minutes. A residence time of about 10 minutes is preferred for some implementations.

The method may be performed to prepare a batch of the aqueous diluted dye formulation that is sufficient for staining multiple fluid samples to prepare multiple stained fluid samples for flow cytometry evaluation, and preferably all such stained fluid samples would be subjected to flow cytometry within 4 hours after completion of preparation of the aqueous diluted dye formulation. The method may include preparing a plurality of stained fluid samples using different aliquots of the aqueous diluted dye formulation. The flow cytometry may include feeding the stained fluid sample to the flow cytometer in any convenient manner. A plurality of such stained fluid samples stained with a single batch of the aqueous diluted dye formulation may be disposed in a multi-well plate and sequentially withdrawn from the multi-will plate and fed to a flow cytometer by an autosampler.

The flow cytometer may be any flow cytometer configured to evaluate for virus-size particles through detection and analysis of fluorescent emission responses of the plurality of fluorogenic dyes. The flow cytometer may be of a type in which the stained fluid sample flows through the flow cell of the flow cytometer without hydrodynamically focusing the stained fluid sample with a sheath fluid. In preferred implementations, however, the flow cytometer is of a type in which the stained fluid sample is hydrodynamically focused with a sheath fluid introduced around the flowing fluid sample prior to introduction of the stained fluid sample into the flow cell of the flow cytometer. In the flow cell, the stained fluid sample, preferably in a hydrodynamically focused state, is subjected to one or more stimuli to stimulate a fluorescent emission response from each fluorogenic dye (including the first fluorogenic dye in the second fluorogenic dye) when attached to an unassociated virus-size particle stained with such fluorogenic dye, and detecting for the fluorescent emission signature of each of the plurality of fluorogenic dyes. The one or more stimuli to which the stained fluid sample is subjected in the flow cell may preferably include at least one excitation radiation. Such an excitation radiation may be of a wavelength range sufficient to stimulate the fluorescent emission response from at least one and optionally multiple ones of the plurality of fluorogenic dyes when attached to virus-size particle. The one or more stimuli may include multiple different excitation radiations having different wavelength ranges for stimulating fluorescent emission responses from different ones of the plurality of fluorogenic dyes. In preferred flow cytometry processing, the flow rate of the stained fluid sample, and preferably in a hydrodynamically focused state, through the flow cell is maintained at a very low flow rate to enhance accurate detection of stained virus-size particles, and preferably such flow rate of the stained fluid sample through the flow cell is in a range having a lower limit of 300 nanoliters per minute, 600 nanoliters per minute or 800 nanoliters per minute and an upper limit of 6000 nanoliters per minute, 3000 nanoliters per minute or 2000 nanoliters per minute, more preferably in a range of from 600 nanoliters per minute to 3000 nanoliters per minute and even more preferably in a range of from 600 nanoliters per minute to 2000 nanoliters per minute. The flow cytometry preferably comprises separately detecting for each of the plurality of different fluorescent emission signatures of the plurality of different fluorogenic dyes, and time correlating detection of at least one such fluorescent emission signature (e.g., of the first fluorogenic dye) and detection of at least one other such fluorescent emission signature (e.g., of the second fluorogenic dye) to determine a detection event indicative of an occurrence of passage through the flow cell of an unassociated virus-size particle stained with each of the time different fluorogenic dyes for which fluorescent emission signatures are time correlated (e.g., a virus-size particle stained with both the first fluorogenic dye and the second fluorogenic dye). Such a time correlation may also be used to identify an occurrence of a virus-size particle passing through the flow cell that is stained with one of the plurality of fluorogenic dyes (e.g., stained with the second fluorogenic dye) and not another one of the plurality of fluorogenic dyes (e.g., not stained with the first fluorogenic dye), for example to identify a virus-size particles with an attached fluorogenic dye non-specifically bound to protein content and not having attached to it another fluorogenic dye for non-specific staining of nucleic acid content, indicative of a particle containing protein and not containing genetic material. One preferred flow cytometer configured for flow cytometry evaluation of fluorescently stained virus-size particles is the Virus Counter® 3100 flow cytometer.

A second aspect of this disclosure is directed to a kit for fluorescent staining unassociated virus-size particles with multiple fluorogenic dyes for flow cytometry evaluation for the unassociated virus-size particles in a fluid sample, the kit comprising:

a dry powder dye composition in a first sealed container, the dry powder dye composition comprising a dry powder mixture of a plurality of different fluorogenic dyes each having a different fluorescent emission signature and each containing at least one aromatic group susceptible to pi stacking interactions in aqueous liquid media, the plurality of different fluorogenic dyes including at least a first fluorogenic dye with a first fluorescent emission signature and a second fluorogenic dye with a second fluorescent emission signature that is different than the first fluorescent emission signature;

first liquid medium in a second sealed container, the first liquid medium comprising dimethyl sulfoxide (DMSO), and preferably comprising at least 34 percent by moles of DMSO; and an aqueous liquid diluent in a third sealed container; and optionally with the first sealed container, the second sealed container and the third sealed container packaged in a common packaging enclosure.

A number of feature refinements and additional features are applicable to this second aspect of the disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

The dry powder dye composition and the plurality of different fluorogenic dyes may be or have any feature or features described with respect to the first aspect of this disclosure. The first liquid medium may be or have any feature or features of the first liquid medium described with respect to the first aspect of this disclosure. The first liquid medium of the kit may be used in the first preparatory processing of the first aspect. The aqueous liquid diluent may be or have any feature or features described with respect to the first aspect of this disclosure.

The sealed containers of the first, second and third sealed containers may have any sealed configuration, for example sealed pouches, bottles, vials or trays. The kit may have multiple ones of any one or more of the first sealed container, second sealed container or third sealed container. For example, the kit may have a plurality of different portions of the dry powder composition contained in a corresponding plurality of different first sealed containers. The common packaging enclosure may be for example a box, bag or pouch. The kit may include one or more reagents or other components in addition to the dry powder dye composition, the DMSO-containing liquid medium and the aqueous liquid diluent.

A third aspect of this disclosure is directed to a fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:

a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and an aqueous liquid medium in which the plurality of different fluorogenic dyes are dissolved, the aqueous liquid medium comprising dimethyl sulfide oxide (DMSO).

A number of feature refinements and additional features are applicable to this third aspect of the disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

The fluorogenic stain composition of the third aspect may be or have any feature or features of the aqueous diluted dye formulation of the first aspect of this disclosure. The plurality of different fluorogenic dyes may be or have any feature or features described with respect to the first aspect or the second aspect of this disclosure. The aqueous liquid medium may be or have any feature or features of the aqueous diluted dye formulation as described with respect to the first aspect of this disclosure. The fluorogenic stain composition of the third aspect may include or may be in the absence of a disaccharide dissolved in aqueous liquid medium of the fluorogenic stain composition.

A fourth aspect of this disclosure is directed to a method for flow cytometry evaluation of a fluid sample for unassociated virus-size particles stained with multiple fluorogenic dyes susceptible to pi stacking interactions in aqueous liquid, the method comprising:
  subjecting a stained fluid sample to flow cytometry evaluation for the virus-size particles, wherein the stained fluid sample comprises:
    biological material to be evaluated by flow cytometry for presence of the unassociated virus-size particles;
    a plurality of different fluorogenic dyes each having a different fluorescent emission signature and each containing at least one aromatic group susceptible to pi stacking, the plurality of different fluorogenic dyes including at least a first fluorogenic dye with the first fluorescent emission signature and a second fluorogenic dye with a second fluorescent emission signature that is different than the first fluorescent emission signature; and
    an aqueous liquid in which the biological material and fluorogenic dyes are dispersed;
  wherein the flow cytometry evaluation comprises subjecting the stained fluid sample to flow cytometry in a flow cytometer to detect and count occurrences of the unassociated virus-size particles stained with both the first fluorogenic dye and the second fluorogenic dye; and
  wherein the aqueous liquid of the stained fluid sample comprises dissolved DMSO, and the stained fluid sample comprises DMSO, preferably at a concentration of DMSO of at least 0.5 weight percent.

A number of feature refinements and additional features are applicable to this fourth aspect of the disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

Any of the stained fluid sample, fluorogenic dyes, concentration of DMSO, and flow cytometry of the fourth aspect may be or have any features as described with respect to the first aspect of this disclosure.

The disclosure provided herein is primarily in the context of processes and compositions using DMSO in a first liquid medium to dissolve fluorogenic dyes from a dry powder dye composition to prepare a concentrated dye formulation and preparing the aqueous diluted dye formulation during the second preparatory processing to include DMSO as a minor components but at a significant concentration. Such processing, kits to facilitate such processing and compositions prepared and subjected to flow cytometry following such processing are generally preferred implementations of the subject matter of this disclosure. However, inclusion of a dissolved disaccharide in the stained fluid sample is useful and beneficial independent of use of DMSO for reconstitution of the fluorogenic dyes from the dry powder dye composition according to other aspects of this disclosure, even though the use of the disaccharide in combination with DMSO is preferred for enhanced flow cytometry performance.

A fifth aspect of this disclosure is directed to a method for flow cytometry evaluation of a fluid sample for unassociated virus-size particles stained with multiple fluorogenic dyes susceptible to pi stacking interactions in aqueous liquids, the method comprising:
  first preparatory processing to prepare a concentrated dye formulation with a plurality of different fluorogenic dyes each having a different fluorescent emission signature and each containing at least one aromatic group susceptible to pi stacking interactions in aqueous liquids, the first preparatory processing comprising dissolving the fluorogenic dyes into a first liquid medium from a dry powder dye composition with a dry powder mixture of the plurality of different fluorogenic dyes, wherein the first liquid medium comprises an organic liquid component and the plurality of different fluorogenic dyes includes at least a first fluorogenic dye with a first fluorescent emission signature and a second fluorogenic dye with a second fluorescent emission signature that is different than the first fluorescent emission signature;
  after the first preparatory processing, second preparatory processing while the fluorogenic dyes remain in solution to prepare an aqueous diluted dye formulation comprising the plurality of different fluorogenic dyes dissolved in an aqueous liquid medium, the second preparatory processing comprising diluting the first liquid medium with aqueous liquid diluent;
  preparing a stained fluid sample for flow cytometry evaluation, comprising mixing at least a portion of the aqueous diluted dye formulation with a sample of biological material to be evaluated by flow cytometry for presence of the unassociated virus-size particles; and
  after the preparing, subjecting the stained fluid sample to flow cytometry in a flow cytometer to detect and count occurrences of the unassociated virus-size particles stained with the both the first fluorogenic dye and the second fluorogenic dye;
  wherein stained fluid sample as prepared during the preparing comprises a dissolved disaccharide.

A sixth aspect of this disclosure is directed to a kit for fluorescent staining unassociated virus-size particles with multiple fluorogenic dyes for flow cytometry evaluation for the unassociated virus-size particles in a fluid sample, the kit comprising:
  a dry powder dye composition in a first sealed container, the dry powder dye composition comprising a dry powder mixture of a plurality of different fluorogenic dyes each having a different fluorescent emission signature and each containing at least one aromatic group susceptible to pi stacking interactions in aqueous liquid media, the plurality of different fluorogenic dyes including at least a first fluorogenic dye with a first fluorescent emission signature and a second fluorogenic dye with a second fluorescent emission signature that is different than the first fluorescent emission signature;
  a first liquid medium in a second sealed container, the first liquid medium comprising an organic liquid, wherein the plurality of different fluorogenic dyes are soluble in the first liquid medium for reconstitution in liquid form for use in staining;

an aqueous liquid diluent in a third sealed container to dilute the first liquid medium after the plurality of different fluorogenic dyes dissolved therein;

an aqueous sample dilution liquid to prepare diluted fluid samples with biological material to be stained for flow cytometry evaluation, the aqueous sample dilution liquid having a different composition than the aqueous liquid diluent and being contained in a fourth sealed container; and a disaccharide to be dissolved in aqueous liquid of stained fluid samples; and optionally with the first sealed container, the second sealed container, the third sealed container and the fourth sealed container packaged in a common packaging enclosure.

A seventh aspect of this disclosure is directed to a fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:

a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and an aqueous liquid medium in which the plurality of different fluorogenic dyes are dissolved, the aqueous liquid medium comprising a disaccharide dissolved in the aqueous liquid medium.

An eighth aspect of this disclosure is directed to a method for flow cytometry evaluation of a fluid sample for unassociated virus-size particles stained with multiple fluorogenic dyes susceptible to pi stacking interactions in aqueous liquid, the method comprising:

subjecting a stained fluid sample to flow cytometry evaluation for the virus-size particles, wherein the stained fluid sample comprises:

biological material to be evaluated by flow cytometry for presence of the unassociated virus-size particles;

a plurality of different fluorogenic dyes each having a different fluorescent emission signature and each containing at least one aromatic group susceptible to pi stacking, the plurality of different fluorogenic dyes including at least a first fluorogenic dye with the first fluorescent emission signature and a second fluorogenic dye with a second fluorescent emission signature that is different than the first fluorescent emission signature; and an aqueous liquid in which the biological material and fluorogenic dyes are dispersed;

wherein the flow cytometry evaluation comprises subjecting the stained fluid sample to flow cytometry in a flow cytometer to detect and count occurrences of the unassociated virus-size particles stained with both the first fluorogenic dye and the second fluorogenic dye; and wherein the aqueous liquid of the stained fluid sample comprises dissolved disaccharide, and optionally with a concentration of the dissolved disaccharide in the stained fluid sample is of at least 1 weight percent or with any other concentration feature or range as disclosed above for the stained fluid sample in relation to the first aspect of this disclosure.

A number of feature refinements and additional features are applicable to the fifth, sixth, seventh and eighth aspects of this disclosure. These feature refinements and additional features may be used individually or in any combination within the subject matter of this aspect or any other aspect of this disclosure. As such, each of the following features may, but are not required to be, used with any other feature or a combination of features of this aspect or any other aspect of this disclosure.

The disclosures herein in relation to the first through fourth aspects of this disclosure apply equally to the fifth through eighth aspects of this disclosure, except with respect to DMSO, which in the fifth through eighth aspects is not required, and which optionally may be replaced in whole or in part by one or more other organic liquid components (e.g., acetonitrile). Other than with respect to DMSO, any element or feature of any of the fifth through eighth aspects, including in relation to the disaccharide, may be or have any feature or features described with respect to corresponding elements or features of the first through fourth aspects of the disclosure.

Numerous additional features and advantages of the present disclosure will become apparent to those skilled in the art upon consideration of the embodiment descriptions provided hereinbelow.

BRIEF DESCRIPTION OF THE DRAWINGS

FIG. 8 is a plot of measured virus particle concentration vs. sample dilution factor for flow cytometry results for Cowbone Ridge Virus samples stained using aqueous diluted dye formulations prepared using DMSO or acetonitrile in Example 2.

FIG. 9 is a plot of measured virus particle concentration vs. sample dilution factor for flow cytometry results for lentivirus samples stained using aqueous diluted dye formulations prepared using DMSO or acetonitrile in Example 2.

DETAILED DESCRIPTION

Figure 1:
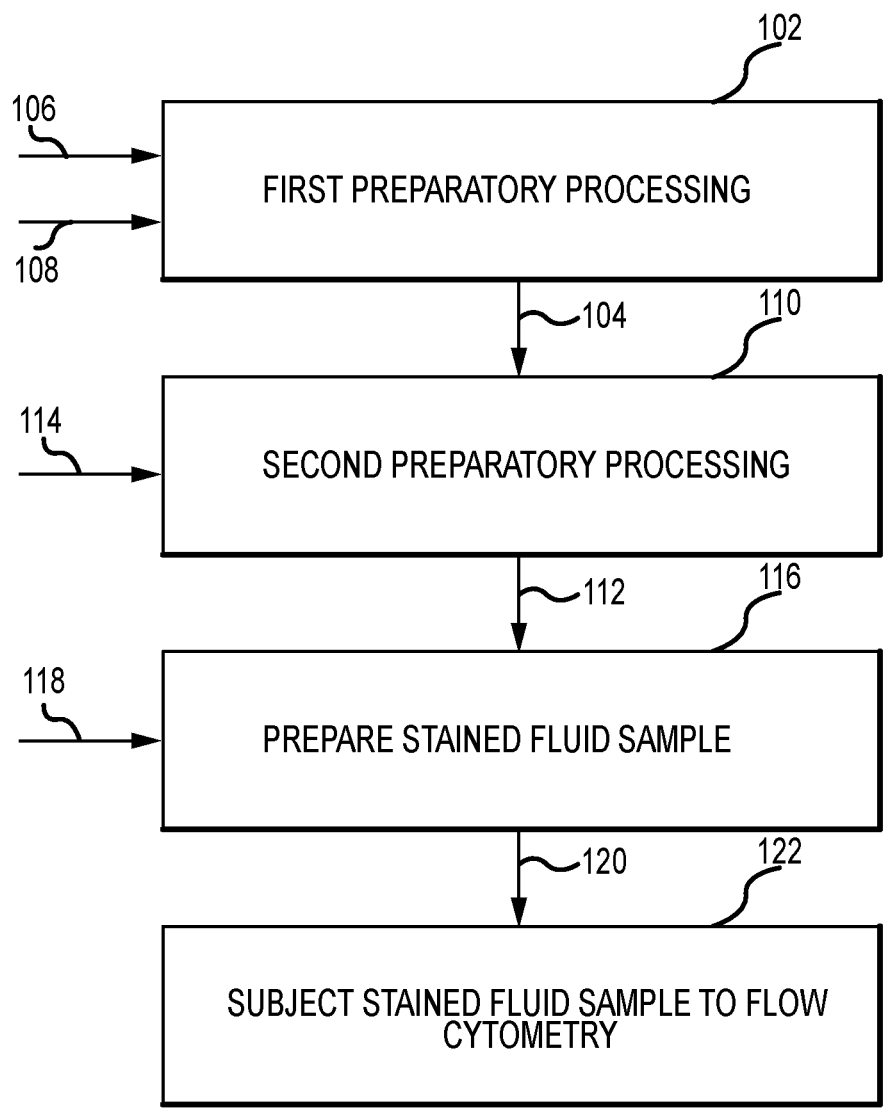
FIG. 1 is a generalized process block diagram illustrating an embodiment of a method of this disclosure for flow cytometry evaluation of a fluid sample for unassociated virus-size particles stained with multiple fluorogenic dyes susceptible to pi stacking interactions in aqueous liquid.

Reference is made to FIG. 1 with a generalized process block flow diagram illustrating one embodiment of a method of this disclosure for flow cytometry evaluation of the fluid sample for unassociated virus-size particles stained with multiple fluorogenic dyes susceptible to pi stacking in aqueous liquids. The processing illustrated in FIG. 1 includes first preparatory processing 102 to prepare a concentrated dye formulation 104 from feedstocks including a dry powder dye composition 106 and a first liquid medium 108 that in this example has been pre-prepared to include at least a majority by moles of DMSO. As per a method of this disclosure, the dry powder dye composition 106 includes a dry powder mixture of a plurality of different fluorogenic dyes each having a different fluorescent emission signature and each containing at least one aromatic group susceptible to pi stacking interactions in aqueous liquid. During the first preparatory processing 102, the dry powder dye composition 106 is combined and mixed with the first liquid medium 108 to dissolve a plurality of different fluorogenic dyes of the dry powder dye composition 106 into the first liquid medium 108. Dissolving the fluorogenic dyes of the dry powder mixture from the dry powder form into the first liquid medium 108 may be aided by mechanical means, such as by stirring, shaking, vortexing or centrifuging the mixture. As will be appreciated, the dry powder dye composition 106 will include at least two different fluorogenic dyes having different fluorescent emission signatures, but the dry powder dye composition 106 may include more than two different fluorogenic dyes each having a different fluorescent emission signature relative to the fluorescent emission signature of each of the other ones of the fluorogenic dyes. In one preferred processing alternative, a first fluorogenic dye is a dye for nonspecific staining of nucleic acid. The concentrated dye formulation 104 resulting from the first preparatory processing includes the plurality of different fluorogenic dyes dissolved in the first liquid medium 108. In the example processing shown in FIG. 1, the first liquid medium 108 has been pre-prepared to a desired composition, however in alternative processing when the first liquid medium includes one or more components other than DMSO, such a first liquid medium may be prepared in situ during the first preparatory processing 102 through the mixing together of multiple such components (e.g., mixing DMSO with aqueous buffer solution and/or another organic solvent) before or after mixing with the dry powder dye composition 106.

The processing illustrated in FIG. 1 includes, after the first preparatory processing 102, second preparatory processing 110 to prepare an aqueous diluted dye formulation 112 with the plurality of different fluorogenic dyes of the concentrated dye formulation 104 dissolved in an aqueous liquid medium. Importantly, during the second preparatory processing, the plurality of fluorogenic dyes in the concentrated dye formulation 104 remain in solution for the duration of the second preparatory processing. In other words, during the second preparatory processing 110, such fluorogenic dyes are not precipitated, even temporarily, during the second preparatory processing 110, and the liquid medium in which the fluorogenic dyes are dissolved is converted from the first liquid medium, preferably an organic liquid medium, to the aqueous diluted dye formulation 112 while the fluorogenic dyes remain in a dissolved state. As shown in FIG. 1, an aqueous liquid diluent 114 (e.g., aqueous buffer solution) is provided to the second preparatory processing 110 and is mixed with the concentrated dye formulation 104 to dilute the first liquid medium 108 with the aqueous liquid diluent 114 to an extent to which after the second preparatory processing 110 the liquid medium in which the fluorogenic dyes are dissolved is assured to be aqueous in nature, in other words is comprised of at least a majority by moles of water, preferably with a weight ratio of water to DMSO of at least 10:1 or such larger weight ratio as discussed above for some implementations when the aqueous diluted dye formulation 112 is to include a relatively large weight ratio water to DMSO, and otherwise with a smaller weight ratio of water to DMSO for some other implementations when the aqueous diluted dye formulation 112 is to include a larger concentration of DMSO, as discussed above. Mixing of the aqueous liquid diluent 114 with the concentrated dye formulation preferably follows a suitable retention, or incubation, time following mixing together the dry powder dye composition 106 and the organic liquid medium 108. In the processing shown in FIG. 1, the aqueous liquid diluent is shown as a single addition, however, the aqueous liquid diluent may in alternative embodiments include multiple additions of different alignments of aqueous liquid diluent, which may or may not each have the same composition. When the aqueous diluted dye formulation 112 is to include a larger concentration of DMSO, as discussed above, DMSO in addition to that included in the first liquid medium 108 may be provided, for example, as a minor molar component in the aqueous liquid diluent 114.

With continued reference to FIG. 1, the example method embodiment includes processing to prepare a stained fluid sample 116 for flow cytometry evaluation. A resulting stained fluid sample 120 is then ready for flow cytometry evaluation. During the processing to prepare a stained fluid sample 116, at least a portion of the aqueous diluted dye formulation 112 is mixed with a sample of biological material 118 to be evaluated by flow cytometry for presence of unassociated virus-size particles. The sample of biological material 118 may conveniently be in the form of a fluid composition with biological material to be investigated dissolved or suspended in an aqueous liquid (e.g., aqueous buffer solution). Such a fluid composition may be the result of prior processing to purify and prepare the biological material to be investigated in a form ready for flow cytometry evaluation, except for staining the material. As will be appreciated, the aqueous diluted dye formulation 112 may be prepared as a batch of sufficient size to provide multiple aliquots for staining multiple samples of biological material for flow cytometry evaluation, in which case the processing of preparing a stained fluid sample 116 may be performed on a plurality of different samples of biological material 118 using different aliquots of the aqueous diluted dye formulation 112 to prepare a plurality of stained fluid samples 120.

As further shown in FIG. 1, the illustrated example embodiment includes processing to subject a stained fluid sample to flow cytometry 122. During this processing, the stained fluid sample 120 is introduced into and processed through a flow cytometer for flow cytometry evaluation for presence of targeted unassociated virus-size particles, and to detect and count occurrences at least of unassociated virus-size particles stained with multiple fluorogenic dyes (e.g., a first fluorogenic dye for non-specific nucleic acid staining and a second fluorogenic dye for non-specific protein staining). During the flow cytometry evaluation, a controlled flow of the stained fluid sample 120 is subjected in a flow cell of the flow cytometer to one or more excitation stimuli, such as light from one or more lasers, to cause the respective fluorescent emission response from each fluorogenic dye with which a particle passing through the flow cytometer is stained. Light coming from the flow cell is detected by one or more light detector to identify the presence of a fluorescent emission response from each such fluorogenic dye. Simultaneous detection of multiple different fluorescent emission responses indicates passage of a particle stained with the multiple different fluorogenic dyes and such a simultaneous detection may be counted as an occurrence of a virus-size particle stained with properties indicated by such multiple fluorogenic dyes. The fluorescent emission responses of the fluorogenic dyes may be detected separately by separate photodetectors each configured for detection of the specific fluorescent emission signature of the targeted fluorogenic dye. Detected fluorescent emission signatures may be processed by a data analysis system to identify detection events indicative of a virus-size particle stained with the respective fluorogenic dye and to count and determine a concentration of such virus-size particles.

As may be appreciated, the example processing illustrated in FIG. 1 may include preparatory processing prior to the first preparatory processing 102. Similarly, each of the first preparatory processing 102, second preparatory processing 110 and processing to prepare a stained fluid sample 116 may include multiple sub-steps, which may include processing in addition to that described above in the preparation of the concentrated dye formulation 104, in the preparation of the aqueous diluted dye formulation 112 or in the preparation of the stained fluid sample 120 that is subjected to flow cytometry. As one example, during the processing to prepare a stained fluid sample 116, additional stain formulations may be added to the fluid sample 112 in addition to the dry powder dye composition 114, for example to separately add a fluorophore stain, which may be mixed into the fluid sample in the form of a liquid stain formulation. Such a fluorophore stain may, for example, be a fluorescent antibody stain with a fluorescent stain molecule conjugated to an antibody specific for binding to a targeted epitope on a targeted virus-size particle. Such a fluorescent antibody stain may be, for example, of a type as disclosed in U.S. patent application Ser. No. 15/558,107, now issued as U.S. Pat. No. 10,161,850, and the corresponding U.S. patent application publication US 2018/0052163 A1, the entire contents of each of which are is incorporated herein by reference for all purposes. Such a fluorescent antibody stain may have an emission response signature different than each of the fluorogenic dyes, and may be detected on a separate photodetection channel of the flow cytometer.

With continued reference to FIG. 1, when the stained fluid sample 120 is prepared containing dissolved disaccharide, some or all of the disaccharide may be included in the aqueous liquid diluent 114 used in the second preparatory processing 110 and/or in a preliminary fluid sample containing the biological material 118 to which the aqueous diluted dye formulation 112 is added to prepare the stained fluid sample 120. In one variation of the processing shown in FIG. 1 when the stained fluid sample 120 includes dissolved disaccharide, the first preparatory processing 102 and the second preparatory processing 110 may be performed using one or more organic liquid components other than DMSO, although the use of DMSO as described above is preferred. For example, the first liquid medium 108 may include one or more organic liquid components (e.g., acetonitrile) instead of DMSO, and if the aqueous liquid diluent 114 includes as a minor molar component an organic liquid component or components, such organic liquid components or components may be other than DMSO (e.g., acetonitrile).

Figure 14:
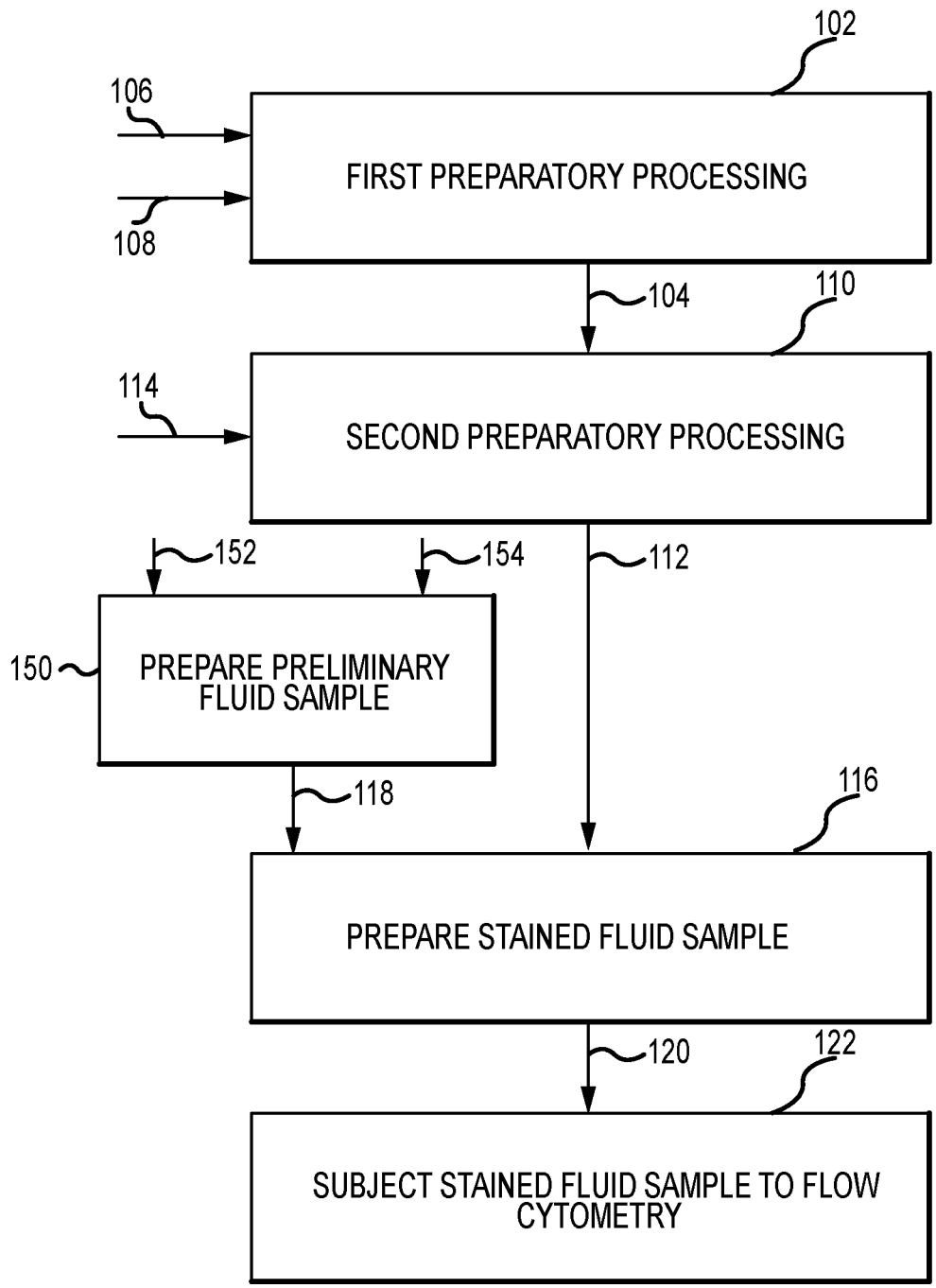
FIG. 14 is a generalized process block diagram illustrating another embodiment of a method of this disclosure for flow cytometry evaluation of a fluid sample for unassociated virus-size particles stained with multiple fluorogenic dyes susceptible to pi stacking interactions in aqueous liquid.

Reference is now made to FIG. 14, which shows a generalized process block flow diagram illustrating another embodiment of a method of this disclosure. The processing illustrated in FIG. 14 is the same as that illustrated in FIG. 1, except also including a step 150 to prepare a preliminary fluid sample containing the biological material 118, to which preliminary fluid sample the aqueous diluted dye formulation 112 is added during the step 116 to prepare the stained fluid sample 120. As shown in FIG. 14, in the step 150 to prepare a preliminary fluid sample, a preliminary composition 152 containing the biological material is diluted with an aqueous sample dilution liquid 154 to prepare the preliminary fluid sample containing the biological material 108 that is then processed in the step 116 to prepare the stained fluid sample 120. When the stained fluid sample 120 is prepared to include dissolved disaccharide, some or all of the disaccharide for inclusion in the stained fluid sample 120 may be provided in the aqueous sample dilution liquid 154.

Figure 2:
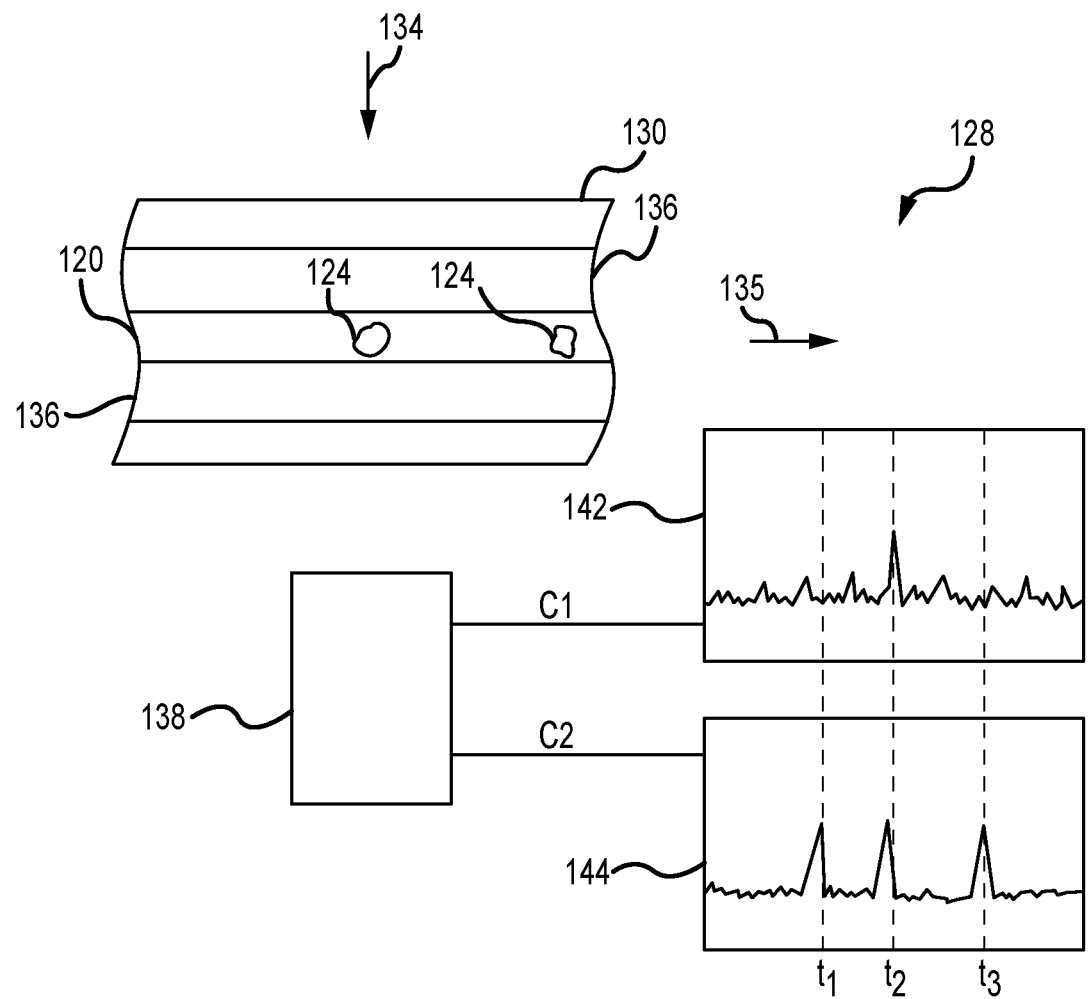
FIG. 2 illustrates an embodiment of operation of a flow cytometer for performing a flow cytometry evaluation on a stained fluid sample for virus-size particles as part of a method of this disclosure.

Reference is now made to FIG. 2, illustrating one example of detecting virus-size particles stained with multiple fluorogenic dyes during flow cytometry, for example during the processing to subject the stained fluid sample 120 to flow cytometry in step 122 illustrated in FIG. 1 and discussed above. FIG. 2 shows partial componentry of a flow cytometer 128, including a flow cell 130 and a light detection and analysis system 138. As shown in FIG. 2, a flow of such a stained fluid sample 120 through the flow cell 130 is subjected in the flow cell 130 to excitation radiation 134 from a light source (not shown) of the flow cytometer 128. Such a light source may be, for example, a laser, LED or other light source. As illustrated in FIG. 2, the stained fluid sample 120 includes virus-size particles 124, and the stained fluid sample is shown as flowing through a flow cell 130 of a flow cytometer in the direction of the flow arrow 135. In the example illustrated in FIG. 2, the stained fluid sample 120 has been hydrodynamically focused with a sheath fluid 136 prior to introduction into the flow cell 130. As illustrated in FIG. 2, the sheath fluid 136 is shown as a distinct fluid relative to the stained fluid sample 120. As may be appreciated, differentiation between such a sheath fluid 136 and stained fluid sample 120 may not be as distinct as illustrated in FIG. 2. The light detector and analysis system 138 in FIG. 2 is illustrated to include two photodetectors for separately detecting radiation wavelength ranges associated with the different fluorescent emission signatures of two different fluorogenic dyes as a consequence of excitation by the excitation radiation 134. FIG. 2 also shows a first time series plot 142 with an example output (C1) of a first photodetector detecting for fluorescent emission response from a first fluorogenic dye staining a virus-size particle 124 and a second time series plot 144 with an example output (C2) of a second photodetector detecting for fluorescent emission response from a second fluorogenic dye staining a virus-size particle 124. The time series plots 142 and 144 are plots of voltage from the respective photodetector versus time, and with the indicated voltage peaks at times t1, t2 and t3 indicating detection of such a virus-size particle 124 stained with a fluorogenic dye. In this example, a first fluorogenic dye may be a fluorogenic dye for nonspecific nucleic acid and a second fluorogenic dye may be a fluorogenic dye for nonspecific protein staining. The second time series plot 144 is illustrated with three voltage peaks at times t1, t2 and t3 indicative of the passage through the flow cell 130 of three virus-size particles 124 with the second fluorogenic dye staining protein content of such virus-size particles 124. The first time series plot 142 is illustrated with a voltage peak at time t2 indicative of the passage through the flow cell 130 of a virus-size particle 124 with the first fluorogenic dye staining nucleic acid content of such a virus-size particle 124. The coincidence at time t2 of a voltage peak on both the first time series plot 142 and the second time series plot 144 indicates passage through the flow cell 130 of a virus-size particle 124 containing both nucleic acid content and protein content, for example such as may be the case for an in-tact virus particle, or virion. The occurrence of the voltage peaks at t1 and t3 on the second time series plot 144 with no corresponding voltage peaks on the first time series plot 142 indicates passage through the flow cell of virus-size particles 124 including protein content and not including nucleic acid content, such as may be the case for a virus-like particle, exosome or particle fragment including protein content but not including genetic material. In alternative embodiments, the light detector and analysis system 138 may include photodetectors for detecting fluorescent emission signatures from more than two different fluorogenic dyes and/or to detect one or more fluorescent antibody stains indicative of the presence of a particular epitope on a targeted virus-size particle. Although the flow cytometer 128 is illustrated as including a single light source providing a single excitation radiation 134 to stimulate multiple different fluorescent emission responses from different fluorogenic dyes, such a flow cytometer 128 may include multiple different light sources each providing a different excitation radiation in a different wavelength range where the fluorescent emission responses from different fluorogenic dyes and/or antibody stains are stimulated by different excitation radiation wavelength ranges. Also, although processing in FIG. 2 is shown using a hydrodynamically focused stained fluid sample 120, such a stained fluid 120 may alternatively be processed through a flow cytometer in which samples are not hydrodynamically focused, although hydrodynamically focused systems are preferred. In a preferred operation, a flow rate of the hydrodynamically focused stained fluid sample 120 through the flow cell 130 may be very low, preferably 6000 nanoliters per minute or lower, more preferably 3000 nanoliters per minute or lower, more preferably in a range having a lower limit of 300 nanoliters per minute, 600 nanoliters per minute or 800 nanoliters per minute and an upper limit of 6000 nanoliters per minute, 3000 nanoliters per minute or 2000 nanoliters per minute, which range is preferably from 600 nanoliters per minute to 3000 nanoliters per minute and is even more preferably from 600 nanoliters per minute to 2000 nanoliters per minute.

Figure 3:
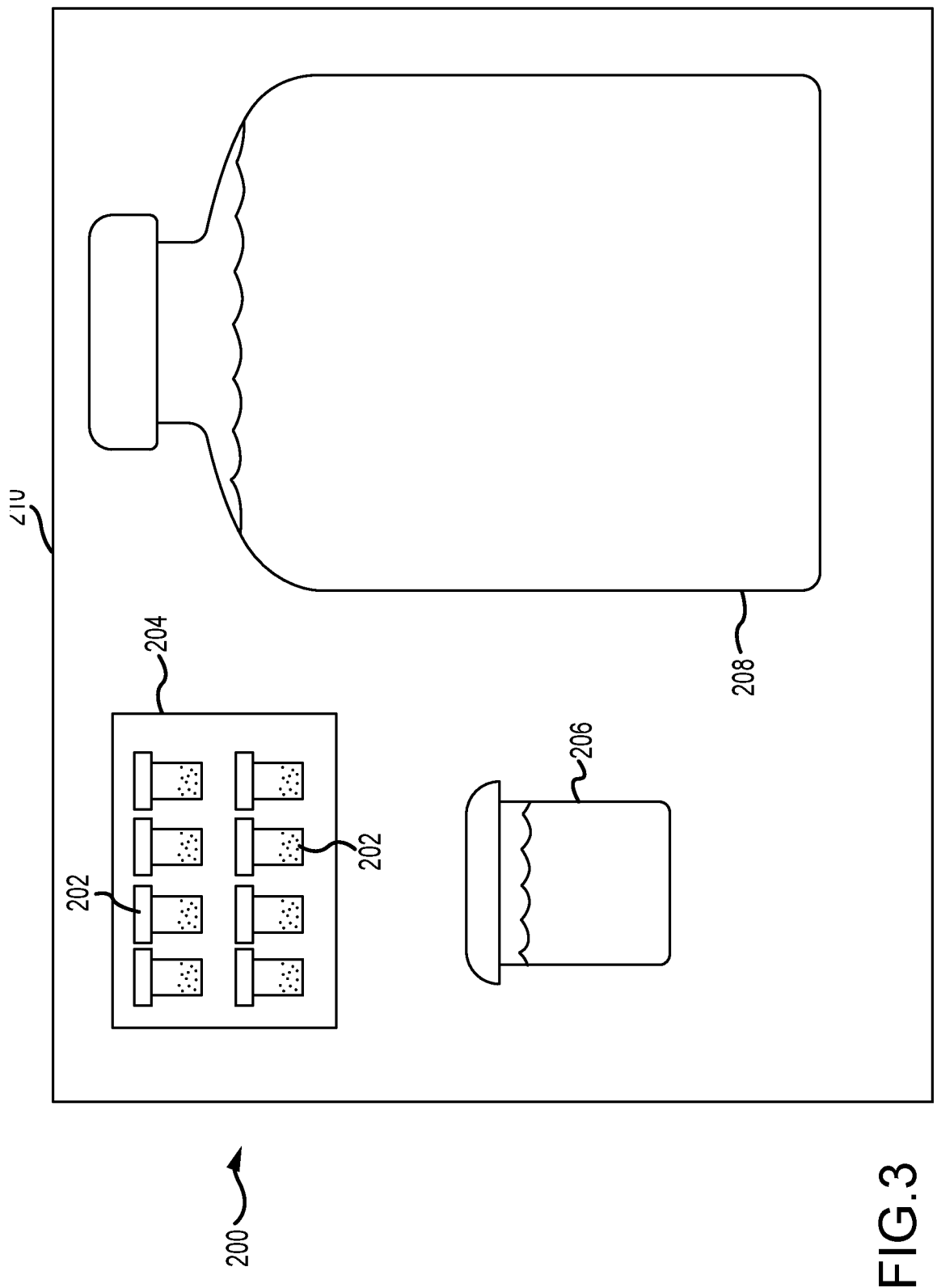
FIG. 3 illustrates an embodiment of a kit of this disclosure for fluorescent staining unassociated virus-size particles with multiple fluorogenic dyes for flow cytometry evaluation for the unassociated virus-size particles.
Figure 15:
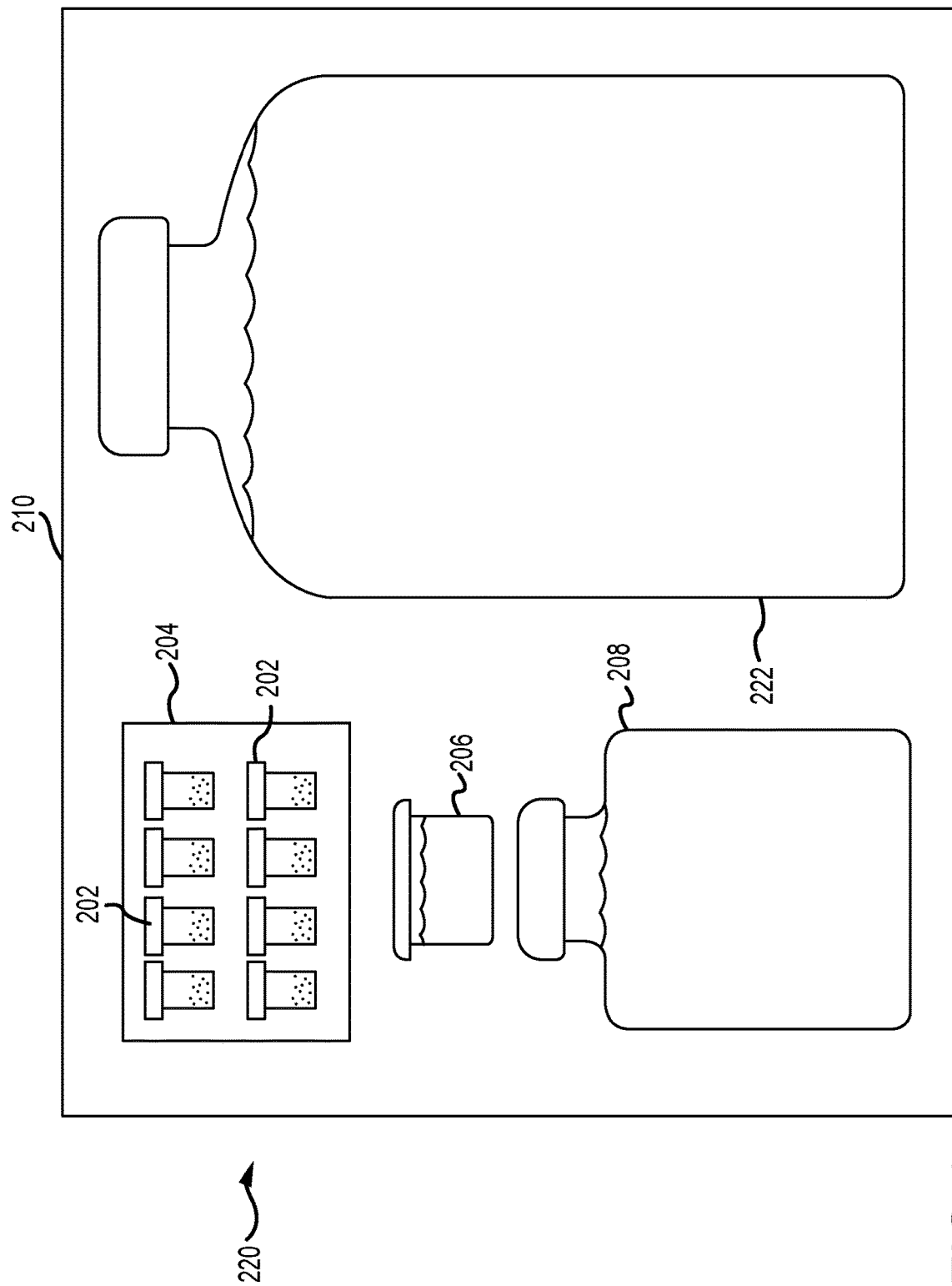
FIG. 15 illustrates another embodiment of a kit of this disclosure for fluorescent staining unassociated virus-size particles with multiple fluorogenic dyes for flow cytometry evaluation for the unassociated virus-size particles.

Reference is now made to FIG. 3, which illustrates an example embodiment of a kit 200 including a plurality of first sealed containers in the form of sealed vials 202 each containing a dry powder composition with a dry powder mixture of a plurality of different fluorogenic dyes each having a different fluorescent emission signature and each containing at least one aromatic group susceptible to pi stacking interactions in aqueous liquid media. Each sealed vial 202 may include a quantity of the dry powder composition to prepare an aqueous diluted dye formulation sufficient for staining a number of fluid samples to be processed contemporaneously for flow cytometry evaluation. The dry powder composition and fluorogenic dyes in the dry powder composition may have any or any combination of the features as described above. As shown in FIG. 3, the plurality of sealed vials 202 within the kit 200 are for convenience of manufacture and packaging contained within a bag 204. The kit 200 includes a second sealed container in the form of a sealed first bottle 206 containing a first liquid medium comprising preferably at least 34 percent by moles of DMSO, and more preferably a majority by moles of DMSO. The first liquid medium is provided in a in sufficient quantity to provide aliquots of the first liquid medium for use to prepare concentrated dye formulation batches for all of the dry powder composition in the vials 202. The first liquid medium may have any or any combination of the features as described above. The first liquid medium may be formulated for use directly to mix with and dissolve the fluorogenic dyes of the dry powder composition during first preparatory processing, or be formulated to be mixed with one or more other components (e.g., aqueous buffer and/or another organic solvent liquid) to prepare a liquid medium mixture for use as a final first liquid medium to dissolve the fluorogenic dyes during first preparatory processing. The kit 200 also includes a third sealed container in the form of a sealed second bottle 208 containing aqueous liquid diluent, for example in the form of aqueous buffer solution, in sufficient quantity to provide aliquots of the aqueous liquid diluent for use to prepare aqueous diluted dye formulation batches for all of the dry powder composition in the vials 202. The buffer solution may have any or any combination of the features as described above. The kit 200 includes the vials 202 within the bag 204 the first bottle 206 and the second bottle 208 all packaged in a common packaging enclosure 210, for example a common packaging box or bag. In alternative implementations, the kit 200 may include within the common packaging enclosure 210 one or more components in addition to those illustrated in FIG. 3 and discussed above. With continued reference to FIG. 3, when the stained fluid sample to be prepared with the kit 200 is to include dissolved disaccharide, some or all of such disaccharide may be included in the aqueous liquid diluent in the sealed second bottle 208 and/or in another reagent component (e.g., aqueous sample dilution liquid) that may be included with the kit 200 or provided separately from the kit 200. Reference is now made to FIG. 15, which illustrates another example embodiment of a kit 220. As illustrated in FIG. 15, the kit 220 includes the sealed vials 202, the bag 204, the sealed first bottle 206, the second sealed bottle 208 and the common packaging enclosure 210 as illustrated in and described in relation to FIG. 3. Additionally, the kit 220 includes a fourth sealed container in the form of a third sealed bottle 222 containing aqueous sample dilution liquid to prepare diluted fluid sample, for example to prepare a dilution series of fluid samples with the biological material diluted at different dilution factors for flow cytometry evaluation. Such aqueous sample dilution liquid may, for example, be an aqueous buffer solution. When the kit is to be used to prepare stained fluid samples including dissolved disaccharide, some or all of the disaccharide to be included in the stained fluid samples may be included in the aqueous liquid diluent in the second sealed bottle 208 and/or in the aqueous sample dilution liquid in the third sealed bottle 222.

In each of the example kit embodiments 200 and 220 illustrated in FIGS. 3 and 15, respectively, when the respective kit is to be used to prepare stained fluid samples including dissolved disaccharide, in a variation of the kit the first liquid medium in the first sealed bottle 206 may be free of DMSO, and may instead include one or other alternative organic liquid components (e.g., acetonitrile).

EXAMPLES

Combo Dye® reagent kits (Sartorius Stedim Biotech) include consumables for use to stain fluid samples with multiple fluorogenic dyes, including a first fluorogenic dye for nonspecific nucleic acid staining and a second fluorogenic dye for nonspecific protein staining for flow cytometry evaluation to quantify free virus particles (virions) in the fluid sample. Components of one example of a traditional Combo Dye® reagent kit include vials with aliquots of a dry powder dye composition including a dry powder mixture of a first fluorogenic dye of POPO™-3 iodide (Thermo Fischer Scientific) for nucleic acid staining and a second fluorogenic dye of SYPRO™ red (Thermo Fischer Scientific) for protein staining. The example kit also includes a container with acetonitrile from which aliquots of the acetonitrile may be withdrawn and added to vials containing the dry powder dye composition to dissolve the fluorogenic dyes of the dry powder mixture into the acetonitrile in a first step of preparing an aqueous dye formulation that is used to stain fluid samples for flow cytometry evaluation. The example kit also includes an aqueous stain preparation buffer solution used to add to and dilute the acetonitrile/dye solution in the vials to prepare an aqueous dye formulation in the vials for use to stain a number of fluid samples containing biological material to be subjected to flow cytometry evaluation for unassociated virus-size particles. The example kit also includes other components to provide a complete set of consumables for analyzing samples using the Virus Counter® 3100 flow cytometer (Sartorius Stedim Biotech), including sheath fluid, wash fluid, sample dilution buffer, inter-sample wash fluid, cleanliness verification fluid and performance validation standard. The sample dilution buffer and stain preparation buffer in the example kit is a sodium phosphate buffer and the stain preparation buffer in the example kit is a similar sodium phosphate buffer with added Tris-EDTA, with each buffer solution being at a pH of about 7.4.

In the examples below, all flow cytometry evaluation tests were performed using the Virus Counter® 3100 flow cytometer and the reagents used to prepare diluted fluid samples for flow cytometry evaluation, to prepare aqueous dye formulations to stain the diluted fluid samples and for operation of the Virus Counter® 3100 flow cytometer were the reagents of such an example Combo Dye® reagent kit, except for DMSO that was used in some tests instead of acetonitrile in the preparation of aqueous dye formulations to stain samples prior to flow cytometry. All fluid samples at the specified dilution factors were prepared as 100 microliter samples, to which 50 microliters of aqueous dye formulation was added for staining, and the resulting 150 microliter stained sample was subjected to flow cytometry evaluation. Virus particle counts are identified by the flow cytometer from detection of coincident peaks of the fluorescent emission signatures from both the nucleic acid stain and the protein stain. Quantitative results in terms of virus particle counts are stated below as concentration values of virus particles per milliliter (vp/mL) of the prepared sample prior to adding the aqueous dye formulation, and not relative to the volume of the stained fluid sample that includes the added aqueous dye formulation. For each dilution series test (or for each single point dilution test), three virus-containing fluid samples were prepared and stained with an aqueous dye formulation prepared using either acetonitrile or DMSO. A blank fluid sample was also prepared including the aqueous dye formulation diluted to the stained sample volume using the same sample dilution buffer, but containing no virus. All three stained virus-containing fluid samples and the blank sample were subjected to flow cytometry and virus particle count results reported below are of an arithmetic average (mean) of the flow cytometry results of the virus-containing fluid samples corrected for background by subtraction of background particle counts obtained from flow cytometry results of the blank sample. Values for c.v. for each dilution factor were calculated from the standard deviation of virus particles counts divided by the average concentration result. Preparation of the aqueous dye formulations and staining of the fluid samples for flow cytometry was generally performed as follows: Five microliters of a first liquid medium (either acetonitrile or DMSO, except in Example 6 using a mixture of DMSO and water) was added to a vial containing 2.8 microliters of the dry powder dye composition with the multiple fluorogenic dyes. The mixture in the vial was then vortexed briefly to assist dissolution of the dry powder mixture of the fluorogenic dyes into the first liquid medium. The mixture was then allowed to sit for an incubation time of from 5 to 15 minutes, following which the mixture was diluted through addition of 500 microliters of stain preparation buffer solution and that diluted mixture was briefly vortexed to prepare the aqueous dye formulation used to stain the fluid samples for flow cytometry evaluation. As will be appreciated, each such batch of prepared aqueous dye formulation is sufficient to stain 10 fluid samples of 100 microliters in volume for flow cytometry evaluation. Fluid samples were generally stained within 4 hours of preparing the aqueous dye formulation. After staining, samples were allowed to sit for a time of about 30 minutes while protected from light before being subjected to flow cytometry. Except for Example 1 below, incubation times were 5 minutes when using acetonitrile as the first liquid medium and 10 minutes when using DMSO as the first liquid medium.

Example 1: Comparison Precision with Different Incubation Times

A dilution series of fluid samples containing baculovirus was prepared with dilution factors of 10, 100, 1,000 and 10,000. Aqueous dye formulations were prepared according to the procedure summarized above with the incubation time for dissolving dry powder dye mixture in acetonitrile being varied from 5 to 15 minutes, prior to dilution with stain preparation buffer solution. Each prepared fluid sample (100 microliters) with baculovirus was stained by adding 50 microliters of the aqueous dye formulation, to prepare a first set of stained baculovirus fluid samples for flow cytometry evaluation. A second set of stained baculovirus samples was prepared using the same set of dilution factors by the same procedure as used to prepare the first set of stained samples, except using DMSO instead of acetonitrile to initially dissolve the dry powder mixture of the fluorogenic dyes during preparation of the aqueous dye formulation and using an incubation time of either 5 or 10 minutes.

The stained fluid samples for each dilution series of each set of samples and the corresponding blank samples were subjected to flow cytometry evaluation for quantification of free baculovirus particles in the stained fluid samples. Flow cytometry results for the acetonitrile tests are summarized in Table 1 and for the DMSO tests are summarized in Table 2.

Example 2: Comparison of Vial-to-Vial Precision within a Dry Powder Dye Composition Lot To assess the impact of the solvent change on vial-to-vial precision and viral counts, three vials of the dry powder dye composition from the same manufactured powder lot (batch) were used to prepare aqueous dye formulations to stain virus samples using acetonitrile and three other vials of the dry powder dye composition from the same manufactured powder lot were used to prepare aqueous dye formulations to stain virus samples using DMSO. Each vial was used to stain fluid samples of a dilution series of the virus sample. Dilution series were chosen to cross the dynamic range of the flow cytometry instrument (about $5 \times 10^5$ to about $1 \times 10^9$ virus particles per milliliter). The upper detection limit of the instrument is determined by coincidence of counts as well as

TABLE 1

| | | Acetonitrile Tests | | |
|---|---|---|---|---|
| Acetonitrile Incubation Time (min) | Dilution Factor | Virus Particle Concentration (vp/mL) as log value | Virus Particle Concentration per milliliter (vp/mL) as number value | Coefficient of Variation (c.v.) |
| 5 | 10 | 8.007 | $1.0 \times 10^8$ | 31.25% |
| 5 | 100 | 7.638 | $4.3 \times 10^7$ | 32.03% |
| 5 | 1,0000 | 6.218 | $1.7 \times 10^6$ | 49.83% |
| 5 | 10,0000 | 4.964 | $9.2 \times 10^4$ | 19.53% |
| 10 | 10 | 7.815 | $6.5 \times 10^7$ | 24.95% |
| 10 | 100 | 7.433 | $2.7 \times 10^7$ | 21.16% |
| 10 | 1,0000 | 5.808 | $6.4 \times 10^5$ | 28.99% |
| 10 | 10,0000 | 4.487 | $3.1 \times 10^4$ | 167.15% |
| 15 | 10 | 7.787 | $6.1 \times 10^7$ | 27.15% |
| 15 | 100 | 7.236 | $1.7 \times 10^7$ | 20.87% |
| 15 | 1,0000 | 5.665 | $4.6 \times 10^5$ | 44.85% |
| 15 | 10,0000 | 5.268 | $1.9 \times 10^5$ | 337.33% |

TABLE 2

| | | DMSO Tests | | |
|---|---|---|---|---|
| DMSO Incubation Time (min) | Dilution Factor | Corrected Virus Particle Concentration (vp/mL) as log value | Corrected Virus Particle Concentration per milliliter (vp/mL) as number value | Coefficient of Variation (c.v.) |
| 5 | 10 | 7.322 | $2.1 \times 10^7$ | 23.47% |
| 5 | 100 | 7.634 | $4.3 \times 10^7$ | 26.76% |
| 5 | 1,0000 | 6.487 | $3.1 \times 10^6$ | 44.32% |
| 5 | 10,0000 | 5.507 | $3.2 \times 10^5$ | 47.52% |
| 10 | 10 | 7.428 | $2.7 \times 10^7$ | 38.45% |
| 10 | 100 | 7.497 | $2.8 \times 10^7$ | 1.97% |
| 10 | 1,0000 | 6.435 | $2.7 \times 10^6$ | 18.47% |
| 10 | 10,0000 | 5.626 | $4.2 \times 10^5$ | 70.16% |

Extended incubation in the presence of acetonitrile did not reproducibly improve the c.v. of measurements taken within the linear range of the sample. However, extending the incubation to ten minutes in DMSO consistently and markedly improved the c.v.'s of measurements taken within that same range of dilution factors. Therefore, it appears as though an incubation time greater than 5 minutes is not beneficial for use of acetonitrile but is beneficial for use of DMSO, and in all tests in the Examples below an incubation time of 10 minutes was used for tests using DMSO and an incubation time of 5 minutes was used for tests using acetonitrile.

aggregation of viral particles. The lower limit of the instrument is set by statistics. Greater precision is generally anticipated in the middle portion of the dynamic range. To control for errors in pipetting, the dilution series were prepared as large batches that were then aliquoted for staining. Comparative test series were performed on samples of the following viruses: baculovirus (Kemp Bio), influenza A/Hong Kong/8/1968 (A/Hong Kong; ViraPur lot L1503), influenza B/Brisbane/60/2008 (B/Brisbane; ViraPur lot H1329B), Herpes Simplex Virus-1 (HSV-1; AGTC demonstration sample), Cowbone Ridge Virus (CRV; ATCC VR-1253, lot 214005), and lentivirus (Essen, lot LDA052217).

Figures 4, 5:
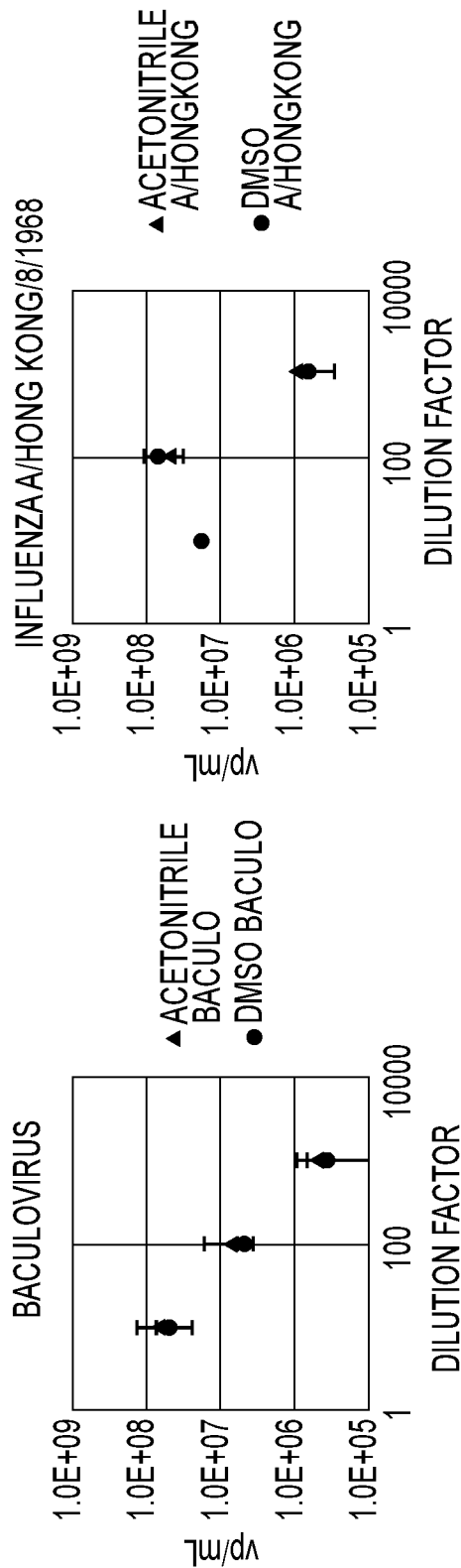
FIG. 4 is a plot of measured virus particle concentration vs. sample dilution factor for flow cytometry results for baculovirus samples stained using aqueous diluted dye formulations prepared using DMSO or acetonitrile in Example 2.
FIG. 5 is a plot of measured virus particle concentration vs. sample dilution factor for flow cytometry results for influenza a/Hong Kong/8/1968 virus samples stained using aqueous diluted dye formulations prepared using DMSO or acetonitrile in Example 2.
Figures 6, 7:
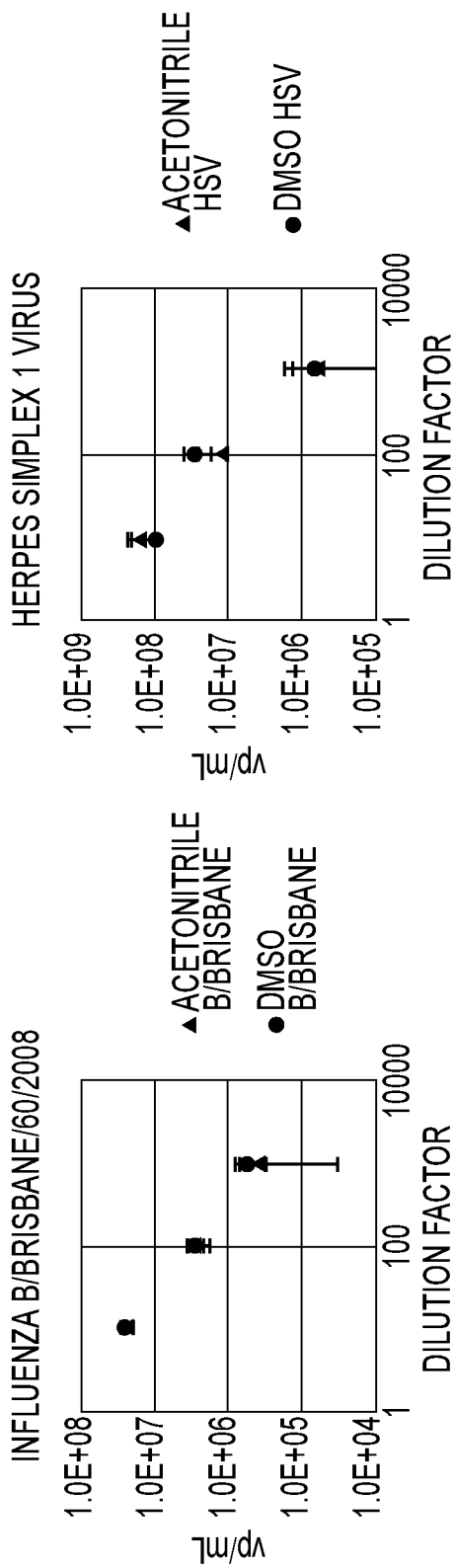
FIG. 6 is a plot of measured virus particle concentration vs. sample dilution factor for flow cytometry results for influenza B/Brisbane/60/2008 virus samples stained using aqueous diluted dye formulations prepared using DMSO or acetonitrile in Example 2.
FIG. 7 is a plot of measured virus particle concentration vs. sample dilution factor for flow cytometry results for Herpes Simplex Virus-1 samples stained using aqueous diluted dye formulations prepared using DMSO or acetonitrile in Example 2.

Flow cytometry results for comparative tests using DMSO vs. acetonitrile to prepare the aqueous dye formulation for sample staining are summarized in FIG. 4 and Table 3 for baculovirus, in FIG. 5 and Table 4 for influenza A/Hong Kong/8/1968, in FIG. 6 and Table 5 for influenza B/Brisbane/60/2008, in FIG. 7 and Table 6 for Herpes Simplex Virus-1, in FIG. 8 and Table 7 for Cowbone Ridge Virus, and in FIG. 9 and Table 8 for lentivirus. For each tested virus, the corresponding figure shows a plot of concentration of the virus particles in the fluid sample from the flow cytometry analysis vs dilution factor. Data above the lower limit of detection are plotted in FIGS. 4-9 with error bars representing two standard deviations. No difference in titer greater than two standard deviations was seen in any condition in any sample. For each tested virus, the corresponding table shows the calculated % c.v. for corrected virus particle concentration for the three tests at each tested dilution factor. For baculovirus, influenza B/Brisbane/60/2008 and Cowbone Ridge Virus, improved c.v. values were observed at all dilution factors in the dilution series using DMSO relative to using acetonitrile. Particularly striking improved c.v. values using DMSO were observed in the middle of the dilution series for all of the tested viruses, where the Virus Counter® 3100 tends to produce the most reliable data. The results indicate the use of DMSO to initially dissolve the dry powder dye composition provides, unexpectedly and surprisingly, superior performance in general across the different viruses tested.

TABLE 3

Baculovirus Tests

| Dilution Factor | 10 | 100 | 1000 |
| --- | --- | --- | --- |
| Acetonitrile Tests c.v. (%) | 53.3 | 63.5 | 54.1 |
| DMSO Tests c.v. (%) | 25.3 | 12.1 | 43.3 |

TABLE 4

Influenza A/Hong Kong/8/1968 Tests

| Dilution Factor | 10 | 100 | 1000 |
| --- | --- | --- | --- |
| Acetonitrile Tests c.v. (%) | 1.9 | 56.3 | 16.9 |
| DMSO Tests c.v. (%) | 6.4 | 27.1 | 27.6 |

TABLE 5

Influenza B/Brisbane/60/2008 Tests

| Dilution Factor | 10 | 100 | 1000 |
| --- | --- | --- | --- |
| Acetonitrile Tests c.v. (%) | 10.2 | 17.6 | 45.8 |
| DMSO Tests c.v. (%) | 3.5 | 12.3 | 23.0 |

TABLE 6

Herpes Simplex Virus-1 Tests

| Dilution Factor | 10 | 100 | 1000 |
| --- | --- | --- | --- |
| Acetonitrile Tests c.v. (%) | 18.6 | 69.6 | 69.6 |
| DMSO Tests c.v. (%) | 72.7 | 20.3 | 50.0 |

TABLE 7

Cowbone Ridge Virus Tests

| Dilution Factor | 100 | 1000 | 10,000 |
| --- | --- | --- | --- |
| Acetonitrile Tests c.v. (%) | 5.4 | 27.1 | 24.1 |
| DMSO Tests c.v. (%) | 4.9 | 6.6 | 6.1 |

TABLE 8

Lentivirus Tests

| Dilution Factor | 10 | 100 | 1000 |
| --- | --- | --- | --- |
| Acetonitrile Tests c.v. (%) | 24.5 | 65.0 | 32.6 |
| DMSO Tests c.v. (%) | 19.4 | 7.5 | 106.0 |

To further evaluate the vial-to-vial performance of the dry powder dye composition using DMSO as opposed to acetonitrile, c.v. values were compared for mean concentration counts obtained for diluted samples in the range of $1 \times 10^6$ to $1 \times 10^7$ virus particles per milliliter range. A high precision in results is particularly desirable within such a concentration range in the middle portion of the dynamic range of the Virus Counter® 3100 flow cytometer. As seen in FIGS. 4-9, such data was obtained for baculovirus at 100 dilution factor, for Influenza B/Brisbane/60/2008 at a dilution factor of 100, for Cowbone Ridge Virus at a dilution factor of 10,000 and for lentivirus at a dilution factor of 100. In the cases of influenza A/Hong Kong/8/1968 and Influenza A/Hong Kong/8/1968, this region was missed in the dilution series. In all of those cases, the c.v. values for tests using DMSO are all lower than 20%, which is remarkable and important in terms of precision performance. These results for DMSO are summarized in Table 9. Also, it is notable that the c.v. values for all of these tests summarized in Table 9 are significantly lower that the corresponding c.v. values for the corresponding tests using acetonitrile at those dilution factors for those viruses.

TABLE 9

| Tests With Mean Particle Concentration $1 \times 10^6$ to $1 \times 10^7$ vp/mL | | Results for DMSO Tests | | Corresponding Acetonitrile Tests |
| --- | --- | --- | --- | --- |
| Virus | Dilution Factor | Mean Virus Particle Concentration Count Using DMSO (vp/mL) | % c.v. | % c.v. |
| Baculovirus | 100 | $4.76 \times 10^6$ | 12.1 | 63.5 |
| B/Brisbane | 100 | $2.89 \times 10^6$ | 12.3 | 17.6 |
| CRV | 10,000 | $1.71 \times 10^6$ | 6.1 | 24.1 |
| Lentivirus | 100 | $4.66 \times 10^6$ | 7.5 | 65.0 |

Example 3: Comparison of Vial-to-Vial Precision Between Different Dry Powder Dye Composition Lots Testing according to the procedure of Example 2 comparing flow cytometry performance using DMSO vs. acetonitrile in the preparation of aqueous dye formulations for sample staining was performed using three different lots of the dry powder dye composition, which were manufactured on different batches on different dates. The different dry powder dye composition lots are identified as Lot #1, Lot #2 and Lot #3 below. Tests were performed on baculovirus and influenza B/Brisbane/60/2008 samples. Dilution series included dilution factors of 10, 100 and 1000. Results by powder lot are summarized for baculovirus tests in Table 10 and for influenza B/Brisbane/60/2008 virus tests in Table 11. No statistically significant change in virus particle concentration counts were observed between the different lots of dry powder dye composition. Notably, as seen in Tables 10 and 11, for each of the tested viruses the tests using DMSO in the preparation of aqueous dye formulations exhibited mostly improved c.v. profiles across the different dry powder dye composition lots than tests using acetonitrile. The c.v.'s remained generally equivalent or improved when DMSO was used relative to acetonitrile and the virus particle counts did not exhibit a statistically significant change.

TABLE 10

Baculovirus Tests

| | Dry Powder Dye Lot | | | | | | | | |
|---|---|---|---|---|---|---|---|---|---|
| | Lot #1 | | | Lot #2 | | | Lot #3 | | |
| Dilution Factor | 10 | 100 | 1000 | 10 | 100 | 1000 | 10 | 100 | 1000 |
| Acetonitrile % c.v. | 53.3 | 63.5 | 54.1 | 11 | 36.2 | 31.2 | 77.5 | 103 | 195 |
| DMSO % c.v. | 25.3 | 12.1 | 43.3 | 12.4 | 8.9 | 35.6 | 19.6 | 35.5 | 16.2 |

TABLE 11

Influenza B/Brisbane/60/2008 Tests

| | Dry Powder Dye Lot | | | | | | | | |
|---|---|---|---|---|---|---|---|---|---|
| | Lot #1 | | | Lot #2 | | | Lot #3 | | |
| Dilution Factor | 10 | 100 | 1000 | 10 | 100 | 1000 | 10 | 100 | 1000 |
| Acetonitrile % c.v. | 58.8 | 18.8 | 85.2 | 10.2 | 17.6 | 45.8 | 23.9 | 9.3 | 24.2 |
| DMSO % c.v. | 3.7 | 13 | 14.4 | 3.5 | 12.3 | 23 | 15.5 | 9.2 | 29.5 |

To summarize results of Example 2 and Example 3, vial-to-vial precision of flow cytometry was evaluated using DMSO vs. acetonitrile to prepare aqueous dye formulations using six different viral species and three lots of the dry powder dye composition. No statistically significant change in virus particle counts was observed, and either equivalent or improved precision in regions of the instrument's dynamic range, where viral particles can be more reliably quantitated, were observed using DMSO.

Example 4: Comparison of Sample-to-Sample Precision

Single-point dilutions of baculovirus and influenza B/Brisbane/60/2008 samples were made at a dilution factor of 100 and stained with aqueous dye formulations prepared using either DMSO or acetonitrile to initially dissolve the dry powder dye composition. The dilution samples for each solvent for each virus were stained using powder from a single vial of the dry powder dye composition. Flow cytometry results for the stained samples are summarized in Table 12. As shown in Table 12, for both the baculovirus and influenza B/Brisbane/60/2008 samples, the sample-to-sample c.v. was found to be lower for samples stained with aqueous dye formulations prepared using DMSO. As may be appreciated, due to the test design, it is not possible to comment on whether or not the observed differences in titer (concentration counts) are a result of the aqueous dye preparation method or the variability between vials of dry powder dye composition used for the baculovirus and influenza B/Brisbane/60/2008 virus tests, respectively.

TABLE 12

| | Baculovirus | | Influenza B/Brisbane/60/2008 | |
| --- | --- | --- | --- | --- |
| | Mean Concentration ± 1 σ (vp/mL) | % c.v. | Mean Concentration ± 1 σ (vp/mL) | % c.v. |
| Acetonitrile | $6.93 \times 10^5 \pm 7.60 \times 10^4$ | 11.0 | $1.29 \times 10^6 \pm 1.26 \times 10^5$ | 9.3 |
| DMSO | $1.99 \times 10^6 \pm 6.00 \times 10^4$ | 3.0 | $9.77 \times 10^5 \pm 5.42 \times 10^4$ | 5.5 |

Example 5: Precision Comparison Between Different Instruments and Personnel

Single dilution tests as described in Example 4 were performed at a single dilution point for lentivirus (at 100 dilution factor) and Cowbone Ridge Virus (at 10,000 dilution factor) samples on four different Virus Counter® 3100 flow cytometer instruments located at the same facility. For each virus test for each first liquid medium (DMSO and acetonitrile), all samples were stained using aqueous dye formulation prepared from a single vial of dry powder dye composition. Each instrument was assigned a different operator and each operator carried out the experiment independently according to the same procedure. One of the instruments consistently yielded results about ten-fold below the others (instrument labeled 3062 in the data tables). This could have been caused by either a bad lot of dry powder dye composition or a poorly performing instrument. However, investigation revealed that the lot used for the test performed on instrument 3062 had previously been used for other experiments without such an anomalistic ten-fold drop in counts. It was therefore concluded that instrument 3062 had probably experienced either an optics or fluidics problem that caused it to under-count samples by approximately an order of magnitude. Results are summarized in Table 13 for lentivirus and Table 14 for Cowbone Ridge Virus, including results for instrument 3062. In terms of precision, in all cases but one the c.v. values for samples of both viruses stained with aqueous dye formulations prepared using DMSO were effectively equivalent to or less than those samples stained with aqueous dye formulations prepared using acetonitrile. The lone exception was seen in the Cowbone Ridge Virus data taken on instrument 3056, but even for that one anomaly the c.v. using DMSO was reasonably low (19.9%). Again, due to how the tests were designed, it is not possible to comment on whether or not the observed differences in concentration counts between the different reported tests are a result of the aqueous dye formulation preparation method or the variability among different vials of dry powder dye composition used in the different tests.

TABLE 13

| | Lentivirus | | | |
| --- | --- | --- | --- | --- |
| Flow | Acetonitrile Tests | | DMSO Tests | |
| Cytometer Instrument | Mean Concentration ± 1 σ (vp/mL) | % c.v. | Mean Concentration ± 1 σ (vp/mL) | % c.v. |
| 3026 | $6.95 \times 10^8 \pm 7.38 \times 10^7$ | 10.6 | $5.37 \times 10^8 \pm 4.13 \times 10^7$ | 7.7 |
| 3056 | $1.1 \times 10^9 \pm 1.50 \times 10^8$ | 13.2 | $5.5 \times 10^8 \pm 6.90 \times 10^7$ | 12.6 |
| 3060 | $3.46 \times 10^8 \pm 1.76 \times 10^7$ | 5.1 | $5.9 \times 10^8 \pm 3.52 \times 10^7$ | 6.0 |
| 3062 | $9.29 \times 10^7 \pm 5.23 \times 10^6$ | 5.6 | $7.6 \times 10^7 \pm 1.60 \times 10^6$ | 2.1 |

TABLE 14

| | Cowbone Ridge Virus | | | |
| --- | --- | --- | --- | --- |
| Flow | Acetonitrile Tests | | DMSO Tests | |
| Cytometer Instrument | Mean Concentration ± 1 σ (vp/mL) | % c.v. | Mean Concentration ± 1 σ (vp/mL) | % c.v. |
| 3026 | $2.09 \times 10^{10} \pm 5.36 \times 10^9$ | 25.7 | $1.7 \times 10^{10} \pm 3.54 \times 10^9$ | 20.8 |
| 3056 | $3.04 \times 10^{10} \pm 3.79 \times 10^9$ | 12.5 | $2.28 \times 10^{10} \pm 4.52 \times 10^9$ | 19.9 |
| 3060 | $2.77 \times 10^{10} \pm 6.76 \times 10^9$ | 24.4 | $2.16 \times 10^{10} \pm 4.24 \times 10^9$ | 19.6 |
| 3062 | $3.24 \times 10^9 \pm 2.96 \times 10^8$ | 9.1 | $4.36 \times 10^9 \pm 8.88 \times 10^8$ | 10.3 |

Example 6: DMSO Reagent Stability

DMSO is highly hygroscopic and susceptible to absorption of moisture from the atmosphere when exposed to the ambient environment, either during a staining operation or when a reagent container with DMSO is opened between uses. Tests were performed to assess potential impacts of water absorption into DMSO reagent on stain preparation and flow cytometry performance and precision. In the tests, fresh vials of anhydrous DMSO were spiked with water to provide water concentrations of 5, 10, 20, 25, and 33% v/v (volume of added water relative to total volume of the water/DMSO mixture). Sample-to-sample precision of flow cytometry was then evaluated on samples of influenza B/Brisbane/60/2008 virus stained with aqueous dye formulations prepared from the dry powder dye composition with use of the different spiked DMSO samples as the first liquid medium for first preparatory processing to dissolve the dry powder dye composition prior to dilution with buffer to form the final aqueous dye formulation used to stain the virus-containing fluid samples. Flow cytometry results for the stained samples are summarized in Table 15. As seen in Table 15, c.v. values remained at 20% or below for all tested water additions except for the test at water content of 33% by weight. Table 15 also summarizes the content of DMSO in each tested liquid medium in % DMSO by moles.

TABLE 15

| % Water (v/v) | DMSO Content % by Moles | Mean Concentration ± 1 σ (vp/mL) | % c.v. |
|---|---|---|---|
| 0 | 100 | $9.56 \times 10^6 \pm 1.92 \times 10^6$ | 20 |
| 5 | 83 | $1.01 \times 10^7 \pm 8.21 \times 10^5$ | 8 |
| 10 | 70 | $9.33 \times 10^6 \pm 1.37 \times 10^6$ | 15 |
| 20 | 50 | $9.87 \times 10^6 \pm 1.15 \times 10^6$ | 12 |
| 25 | 43 | $1.14 \times 10^7 \pm 9.86 \times 10^5$ | 9 |
| 33 | 34 | $6.20 \times 10^6 \pm 1.48 \times 10^6$ | 24 |

Figure 10:
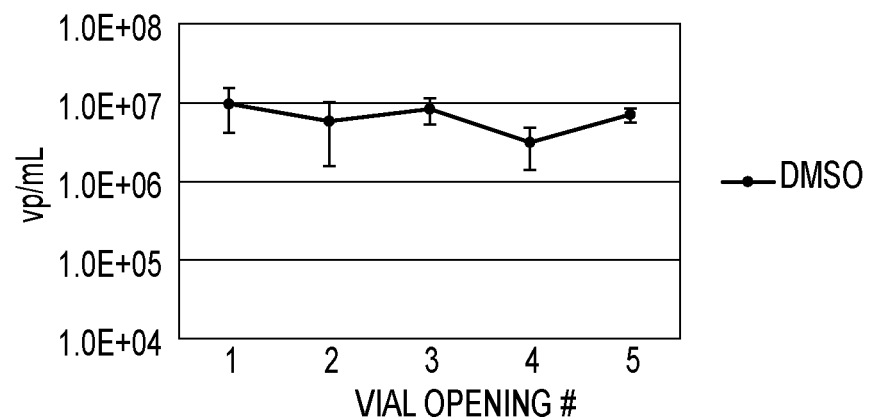
FIG. 10 is a plot of measured virus concentration for flow cytometry results of baculovirus samples stained using aqueous diluted dye formulations prepared using DMSO from a storage container after successive openings in Example 6.
Figure 11:
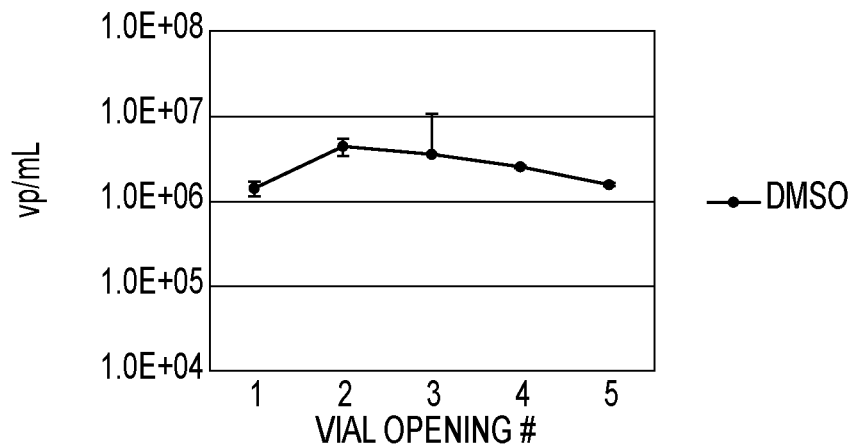
FIG. 11 is a plot of measured virus concentration for flow cytometry results of baculovirus samples stained using aqueous diluted dye formulations prepared using DMSO from a storage container after successive openings in Example 6.

To evaluate the effect of reopening vials, tests were performed in which samples of baculovirus and influenza B/Brisbane/60/2008 were stained using aqueous dye formulations prepared using DMSO withdrawn from a vial after each of five successive openings of the vial in the preparation of aqueous dye formulations from the dry powder dye composition. Prior to the first opening, the vial contained anhydrous DMSO. Tests were performed on three samples at the same dilution factor for each virus and with a blank sample for concentration correction. Flow cytometry results in terms of virus particle concentrations measured after each sequential opening of the DMSO vial are summarized in FIG. 10 for baculovirus and in FIG. 11 for influenza B/Brisbane/60/2008, which show plots of virus particle concentration for the fluid samples stained using DMSO withdrawn from the vial with each successive opening of the vial. All samples were at the same dilution factor (100), and there was no observed statistically significant change in virus particle counts for the different successive openings of the vial, as seen in FIGS. 10 and 11. It is noted that these experiments were conducted in Arvada, Colorado, U.S.A., where the relative humidity is often very low and may not be indicative of conditions in more humid regions.

Figure 12:
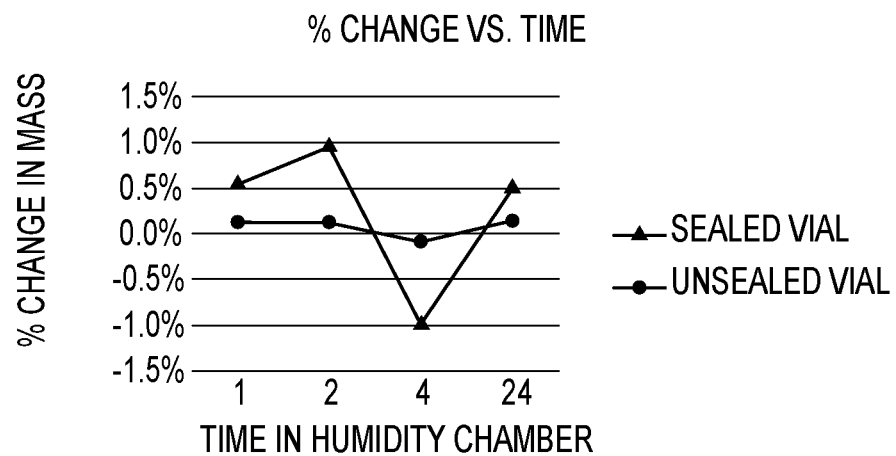
FIG. 12 is a plot of measured virus concentration for flow cytometry results of baculovirus samples stained using aqueous diluted dye formulations prepared using DMSO after exposure to a humid environment for different time periods in Example 6.
Figure 13:
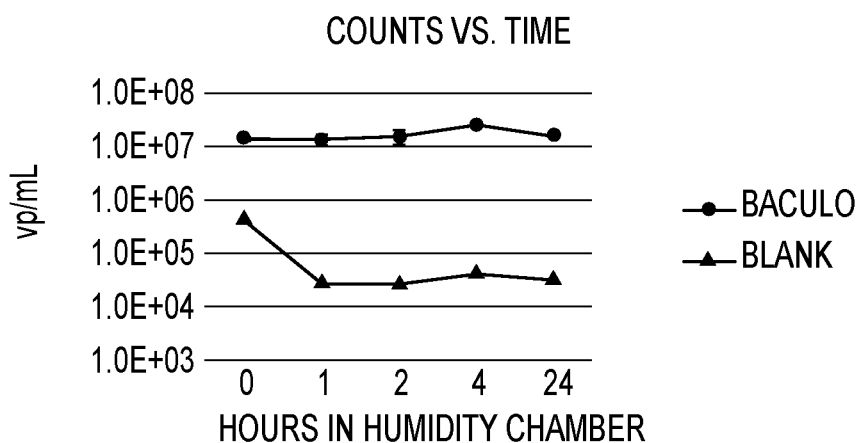
FIG. 13 is a plot of virus particle concentration count for flow cytometry tests in Example 6.

To further evaluate effects of repeated opening of DMSO containers in more humid environments, additional tests were performed in which two vials initially containing 1 mL of anhydrous DMSO were placed in a humidity chamber consisting of two damp paper towels in a four inch by six inch plastic zip-lock bag. One vial was left sealed and the other was reopened multiple times over the course of the study. Both vials were weighed on a Mettler AE240 analytic balance, first before placement in the humidity chamber and then at 1, 2, 4, and 24 hour intervals. At each time interval, 5 μL of DMSO was withdrawn from the opened vial and used dissolve dry powder dye composition and to prepare an aqueous dye formulation for staining virus samples. To account for this loss of volume, weight measurements were made of each unsealed vial both before and after extraction of the 5 μL volume. The pre-extraction mass at the time of each DMSO withdrawal was compared to the post-extraction mass of the previous timepoint. The mass of both sealed and opened vials never changed by more than 1%, as summarized in FIG. 12. It was noticed that the labels on the DMSO vials became saturated with water over the course of the study, though during the two to four hour interval the label on the sealed vial dried. This was due to how the vial was lying in the humidity chamber during the interval and was observed in the drop in mass the vial underwent during that time. Upon return to the humidity chamber, the vial fell into a position where the label was able to again become resaturated and thus the mass of the vial increased again (as seen in FIG. 12). To assess stain performance, aqueous dye formulations prepared using each withdrawn sample of DMSO were used to stain baculovirus samples at each time point, and results of the flow cytometry analysis of the stained samples are summarized in FIG. 13, showing a plot of virus particle concentration count for samples stained with aqueous dye formulation prepared using DMSO for each time point of exposure to the humidity chamber. All samples were diluted by the same dilution factor (100). No statistically significant changes in virus particle counts were observed. From these results, anhydrous DMSO as packaged in vials for staining reagent kits appears sufficiently stable for storage and repeated opening and use in humid environments.

Example 7: Aqueous Diluted Stain Formulation Stability

Three concentrated dye formulations are prepared to a total volume of 5 microliters in DMSO, one containing only POPO™-3 iodide stain (Concentrated Dye Formulation 1), one containing only SYPRO™ Red stain (Concentrated Dye Formulation 2) and the third containing both POPO™-3 iodide stain and SYPRO™ Red stain (Concentrated Dye Formulation 3). Each concentrated dye formulation contained a quantity of each respective stain comparable to the amount of the stain contained in a 2.8 microliter dry powder dye composition of a typical Combo Dye® reagent kit vial. The concentrated dye formulations with only a single fluorogenic dye were prepared by dilution of the manufacturer's liquid formulation with DMSO to a total volume of 5 microliters and the concentrated dye formulation containing both fluorogenic dyes is prepared from a dry powder dye composition by reconstitution in 5 microliters of DMSO. A first portion of each concentrated dye formulation is then diluted 500:1 v/v with regular aqueous stain preparation buffer solution (no added DMSO) to prepare an aqueous diluted dye formulation and a second portion of each concentrated dye formulation is preserved in a sealed vial.

To test stability of the aqueous diluted dye formulations, each aqueous diluted dye formulation was subjected to absorption spectroscopy immediately following preparation (time zero) and at times of 20 minutes, 60 minutes and 240 minutes following preparation for evaluation for spectral wavelength of peak absorbance and the peak absorbance value. At 240 minutes, the preserved second portion of each concentrated dye formulation was used to prepare a fresh aqueous diluted dye formulation at that time, and each freshly prepared diluted dye formulation was also subjected to absorption spectroscopy evaluation. Results are summarized in Table 16 summarizing peak absorbance wavelength and Table 17 summarizing peak absorbance value for the absorption from spectroscopy evaluations. As seen in Tables 16 and 17, after dilution into water, the dye mixtures exhibited a shift in peak absorbance wavelength towards the red portion of the spectrum (longer wavelength) and with reduced magnitude of peak absorbance, and these effects are much more pronounced in the dye mixtures containing SYPRO™ Red stain, indicating a particular problem with that dye thought to be associated with its high level of hydrophobicity. Results for the freshly prepared aqueous diluted dye formulations prepared after the concentrated dye formulation sat for 240 minutes show results generally more comparable to those tested at time zero in the time series, suggesting that the spectral shifts are primarily attributable to the exposure to the aqueous buffer solution used to prepare the aqueous diluted dye formulations.

TABLE 16

| Concentrated Dye Formulation | Peak Absorbance Wavelength (nm) | | | | Fresh Diluted Dye Formulation |
|---|---|---|---|---|---|
| | Diluted Dye Formulations at Times Following Preparation | | | | |
| | 0 minutes | 20 minutes | 60 minutes | 240 minutes | |
| 1 | 517 | 524 | 530 | 528 | 518 |
| 2 | 487 | 514 | 530 | 540 | 471 |
| 3 | 514 | 534 | 543 | 540 | 511 |

TABLE 17

| Concentrated Dye Formulation | Peak Absorbance Value (absorbance units) | | | | Fresh Diluted Dye Formulation |
|---|---|---|---|---|---|
| | Diluted Dye Formulations at Times Following Preparation | | | | |
| | 0 minutes | 20 minutes | 60 minutes | 240 minutes | |
| 1 | .069 | .063 | 0.037 | 0.044 | 0.107 |
| 2 | .372 | .274 | 0.205 | 0.1 | 0.352 |
| 3 | .496 | .296 | 0.205 | 0.202 | 0.507 |

Additional tests similar to those above are performed on diluted dye formulations prepared from concentrated dye formulation corresponding to Dye Formulation 3, containing both POPO™-3 iodide stain and SYPRO™ Red stain, except that in some of the tests the aqueous diluted dye formulations are prepared using a modified aqueous stain buffer solution made by adding a quantity of DMSO to the regular aqueous stain buffer solution to prepare a series of aqueous stain buffer solution compositions containing no DMSO (regular buffer solution), 15% by volume DMSO, 20% by volume DMSO, 30% by volume DMSO and 50% by volume DMSO. Each aqueous diluted dye formulation is subjected to absorbance spectroscopy evaluation at the time that preparation is completed and at 60 and 120 minutes following preparation to determine peak absorbance wavelength and peak absorbance value, and results are summarized in Table 18 summarizing peak absorbance wavelength and Table 19 summarizing peak absorbance value for the absorption from spectroscopy evaluations. As seen in tables 18 and 19, the previously identified peak absorbance wavelength shifts to a longer wavelength over time were essentially removed for all tests including DMSO in the aqueous stain buffer solution used to prepare the aqueous diluted dye formulations. The time-dependent decrease in peak absorbance value is less for all tests using DMSO, with the time-dependent decrease essentially being removed for tests in which the aqueous stain buffer solution is prepared with 20% or more DMSO.

TABLE 18

| DMSO In Stain Buffer volume % | Peak Absorbance Wavelength (nm) | | |
|---|---|---|---|
| | Diluted Dye Formulations at Times Following Preparation | | |
| | 0 minutes | 60 minutes | 120 minutes |
| 0 | 511 | 526 | 537 |
| 15 | 553 | 553 | 553 |
| 20 | 553 | 553 | 553 |
| 30 | 548 | 548 | 548 |
| 50 | 554 | 554 | 554 |

TABLE 19

| DMSO In Stain Buffer volume % | Peak Absorbance Value (nm) | | |
|---|---|---|---|
| | Diluted Dye Formulations at Times Following Preparation | | |
| | 0 minutes | 60 minutes | 120 minutes |
| 0% | 0.467 | 0.265 | 0.179 |
| 15% | 0.521 | 0.421 | 0.403 |
| 20% | 0.583 | 0.556 | 0.584 |
| 30% | 0.671 | 0.71 | 0.704 |
| 50% | 0.807 | 0.727 | 0.801 |

Example 8: Blank Particle Counts

Concentrated dye formulations with both POPO™-3 iodide stain and SYPRO™ Red stain were prepared in 5 microliters of DMSO from 2.8 microliters of dry powder dye composition and then diluted 500:1 by volume with regular aqueous stain preparation buffer (no added DMSO) to prepare an aqueous diluted dye formulation with both fluorogenic dyes. Three replicate blank fluid samples containing no particles for evaluation were then prepared by adding 50 microliters of the diluted aqueous dye formulation to 100 microliters of regular sample dilution buffer, to prepare blank fluid sample of 150 microliters volume. The blank fluid samples were subjected to flow cytometry evaluation and particle counts were separately evaluated on detection channel 1 (detecting for the emission of signature from POPO™-3 iodide stain) and detection channel 2 (detecting for the emission signature from SYPRO™ Red stain) of the Virus Counter® 3100 flow cytometer to determine a background blank particle count separately for each fluorogenic dye. Average blank particle counts on detection channel 1 (POPO™-3 iodide stain) were relatively low, on the order of $10^5$ blank particle counts per milliliter, whereas average blank particle counts on detection channel 2 (SYPRO™ Red stain) were on the order of $10^7$ blank particle counts per milliliter.

Additional tests were performed in which such a concentrated dye formulation with both fluorogenic dyes are diluted with modified aqueous stain preparation buffer to prepare aqueous diluted dye formulations. The modified aqueous stain preparation buffer is prepared with the same composition as regular aqueous stain preparation buffer, except also including 15% w/v percent dissolved sugar, which when diluted at a 1:2 volume dilution ratio with sample dilution buffer to prepare the blank fluid sample results in the blank fluid sample containing 5% w/v of the dissolved sugar as fed to the flow cytometer. Sugars tested include a monosaccharide (galactose), disaccharides (sucrose, lactose and trehalose) and trisaccharides (maltotriose and raffinose). The monosaccharide galactose was found to detrimentally increase blank counts on detection channel 1. The trisaccharides maltotriose and raffinose did not improve blank particle count performance, and with maltotriose increasing blank counts on detection channel 2. All of the tested disaccharides sucrose, lactose and trehalose significantly reduced blank particle counts on detection channel 2, with trehalose exhibiting the greatest reduction.

EXEMPLARY IMPLEMENTATION COMBINATIONS

Some other contemplated embodiments of implementation combinations for various aspects of this disclosure, with or without additional features as disclosed above or elsewhere herein, are summarized in the numbered paragraphs presented below:

1. A method for flow cytometry evaluation of a fluid sample for unassociated virus-size particles stained with multiple fluorogenic dyes susceptible to pi stacking interactions in aqueous liquids, the method comprising:
   first preparatory processing to prepare an concentrated dye formulation with a plurality of different fluorogenic dyes each having a different fluorescent emission signature and each containing at least one aromatic group susceptible to pi stacking interactions in aqueous liquids, the first preparatory processing comprising dissolving the fluorogenic dyes into a first liquid medium from a dry powder dye composition with a dry powder mixture of the plurality of different fluorogenic dyes, wherein the first liquid medium comprises dimethyl sulfoxide (DMSO) and the plurality of different fluorogenic dyes includes at least a first fluorogenic dye with a first fluorescent emission signature and a second fluorogenic dye with a second fluorescent emission signature that is different than the first fluorescent emission signature;
   after the first preparatory processing, second preparatory processing while the fluorogenic dyes remain in solution to prepare an aqueous diluted dye formulation comprising the plurality of different fluorogenic dyes dissolved in an aqueous liquid medium, the second preparatory processing comprising diluting the first liquid medium with aqueous liquid diluent;
   preparing a stained fluid sample for flow cytometry evaluation, comprising mixing at least a portion of the aqueous diluted dye formulation with a sample of biological material to be evaluated by flow cytometry for presence of the unassociated virus-size particles;
   after the preparing, subjecting the stained fluid sample to flow cytometry in a flow cytometer to detect and count occurrences of the unassociated virus-size particles stained with the both the first fluorogenic dye and the second fluorogenic dye.

2. The method of paragraph 1, wherein the second preparatory processing comprises diluting the first liquid medium with the aqueous liquid diluent at a volume ratio of the aqueous liquid diluent to the first liquid medium of at least 10:1.

3. The method of either one of paragraph 1 or paragraph 2, wherein during the second preparatory processing, the first liquid medium is diluted with the aqueous liquid diluent to prepare the aqueous liquid medium with a weight ratio of water to DMSO of at least 10:1.

4. The method of either one of paragraph 1 or paragraph 2, wherein during the second preparatory processing, the first liquid medium is diluted with the aqueous liquid diluent to prepare the aqueous liquid medium with a weight ratio of water to DMSO of at least 10:7, at least 10:6, at least 10:5, at least 10:4, at least 10:3, at least 10:2.5, at least 10:2 or at least 10:1.5.

5. The method of any one of paragraphs 1-4, wherein during the second preparatory processing, the first liquid medium is diluted with the aqueous liquid diluent to prepare the aqueous liquid medium to contain a weight percentage of DMSO of at least 1 weight percent, at least 2 weight percent, at least 5 weight percent, at least 7 weight percent, at least 10 weight percent, at least 12 weight percent, at least 15 weight percent, at least 17 weight percent or at least 20 weight percent.

6. The method of any one of paragraphs 1-5, wherein during the second preparatory processing, the first liquid medium is diluted with the aqueous liquid diluent to prepare the aqueous liquid medium to contain a weight percentage of DMSO of not greater than 50 weight percent, not greater than 45 weight percent, not greater than 40 weight percent, not greater than 35 weight percent, not greater than 30 weight percent, not greater than 25 weight percent, not greater than 22 weight percent, not greater than 18 weight percent, not greater than 16 weight percent, not greater than 13 weight percent, not greater than 11 weight percent, not greater than 8 weight percent or not greater than 6 weight percent.

7. The method of any one of paragraphs 1-6, wherein during the second preparatory processing, the first liquid medium is diluted with the aqueous liquid diluent to prepare the aqueous liquid medium to contain a weight percentage of DMSO in a range having a lower limit and an upper limit;
   wherein the lower limit is 1 weight percent, 2 weight percent, 5 weight percent, 7 weight percent, 10 weight percent, 12 weight percent, 15 weight percent, 17 weight percent or 20 weight percent; and
   the upper limit is 50 weight percent, 45 weight percent, 40 weight percent, 35 weight percent, 30 weight percent, 25 weight percent, 22 weight percent, 18 weight percent, 16 weight percent, 13 weight percent, 11 weight percent, 8 weight percent or 6 weight percent;
   provided that the upper limit is larger than the lower limit; and in one preferred option the lower limit is 10 weight percent DMSO and the upper limit is 30 weight percent DMSO, and in another preferred option the lower limit is 15 weight percent DMSO and the upper limit is 25 weight percent DMSO.

8. The method of any one of paragraphs 1-7, wherein the concentrated dye formulation consists essentially of the plurality of different fluorogenic dyes and the first liquid medium.

9. The method of any one of paragraphs 1-8, wherein the concentrated dye formulation consists essentially of the first fluorogenic dye, the second fluorogenic dye and the first liquid medium.

10. The method of any one of paragraphs 1-9, wherein the concentrated dye formulation consists essentially of the plurality of different fluorogenic dyes and DMSO.

11. The method of any one of paragraphs 1-10, wherein the concentrated dye formulation consists essentially of the first fluorogenic dye, the second fluorogenic dye and DMSO.

12. The method of any one of paragraphs 1-11, wherein the weight ratio of water to DMSO in the aqueous liquid medium is at least 50:1.

13. The method of any one of paragraphs 1-12, wherein the weight ratio of water to DMSO in the aqueous liquid medium is not larger than 1000:1.
14. The method of any one of paragraphs 1-13, wherein the aqueous diluted dye formulation comprises at least 90 weight percent water.
15. The method of any one of paragraphs 1-14, wherein a molar concentration of the first fluorogenic dye and a molar concentration of the second fluorogenic dye in the aqueous diluted dye formulation are each in a range of from 0.1 to 2000 micromoles per liter.
16. The method of any one of paragraphs 1-15, wherein a weight-to-volume concentration of the first fluorogenic dye and a weight-to-volume concentration of the second fluorogenic dye in the aqueous diluted dye formulation are each in a range of from 1 to 1000 micrograms per milliliter.
17. The method of any one of paragraphs 1-16, wherein a concentration of the first fluorogenic dye and a concentration of the second fluorogenic in the concentrated dye formulation are each at least 10 times as large as a corresponding concentration in the aqueous diluted dye formulation.
18. The method of any one of paragraphs 1-17, wherein the first preparatory processing comprises mixing the dry powder dye composition with the first liquid medium and after the mixing permitting the resulting mixture to sit for a residence time of at least 7 minutes prior to diluting the first liquid medium with the aqueous liquid diluent during the second preparatory processing.
19. The method of any one of paragraphs 1-18, wherein the stained fluid sample as prepared during the preparing comprises a dissolved disaccharide.
20. A method for flow cytometry evaluation of a fluid sample for unassociated virus-size particles stained with multiple fluorogenic dyes susceptible to pi stacking interactions in aqueous liquids, the method comprising:
first preparatory processing to prepare a concentrated dye formulation with a plurality of different fluorogenic dyes each having a different fluorescent emission signature and each containing at least one aromatic group susceptible to pi stacking interactions in aqueous liquids, the first preparatory processing comprising dissolving the fluorogenic dyes into a first liquid medium from a dry powder dye composition with a dry powder mixture of the plurality of different fluorogenic dyes, wherein the first liquid medium comprises an organic liquid component and the plurality of different fluorogenic dyes includes at least a first fluorogenic dye with a first fluorescent emission signature and a second fluorogenic dye with a second fluorescent emission signature that is different than the first fluorescent emission signature;
after the first preparatory processing, second preparatory processing while the fluorogenic dyes remain in solution to prepare an aqueous diluted dye formulation comprising the plurality of different fluorogenic dyes dissolved in an aqueous liquid medium, the second preparatory processing comprising diluting the first liquid medium with aqueous liquid diluent;
preparing a stained fluid sample for flow cytometry evaluation, comprising mixing at least a portion of the aqueous diluted dye formulation with a sample of biological material to be evaluated by flow cytometry for presence of the unassociated virus-size particles; and
after the preparing, subjecting the stained fluid sample to flow cytometry in a flow cytometer to detect and count occurrences of the unassociated virus-size particles stained with the both the first fluorogenic dye and the second fluorogenic dye;
wherein stained fluid sample as prepared during the preparing comprises a dissolved disaccharide.
21. The method of either one of paragraph 19 or paragraph 20, wherein the stained fluid sample as prepared during the preparing comprises the dissolved disaccharide at a concentration of at least at least 1 weight percent, at least 2 weight percent, at least 3 weight percent or at least 4 weight percent.
22. The method of any one of paragraphs 19-21, wherein the stained fluid sample as prepared during the preparing comprises the dissolved disaccharide at a concentration not greater than 15 weight percent, not greater than 12 weight percent, not greater than 10 weight percent or not greater than 8 weight percent.
23. The method of any one of paragraphs 19-22, wherein the preparing comprises mixing at least a portion of the aqueous diluted dye formulation with a preliminary fluid sample containing the biological material, and wherein the preliminary fluid sample comprises a disaccharide to provide at least a portion of the dissolved disaccharide in the stained fluid sample.
24. The method of paragraph 23, wherein the disaccharide in the preliminary fluid sample is at a concentration of at least at least 1 weight percent, at least 1.5 weight percent, at least 2 weight percent, at least 3 weight percent, at least 4 weight percent, at least 4.5 weight percent or at least 6 weight percent.
25. The method of either one of paragraph 23 or paragraph 24, wherein the disaccharide in the preliminary fluid sample is at a concentration of not greater than 22.5 weight percent, not greater than 18 weight percent, not greater than 15 weight percent or not greater than 12 weight percent, not greater than 10 weight percent, or not greater than 8 weight percent and preferably is at a concentration of not greater than 20 weight percent.
26. The method of any one of paragraphs 23-25, comprising preparing the preliminary fluid sample prior to the preparing the stained fluid sample, wherein the preparing the preliminary fluid sample comprises:
mixing the biological material with an aqueous sample dilution liquid, wherein the aqueous sample dilution liquid comprises a disaccharide to provide at least a portion of the disaccharide for the preliminary fluid sample.
27. The method of paragraph 26, wherein the disaccharide in the aqueous sample dilution liquid is at a concentration of at least 1 weight percent, at least 1.5 weight percent, at least 2 weight percent, at least 3 weight percent, at least 4 weight percent at least 4.5 weight percent or at least 6 weight percent.
28. The method of either one of paragraph 26 or paragraph 27, wherein the disaccharide in the aqueous sample dilution liquid is at a concentration of not greater than 22.5 weight percent, not greater than 18 weight percent, not greater than 15 weight percent or not greater than 12 weight percent, not greater than 10 weight percent, or not greater than 8 weight percent.

29. The method of any one of paragraphs 23-28, wherein the disaccharide in the preliminary fluid sample provides essentially all of the dissolved disaccharide in the stained fluid sample.

30. The method of any one of paragraphs 19-28, wherein the aqueous diluted dye formulation comprises a disaccharide to provide at least a portion of the dissolved disaccharide in the stained fluid sample.

31. The method of any one of paragraphs 19-23, wherein the aqueous diluted dye formulation comprises a disaccharide to provide essentially all of the dissolved disaccharide in the stained fluid sample.

32. The method of either one of paragraph 30 or paragraph 31, wherein the disaccharide in the aqueous diluted dye formulation is at a concentration of at least 1 weight percent, at least 2 weight percent, at least 3 weight percent, at least 4 weight percent, at least 6 weight percent, at least 9 weight percent or at least 12 weight percent.

33. The method of any one of paragraphs 30-32, wherein the disaccharide in the aqueous diluted dye formulation is at a concentration of not greater than 45 weight percent, not greater than 36 weight percent, not greater than 30 weight percent, not greater than 24 weight percent, not greater than 15 weight percent, not greater than 10 weight percent or not greater than 8 weight percent.

34. A kit for fluorescent staining unassociated virus-size particles with multiple fluorogenic dyes for flow cytometry evaluation for the unassociated virus-size particles in a fluid sample, the kit comprising:
a dry powder dye composition in a first sealed container, the dry powder dye composition comprising a dry powder mixture of a plurality of different fluorogenic dyes each having a different fluorescent emission signature and each containing at least one aromatic group susceptible to pi stacking interactions in aqueous liquid media, the plurality of different fluorogenic dyes including at least a first fluorogenic dye with a first fluorescent emission signature and a second fluorogenic dye with a second fluorescent emission signature that is different than the first fluorescent emission signature;
a first liquid medium in a second sealed container, the first liquid medium comprising dimethyl sulfoxide (DMSO), and preferably comprising at least 34 percent by moles of DMSO; and
an aqueous liquid diluent in a third sealed container; and
optionally with the first sealed container, the second sealed container and the third sealed container packaged in a common packaging enclosure.

35. The kit of paragraph 34, comprising a disaccharide.

36. The kit of paragraph 35, comprising an aqueous sample dilution liquid to prepare diluted fluid samples with biological material to be stained for flow cytometry evaluation, wherein:
the aqueous sample dilution liquid has a different composition than the aqueous liquid diluent;
the aqueous sample dilution liquid is contained in in a fourth sealed container; and
at least a portion of the disaccharide in the kit is in the aqueous sample dilution liquid.

37. The kit of paragraph 36, wherein the fourth sealed container is packaged with the first sealed container, the second sealed container and the third sealed container in the common packaging enclosure.

38. A kit for fluorescent staining unassociated virus-size particles with multiple fluorogenic dyes for flow cytometry evaluation for the unassociated virus-size particles in a fluid sample, the kit comprising:
a dry powder dye composition in a first sealed container, the dry powder dye composition comprising a dry powder mixture of a plurality of different fluorogenic dyes each having a different fluorescent emission signature and each containing at least one aromatic group susceptible to pi stacking interactions in aqueous liquid media, the plurality of different fluorogenic dyes including at least a first fluorogenic dye with a first fluorescent emission signature and a second fluorogenic dye with a second fluorescent emission signature that is different than the first fluorescent emission signature;
a first liquid medium in a second sealed container, the first liquid medium comprising an organic liquid, wherein the plurality of different fluorogenic dyes are soluble in the first liquid medium for reconstitution in liquid form for use in staining;
an aqueous liquid diluent in a third sealed container to dilute the first liquid medium after the plurality of different fluorogenic dyes dissolved therein;
an aqueous sample dilution liquid to prepare diluted fluid samples with biological material to be stained for flow cytometry evaluation, the aqueous sample dilution liquid having a different composition than the aqueous liquid diluent and being contained in a fourth sealed container; and
a disaccharide to be dissolved in aqueous liquid of stained fluid samples; and
optionally with the first sealed container, the second sealed container, the third sealed container and the fourth sealed container packaged in a common packaging enclosure.

39. The kit of any one of paragraphs 35-38, wherein the aqueous sample dilution liquid comprises a concentration of the disaccharide of at least 1 weight percent, at least 1.5 weight percent, at least 2 weight percent, at least 3 weight percent, at least 4 weight percent, at least 4.5 weight percent or at least 6 weight percent.

40. The kit of any one of paragraphs 35-39, wherein the aqueous sample dilution liquid comprises a concentration of the disaccharide of not greater than 22.5 weight percent, not greater than 18 weight percent, not greater than 15 weight percent or not greater than 12 weight percent, not greater than 10 weight percent, or not greater than 8 weight percent.

41. The kit of any one of paragraphs 35-40, wherein essentially all of the disaccharide in the kit is in the aqueous sample dilution liquid.

42. The kit of either one of paragraph 35 or paragraph 38, wherein essentially all of the disaccharide in the kit is in the aqueous liquid diluent.

43. The kit of any one of paragraphs 35-40 and 42, wherein at least a portion of the disaccharide in the kit is in the aqueous liquid diluent.

44. The kit of either one of paragraph 42 or paragraph 43, wherein the aqueous liquid diluent comprises a concentration of the disaccharide of at least 1 weight percent, at least 2 weight percent, at least 3 weight percent, at least 4 weight percent, at least 6 weight percent, at least 9 weight percent or at least 12 weight percent.

45. The kit of any one of paragraphs 42-44, wherein the aqueous liquid diluent comprises a concentration of the disaccharide of not greater than 45 weight percent, not greater than 36 weight percent, not greater than 30 weight percent, not greater than 24 weight percent, not greater than 15 weight percent, not greater than 10 weight percent or not greater than 8 weight percent.

46. The method or kit of any one of paragraphs 1-45, wherein the first fluorogenic dye is for nonspecific nucleic acid staining.

47. The method or kit of any one of paragraphs 1-46, wherein the second fluorogenic dye is for nonspecific protein staining.

48. The method or kit of any one of paragraphs 1-47, wherein the first liquid medium comprises greater than 90 percent by moles of DMSO.

49. The method or kit of any one of paragraphs 1-48, wherein the first liquid medium consists essentially of DMSO.

50. The method or kit of any one of paragraphs 1-49, wherein the dry powder dye composition consists essentially of the plurality of different fluorogenic dyes.

51. The method or kit of any one of paragraphs 1-50, wherein the dry powder dye composition consists essentially of the first fluorogenic dye and the second fluorogenic dye.

52. The method or kit of any one of paragraphs 1-51, wherein the aqueous liquid diluent comprises DMSO as a minor component on a molar basis.

53. The method or kit of any one of paragraphs 1-52, wherein the aqueous liquid diluent comprises DMSO at a weight percentage that is smaller than a weight percentage of DMSO in the first liquid medium.

54. The method or kit of any one of paragraphs 1-53, wherein the aqueous liquid diluent comprises DMSO at a concentration of at least 1 weight percent, at least 2 weight percent, at least 5 weight percent, at least 7 weight percent, at least 10 weight percent, at least 12 weight percent, at least 15 weight percent, at least 17 weight percent or at least 20 weight percent.

55. The method or kit of any one of paragraphs 1-54, wherein the aqueous liquid diluent comprises DMSO at a concentration of no larger than 50 weight percent, no larger than 45 weight percent, no larger than 40 weight percent, no larger than 35 weight percent, no larger than 30 weight percent, no larger than 25 weight percent, no larger than 22 weight percent, no larger than 18 weight percent, no larger than 15 weight percent, no larger than 13 weight percent, no larger than 11 weight percent, no larger than 8 weight percent or no larger than 6 weight percent.

56. A fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:
a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and
an aqueous liquid medium in which the plurality of different fluorogenic dyes are dissolved, the aqueous liquid medium comprising dimethyl sulfide oxide (DMSO) with a weight ratio of water to DMSO in a range from 10:1 to 1000:1.

57. The fluorogenic stain composition of paragraph 56, wherein the weight ratio of water to DMSO in the aqueous liquid medium is at least 50:1.

58. The fluorogenic stain composition of either one of paragraph 56 or paragraph 57, wherein the weight ratio of water to DMSO in the aqueous liquid medium is not larger than 500:1.

59. The fluorogenic stain composition of any one of paragraphs 56-58, comprising at least 90 weight percent water.

60. A fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:
a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and
an aqueous liquid medium in which the plurality of different fluorogenic dyes are dissolved, the aqueous liquid medium comprising dimethyl sulfide oxide (DMSO), optionally with the DMSO at a concentration of at least 1 weight percent, at least 2 weight percent, at least 5 weight percent, at least 7 weight percent, at least 10 weight percent, at least 12 weight percent, at least 15 weight percent, at least 17 weight percent or at least 20 weight percent.

61. The fluorogenic stain composition of paragraph 60, wherein the concentration of DMSO in the aqueous liquid medium is not greater than 50 weight percent, not greater than 45 weight percent, not greater than 40 weight percent, not greater than 35 weight percent, not greater than 30 weight percent, not greater than 25 weight percent, not greater than 22 weight percent, not greater than 18 weight percent, not greater than 60 weight percent, not greater than 13 weight percent, not greater than 11 weight percent, not greater than 8 weight percent or not greater than 6 weight percent.

62. The fluorogenic stain composition of either one of paragraph 60 or paragraph 61, wherein the aqueous liquid medium comprises a weight ratio of water to DMSO of at least 10:7, at least 10:6, at least 10:5, at least 10:4, at least 10:3, at least 10:2.5, at least 10:2 or at least 10:1.5.

63. The fluorogenic stain composition of any one of paragraphs 60-62, wherein the concentration of DMSO in the aqueous liquid medium is in a range having a lower limit and an upper limit;
wherein the lower limit is 1 weight percent, 2 weight percent, 5 weight percent, 7 weight percent, 10 weight percent, 12 weight percent, 15 weight percent, 17 weight percent or 20 weight percent; and
the upper limit is 50 weight percent, 45 weight percent, 40 weight percent, 35 weight percent, 30 weight percent, 25 weight percent, 22 weight percent, 18 weight percent, 16 weight percent, 13 weight percent, 11 weight percent, 8 weight percent or 6 weight percent;
provided that the upper limit is larger than the lower limit;

and in one preferred option the lower limit is 10 weight percent DMSO and the upper limit is 30 weight percent DMSO, and in another preferred option the lower limit is 15 weight percent DMSO and the upper limit is 25 weight percent DMSO.

64. The fluorogenic stain composition of any one of paragraphs 56-63, wherein the aqueous liquid medium comprises a disaccharide dissolved in the aqueous liquid medium.

65. A fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:
a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and
an aqueous liquid medium in which the plurality of different fluorogenic dyes are dissolved, the aqueous liquid medium comprising a disaccharide dissolved in the aqueous liquid medium.

66. The fluorogenic stain composition of either one of paragraph 64 or paragraph 65, comprising the disaccharide at a concentration of at least 1 weight percent, at least 2 weight percent, at least 3 weight percent, at least 4 weight percent, at least 6 weight percent, at least 9 weight percent or at least 12 weight percent.

67. The fluorogenic stain composition of any one of paragraphs 64-66, comprising the disaccharide at a concentration of not greater than 45 weight percent, not greater than 36 weight percent, not greater than 30 weight percent, not greater than 24 weight percent, not greater than 10 weight percent or not greater than 8 weight percent.

68. The fluorogenic stain composition of any one of paragraphs 56-67, comprising a molar concentration of the first fluorogenic dye and a molar concentration of the second fluorogenic dye in the aqueous diluted dye formulation each in a range of from 0.1 to 2000 micromoles per liter.

69. The fluorogenic stain composition of any one of paragraphs 56-68, comprising a weight-to-volume concentration of the first fluorogenic dye and a weight-to-volume concentration of the second fluorogenic dye in the aqueous diluted dye formulation are each in a range of from 1 to 1000 micrograms per milliliter.

70. A method for flow cytometry evaluation of a fluid sample for unassociated virus-size particles stained with multiple fluorogenic dyes susceptible to pi stacking interactions in aqueous liquid, the method comprising:
preparing a stained fluid sample for flow cytometry evaluation, comprising mixing at least a portion of the fluorogenic stain composition of any one of paragraphs 56-69 with a sample of biological material to be evaluated by flow cytometry for presence of the unassociated virus-size particles;
after the preparing, subjecting the stained fluid sample to flow cytometry in a flow cytometer to detect and count occurrences of the unassociated virus-size particles stained with both the first fluorogenic dye and the second fluorogenic dye.

71. A method for flow cytometry evaluation of a fluid sample for unassociated virus-size particles stained with multiple fluorogenic dyes susceptible to pi stacking interactions in aqueous liquid, the method comprising:
subjecting a stained fluid sample to flow cytometry evaluation for the virus-size particles, wherein the stained fluid sample comprises:
biological material to be evaluated by flow cytometry for presence of the unassociated virus-size particles;
a plurality of different fluorogenic dyes each having a different fluorescent emission signature and each containing at least one aromatic group susceptible to pi stacking, the plurality of different fluorogenic dyes including at least a first fluorogenic dye with the first fluorescent emission signature and a second fluorogenic dye with a second fluorescent emission signature that is different than the first fluorescent emission signature; and
an aqueous liquid in which the biological material and fluorogenic dyes are dispersed;
wherein the flow cytometry evaluation comprises subjecting the stained fluid sample to flow cytometry in a flow cytometer to detect and count occurrences of the unassociated virus-size particles stained with both the first fluorogenic dye and the second fluorogenic dye; and
wherein the aqueous liquid of the stained fluid sample comprises dissolved DMSO and the stained fluid sample comprises DMSO, preferably at a concentration of DMSO of at least 0.5 weight percent.

72. A method for flow cytometry evaluation of a fluid sample for unassociated virus-size particles stained with multiple fluorogenic dyes susceptible to pi stacking interactions in aqueous liquid, the method comprising:
subjecting a stained fluid sample to flow cytometry evaluation for the virus-size particles, wherein the stained fluid sample comprises:
biological material to be evaluated by flow cytometry for presence of the unassociated virus-size particles;
a plurality of different fluorogenic dyes each having a different fluorescent emission signature and each containing at least one aromatic group susceptible to pi stacking, the plurality of different fluorogenic dyes including at least a first fluorogenic dye with the first fluorescent emission signature and a second fluorogenic dye with a second fluorescent emission signature that is different than the first fluorescent emission signature; and
an aqueous liquid in which the biological material and fluorogenic dyes are dispersed;
wherein the flow cytometry evaluation comprises subjecting the stained fluid sample to flow cytometry in a flow cytometer to detect and count occurrences of the unassociated virus-size particles stained with both the first fluorogenic dye and the second fluorogenic dye; and
wherein the aqueous liquid of the stained fluid sample comprises dissolved disaccharide, and optionally the stained fluid sample comprises a concentration of the dissolved disaccharide of at least 0.5 weight percent.

73. The method of any one of paragraphs 1-33 and 70-72, wherein the stained fluid sample has a concentration of DMSO of at least 0.5 weight percent, at least 1 weight percent, at least 2 weight percent, at least 3 weight percent, at least 4 weight percent, at least 5 weight percent, at least 6 weight percent or at least 7 weight percent.

74. The method of any one of paragraphs 1-33 and 70-73, wherein the stained fluid sample has a concentration of DMSO of not larger than 30 weight percent, not larger than 25 weight percent, not larger than 20 weight percent, not larger than 15 weight percent, not larger than 10 weight percent or not larger than 8 weight percent.

75. The method of any one of paragraphs 1-33 and 70-74, wherein the stained fluid sample has concentration of dissolved disaccharide of at least 1 weight percent, at least 2 weight percent, at least 3 weight percent or at least 4 weight percent.

76. The method of any one of paragraphs 1-33 and 70-75, wherein the stained fluid sample has a concentration of dissolved disaccharide of not greater than 15 weight percent, not greater than 12 weight percent, not greater than 10 weight percent or not greater than 8 weight percent.

77. The method, kit or fluorogenic stain composition of any one of paragraphs 19-33, 35-45, 65-67, 72, 75 and 76, wherein the disaccharide comprises trehalose.

78. The method, kit or fluorogenic stain composition of any one of paragraphs 19-33, 35-45, 65-67, 72, 75, 76 and 77, wherein the disaccharide comprises one or more than one member selected from the group consisting of trehalose, sucrose, lactose, lactulose, melibiose, melibiulose, cellobiose, nigerose, isomaltose, isomaltulose, maltulose, rutinose, β-laminaribiose, and maltose.

79. The method, kit or fluorogenic stain composition of any one of paragraphs 1-76 having any one or more of an aqueous liquid diluent, an aqueous diluted dye formulation, a stained fluid sample, a preliminary fluid sample or an aqueous sample dilution liquid comprising a disaccharide, wherein the disaccharide comprises one or more than one member selected from the group consisting of trehalose, sucrose, lactose lactulose, melibiose, melibiulose, cellobiose, nigerose, isomaltose, isomaltulose, maltulose, rutinose, β-laminaribiose, and maltose.

80. The method of any one of paragraphs 1-33 and 70-79, wherein the flow cytometry comprises:
hydrodynamically focusing a flow of the stained fluid sample with a sheath fluid; and
flowing the hydrodynamically focused stained fluid sample through a flow cell in which the flowing hydrodynamically focused stained fluid sample is subjected to excitation radiation to stimulate a fluorescent emission response from each of the first fluorogenic dye and the second fluorogenic dye on the unassociated virus-size particles stained with both the first fluorogenic dye and the second fluorogenic dye; and
detecting for both the first fluorescent emission signature and the second fluorescent emission signature; and
wherein, the flowing comprises maintaining a flow rate of the hydrodynamically focused stained fluid sample through the flow cell in a range having a lower limit of 300 nanoliters per minute, 600 nanoliters per minute or 800 nanoliters per minute and an upper limit of 6000 nanoliters per minute, 3000 nanoliters per minute or 2000 nanoliters per minute, and preferably in a range of from 600 nanoliters per minute to 3000 nanoliters per minute.

81. The method of paragraph 80, wherein the flow cytometry comprises separately detecting for each of the first fluorescent emission signature and the second fluorescent emission signature and time correlating detection of the first fluorescent emission signature and detection of the second fluorescent emission signature to determine a detection event indicative of an occurence of a said unassociated virus-size particle stained with both the first fluorogenic dye and the second fluorogenic dye.

82. The method of paragraph 81, wherein the flow cytometry comprises subjecting the focused stained fluid sample to a single excitation radiation source that stimulates simultaneous fluorescent emission responses from both the first fluorogenic dye and the second fluorogenic dye on a said unassociated virus-size particle stained with both the first fluorogenic dye and the second fluorogenic dye.

83. The method of paragraph 81, wherein the flow cytometry comprises;
subjecting the focused stained fluid sample to a first excitation radiation source that stimulates a fluorescent emission response from the first fluorogenic dye on a said unassociated virus-size particle stained with both the first fluorogenic dye and the second fluorogenic dye; and
subjecting the focused stained fluid sample to a second excitation radiation source, different than the first excitation radiation source, that stimulates a fluorescent emission response from the second fluorogenic dye on a said unassociated virus-size particle stained with both the first fluorogenic dye and the second fluorogenic dye.

84. The method, kit or fluorogenic stain composition of any one of paragraphs 1-83, wherein the aromatic group susceptible to pi stacking in either one or both of the first fluorogenic dye and the second fluorogenic dye includes a heteroaromatic ring.

85. The method, kit or fluorogenic stain composition of paragraph 84, wherein the heteroaromatic ring includes nitrogen as a heteroatom.

86. The method, kit or fluorogenic stain composition of either one of paragraph 84 or paragraph 85, wherein the heteroaromatic ring includes oxygen as a heteroatom.

87. The method, kit or fluorogenic stain composition of any one of paragraphs 1-86, wherein the aromatic group susceptible to pi stacking in either one or both of the first fluorogenic dye and the second fluorogenic dye includes a 6-member aromatic ring.

88. The method, kit or fluorogenic stain composition of paragraph 87, wherein the 6-member aromatic ring is a homocyclic ring.

89. The method, kit or fluorogenic stain composition of paragraph 88, wherein the 6-member aromatic ring is a heterocyclic ring.

90. The method, kit or fluorogenic stain composition of any one of paragraphs 1-89, wherein the aromatic group susceptible to pi stacking in either one or both of the first fluorogenic dye in the second fluorogenic dye is part of a fused ring moiety.

91. The method, kit or fluorogenic stain composition of paragraph 90, wherein the fused ring moiety comprises a 6-member homocyclic aromatic ring and a 5-member heterocyclic ring.

92. The method, kit or fluorogenic stain composition of paragraph 91, wherein the 5-member heterocyclic ring is an aromatic ring.

93. The method, kit or fluorogenic stain composition of any one of paragraphs 89, 91 and 92, wherein the heterocyclic ring comprises one or more heteroatom selected from the group consisting of nitrogen, oxygen, sulfur and combinations thereof.

94. The method, kit or fluorogenic stain composition of any one of paragraphs 1-93, wherein at least one of the first fluorogenic dye or the second fluorogenic dye is a cyanine dye.

95. The method, kit or fluorogenic stain composition of paragraph 94, wherein each of the first fluorogenic dye and the second fluorogenic dye is a cyanine dye.

96. The method, kit or fluorogenic stain composition either one of paragraph 94 or paragraph 95, wherein the second fluorogenic dye is a merocyanine dye.

97. The method, kit or fluorogenic stain composition of any one of paragraphs 94-96, wherein the first fluorogenic dye is a cyanine dye dimer.

98. The method, kit or fluorogenic stain composition of paragraph 97, wherein the cyanine dimer is a dimer of an un-symmetrical cyanine dye.

99. The method of, kit or fluorogenic stain composition of any one of paragraphs 1-98, wherein the unassociated virus-size particles have a size in a range of from 10 nanometers to one micron.

100. The method, kit or fluorogenic stain composition of any one of paragraphs 1-99, wherein the first fluorogenic dye is for nonspecific nucleic acid staining.

101. The method or kit of any one of paragraphs 1-100, wherein the second fluorogenic dye is for nonspecific protein staining.

The foregoing description of the present invention and various aspects thereof, indicating the examples presented above, has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps to an extent not necessarily incompatible. Additional steps may be included between any illustrated processing steps or before or after any illustrated processing step to an extent not necessarily incompatible.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. When reference is made to a "liquid medium" in which fluorogenic dyes are dissolved, such as in the case of the first liquid medium of the concentrated dye formulation of the aqueous liquid medium of the aqueous diluted dye formulation, it is meant the liquid composition in which the fluorogenic dyes are dispersed in solution, and not including the fluorogenic dyes themselves. Such a liquid medium as used herein also does not include any suspended solids that may be carried by such a liquid composition. Such a liquid composition may include one or more than one normally-liquid components (e.g., DMSO and/or water and/or one or more other organic solvent components) and one or more normally-solid materials (e.g., dissolved salts and other additives of buffer solutions) that may be in solution in the liquid composition.

What is claimed is:

1. A fluorogenic stain composition for fluorescent staining of unassociated virus-size particles with multiple fluorogenic dyes for flow cytometry evaluation for the stained unassociated virus-size particles in a fluid sample, the fluorogenic stain composition comprising:
   a plurality of different fluorogenic dyes each having a different fluorescent emission signature and each containing at least one aromatic group susceptible to pi stacking, the plurality of different fluorogenic dyes including at least a first fluorogenic dye with a first fluorescent emission signature and a second fluorogenic dye with a second fluorescent emission signature that is different than the first fluorescent emission signature; and
   an aqueous liquid medium in which the plurality of different fluorogenic dyes are dissolved, the aqueous liquid medium comprising a disaccharide dissolved in the aqueous liquid medium.

2. The fluorogenic stain composition of claim 1, comprising the disaccharide at a concentration of at least 1 weight percent.

3. The fluorogenic stain composition of claim 2, comprising the disaccharide at a concentration of not greater than 45 weight percent.

4. The fluorogenic stain composition of claim 3, comprising a weight-to-volume concentration of the first fluorogenic dye and a weight-to-volume concentration of the second fluorogenic dye each in a range of from 1 to 1000 micrograms per milliliter.

5. The fluorogenic stain composition of claim 3, wherein the disaccharide comprises trehalose.

6. The fluorogenic stain composition of claim 3, comprising one or more disaccharide materials, wherein the one or more disaccharide materials comprise trehalose, sucrose, lactose, lactulose, melibiose, melibiulose, cellobiose, nigerose, isomaltose, isomaltulose, maltulose, rutinose, β-laminaribiose, or maltose, or combinations thereof.

7. The fluorogenic stain composition of claim 1, wherein the first fluorogenic dye is for nonspecific nucleic acid staining and the second fluorogenic dye is for nonspecific protein staining.

8. The fluorogenic stain composition of claim 7, wherein each of the first fluorogenic dye and the second fluorogenic dye is a cyanine dye.

9. A method for flow cytometry evaluation of a fluid sample for unassociated virus-size particles stained with multiple fluorogenic dyes susceptible to pi stacking interactions in aqueous liquid, the method comprising:
preparing a stained fluid sample for flow cytometry evaluation, comprising mixing at least a portion of a fluorogenic stain composition with a sample of biological material to be evaluated by flow cytometry for presence of the unassociated virus-size particles;
after the preparing, subjecting the stained fluid sample to flow cytometry in a flow cytometer to detect and count occurrences of the unassociated virus-size particles stained with both a first fluorogenic dye and a second fluorogenic dye; and
wherein the fluorogenic stain composition comprises:
a plurality of different fluorogenic dyes each having a different fluorescent emission signature and each containing at least one aromatic group susceptible to pi stacking, the plurality of different fluorogenic dyes including at least the first fluorogenic dye with a first fluorescent emission signature and the second fluorogenic dye with a second fluorescent emission signature that is different than the first fluorescent emission signature, and wherein the first fluorogenic dye is for nonspecific nucleic acid staining and the second fluorogenic dye is for nonspecific protein staining; and
an aqueous liquid medium in which the plurality of different fluorogenic dyes are dissolved, the aqueous liquid medium comprising a disaccharide dissolved in the aqueous liquid medium.

10. The method of claim 9, wherein the fluorogenic stain composition comprises the disaccharide at a concentration in a range of from 1 weight percent to 45 weight percent.

11. The method of claim 10, wherein the first fluorogenic dye is for nonspecific nucleic acid staining and the second fluorogenic dye is for nonspecific protein staining.

12. The method of claim 11, wherein the unassociated virus-size particles have a size in a range of from 10 nanometers to one micron.

13. The method of claim 12, wherein the flow cytometry comprises:
hydrodynamically focusing a flow of the stained fluid sample with a sheath fluid; and
flowing the hydrodynamically focused stained fluid sample through a flow cell in which the flowing hydrodynamically focused stained fluid sample is subjected to excitation radiation to stimulate a fluorescent emission response from each of the first fluorogenic dye and the second fluorogenic dye on the unassociated virus-size particles stained with both the first fluorogenic dye and the second fluorogenic dye; and
separately detecting for each of the first fluorescent emission signature and the second fluorescent emission signature and time correlating detection of the first fluorescent emission signature and detection of the second fluorescent emission signature to determine a detection event indicative of an occurrence of a said unassociated virus-size particle stained with both the first fluorogenic dye and the second fluorogenic dye.

14. A method for flow cytometry evaluation of a stained fluid sample for unassociated virus-size particles stained with multiple fluorogenic dyes susceptible to pi stacking interactions in aqueous liquid, the method comprising:
subjecting the stained fluid sample to flow cytometry evaluation for the unassociated virus-size particles, wherein the stained fluid sample comprises:
biological material to be evaluated by flow cytometry for presence of the unassociated virus-size particles;
a plurality of different fluorogenic dyes each having a different fluorescent emission signature and each containing at least one aromatic group susceptible to pi stacking, the plurality of different fluorogenic dyes including at least a first fluorogenic dye with the first fluorescent emission signature and a second fluorogenic dye with a second fluorescent emission signature that is different than the first fluorescent emission signature; and
an aqueous liquid in which the biological material and fluorogenic dyes are dispersed;
wherein the flow cytometry evaluation comprises subjecting the stained fluid sample to flow cytometry in a flow cytometer to detect and count occurrences of the unassociated virus-size particles stained with both the first fluorogenic dye and the second fluorogenic dye; and
wherein the aqueous liquid of the stained fluid sample comprises dissolved disaccharide.

15. The method of claim 14, wherein the stained fluid sample comprises a concentration of the dissolved disaccharide of at least 0.5 weight percent.

16. The method of claim 15, wherein the stained fluid sample has a concentration of dissolved disaccharide of not greater than 15 weight percent.

17. The method of claim 16, wherein the wherein the first fluorogenic dye is for nonspecific nucleic acid staining and the second fluorogenic dye is for nonspecific protein staining.

18. The method of claim 14, wherein the unassociated virus-size particles have a size in a range of from 10 nanometers to one micron.

19. The method of claim 18, wherein the flow cytometry comprises:
hydrodynamically focusing a flow of the stained fluid sample with a sheath fluid; and
flowing the hydrodynamically focused stained fluid sample through a flow cell in which the flowing hydrodynamically focused stained fluid sample is subjected to excitation radiation to stimulate a fluorescent emission response from each of the first fluorogenic dye and the second fluorogenic dye on the unassociated virus-size particles stained with both the first fluorogenic dye and the second fluorogenic dye; and
detecting for both the first fluorescent emission signature and the second fluorescent emission signature; and
wherein, the flowing comprises maintaining a flow rate of the hydrodynamically focused stained fluid sample through the flow cell in a range of from 300 nanoliters per minute to 6000 nanoliters per minute.

20. The method of claim 19, wherein the flow cytometry comprises separately detecting for each of the first fluorescent emission signature and the second fluorescent emission signature and time correlating detection of the first fluorescent emission signature and detection of the second fluorescent emission signature to determine a detection event indicative of an occurrence of a said unassociated virus-size particle stained with both the first fluorogenic dye and the second fluorogenic dye.

* * * * *